United States Patent [19]
Iijima et al.

[11] Patent Number: 5,877,811
[45] Date of Patent: Mar. 2, 1999

[54] INTERCHANGEABLE LENS TYPE CAMERA APPARATUS

[75] Inventors: Ryunosuke Iijima, Ebina; Toshiaki Mabuchi, Tama; Seiya Ohta, Yokohama, all of Japan

[73] Assignee: Canon Kabushiki Kaisha, Tokyo, Japan

[21] Appl. No.: 919,926

[22] Filed: Aug. 28, 1997

Related U.S. Application Data

[63] Continuation of Ser. No. 238,585, May 5, 1994, abandoned, which is a continuation of Ser. No. 827,940, Jan. 29, 1992, abandoned.

[30] Foreign Application Priority Data

| Feb. 1, 1991 | [JP] | Japan | 3-012095 |
| Feb. 1, 1991 | [JP] | Japan | 3-012101 |
| Feb. 28, 1991 | [JP] | Japan | 3-034762 |
| Mar. 8, 1991 | [JP] | Japan | 3-043651 |
| Mar. 8, 1991 | [JP] | Japan | 3-043657 |
| Apr. 23, 1991 | [JP] | Japan | 3-092299 |

[51] Int. Cl.$^6$ .................................................. H04N 5/225
[52] U.S. Cl. ........................ 348/375; 348/373; 348/220; 396/71
[58] Field of Search ................... 348/373, 374, 348/375, 315, 220, 222, 335; 396/71

[56] References Cited

U.S. PATENT DOCUMENTS

| 4,935,763 | 6/1990 | Itoh et al. | 354/400 |
| 4,959,728 | 9/1990 | Takahashi et al. | 358/228 |
| 5,053,798 | 10/1991 | Ohara et al. | 354/400 |
| 5,087,978 | 2/1992 | Hieda | 358/228 |
| 5,153,629 | 10/1992 | Kaneda | 354/400 |
| 5,157,431 | 10/1992 | Mabuchi et al. | 354/286 |
| 5,161,026 | 11/1992 | Mabuchi et al. | 348/335 |
| 5,257,058 | 10/1993 | Mabuchi | 354/286 |
| 5,485,208 | 1/1996 | Mabuchi | 348/335 |

FOREIGN PATENT DOCUMENTS

| 1-93722 | 4/1989 | Japan | G03B 7/20 |

*Primary Examiner*—Bipin Shalwala
*Attorney, Agent, or Firm*—Robin, Blecker & Daley

[57] ABSTRACT

This invention discloses an interchangeable lens type video camera for deciding lens specifications on a camera side and changing control data transmitted from the camera side to a lens unit in accordance with specifications of the lens unit, thereby performing optimal control. A video camera is also disclosed in which an adapter for mounting a lens unit on the video camera is arranged, and control data outputted from the video camera side to the lens unit is corrected in accordance with lens characteristics, thereby performing the same operation as in a case wherein a video camera lens is mounted on the video camera.

28 Claims, 35 Drawing Sheets

| | | |
|---|---|---|
| 0 | 0 | NEARLY FOCUSED |
| 0 | 1 | SLIGHTLY UNFOCUSED |
| 1 | 0 | UNFOCUSED |
| 1 | 1 | MUCH UNFOCUSED |

FIG. 14

T = 48msec   DFC = 2.5   F = 3.51

| SPEED\FLK | V0 | V1 | V2 | V3 | V4 | V5 | V6 | V7 | V8 | V9 | V10 | V11 | V12 | V13 | V14 | V15 |
|---|---|---|---|---|---|---|---|---|---|---|---|---|---|---|---|---|
| 0.0008 | 3 | 4 | 5 | 7 | 11 | 15 | 21 | 30 | 42 | 60 | 84 | 119 | 168 | 238 | 337 | 477 |
| 0.002 | 1 | 1 | 2 | 3 | 4 | 6 | 8 | 12 | 17 | 24 | 34 | 48 | 67 | 95 | 135 | 191 |
| 0.004 | 1 | 1 | 1 | 1 | 2 | 3 | 4 | 6 | 8 | 12 | 17 | 24 | 34 | 48 | 67 | 95 |
| 0.006 | 0 | 0 | 1 | 1 | 1 | 2 | 3 | 4 | 6 | 8 | 11 | 16 | 22 | 32 | 45 | 64 |
| 0.008 | 0 | 0 | 1 | 1 | 1 | 1 | 2 | 3 | 4 | 6 | 8 | 12 | 17 | 24 | 34 | 48 |
| 0.01 | 0 | 0 | 0 | 1 | 1 | 1 | 2 | 2 | 3 | 5 | 7 | 10 | 13 | 19 | 27 | 38 |
| 0.012 | 0 | 0 | 0 | 0 | 1 | 1 | 1 | 2 | 3 | 4 | 6 | 8 | 11 | 16 | 22 | 32 |
| 0.014 | 0 | 0 | 0 | 0 | 1 | 1 | 1 | 1 | 2 | 3 | 5 | 7 | 10 | 14 | 19 | 27 |
| 0.016 | 0 | 0 | 0 | 0 | 1 | 1 | 1 | 1 | 2 | 3 | 4 | 6 | 8 | 12 | 17 | 24 |
| 0.018 | 0 | 0 | 0 | 0 | 0 | 1 | 1 | 1 | 2 | 3 | 4 | 5 | 7 | 11 | 15 | 21 |

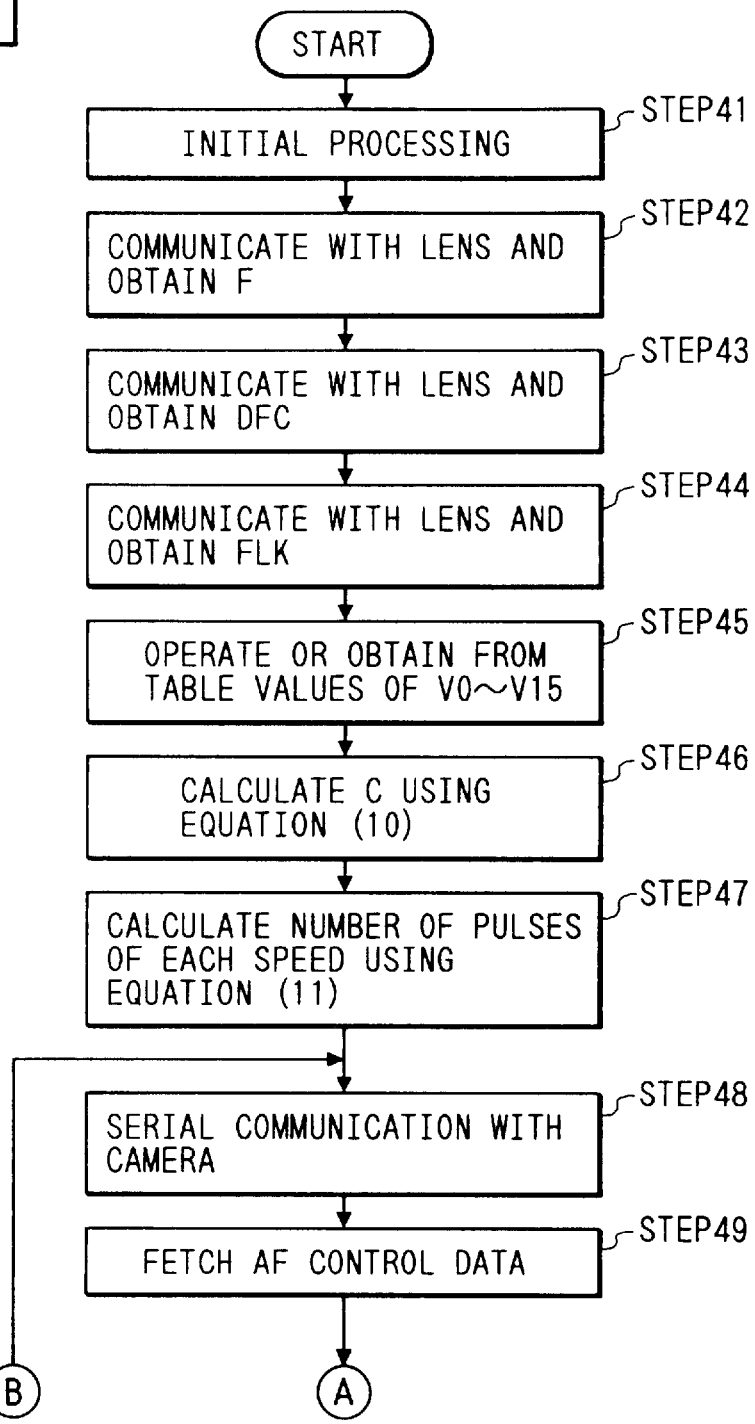

FIG. 17

DRIVE PERIOD (msec) AT x = 3, DFC = 2.5, F = 3.51

| SPEED\FLK | V0 | V1 | V2 | V3 | V4 | V5 | V6 | V7 | V8 | V9 | V10 | V11 | V12 | V13 | V14 | V15 |
|---|---|---|---|---|---|---|---|---|---|---|---|---|---|---|---|---|
| 0.0008 | 54.7 | 38.8 | 27.4 | 19.3 | 13.7 | 9.7 | 6.8 | 4.8 | 3.4 | 2.4 | 1.7 | 1.2 | 0.9 | 0.6 | 0.4 | 0.3 |
| 0.002 | 137 | 96.7 | 68.4 | 48.3 | 34.2 | 24.2 | 17.1 | 12.1 | 8.5 | 6.0 | 4.3 | 3.0 | 2.1 | 1.5 | 1.1 | 0.8 |
| 0.004 | 274 | 193 | 137 | 96.7 | 68.4 | 48.3 | 34.2 | 24.2 | 17.1 | 12.1 | 8.5 | 6.0 | 4.3 | 3.0 | 2.1 | 1.5 |
| 0.006 | 410 | 290 | 205 | 145 | 103 | 72.5 | 51.3 | 36.3 | 25.6 | 18.1 | 12.8 | 9.1 | 6.4 | 4.5 | 3.2 | 2.3 |
| 0.008 | 547 | 387 | 274 | 193 | 137 | 96.7 | 68.4 | 48.3 | 34.2 | 24.2 | 17.1 | 12.1 | 8.5 | 6.0 | 4.3 | 3.0 |
| 0.01 | 684 | 484 | 342 | 242 | 171 | 121 | 85.5 | 60.4 | 42.7 | 30.2 | 21.4 | 15.1 | 10.7 | 7.6 | 5.3 | 3.8 |
| 0.012 | 821 | 580 | 410 | 290 | 205 | 145 | 103 | 72.5 | 51.3 | 36.3 | 25.6 | 18.1 | 12.8 | 9.1 | 6.4 | 4.5 |
| 0.014 | 957 | 677 | 479 | 338 | 239 | 169 | 120 | 84.6 | 59.8 | 42.3 | 29.9 | 21.2 | 15.0 | 10.6 | 7.5 | 5.3 |
| 0.016 | 1094 | 774 | 547 | 387 | 274 | 193 | 137 | 96.7 | 68.4 | 48.3 | 34.2 | 24.2 | 17.1 | 12.1 | 8.5 | 6.0 |
| 0.018 | 1231 | 870 | 615 | 435 | 308 | 218 | 154 | 109 | 76.9 | 54.4 | 38.5 | 27.2 | 19.2 | 13.6 | 9.6 | 6.8 |

FIG. 18
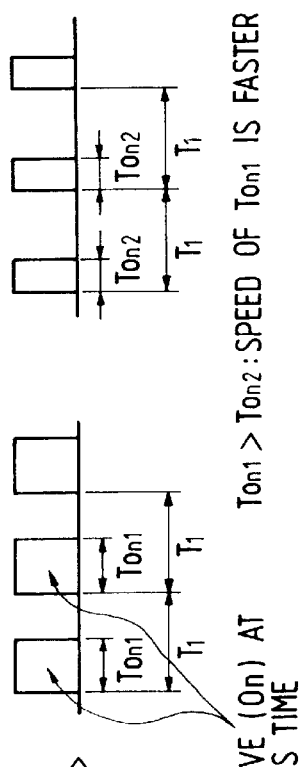
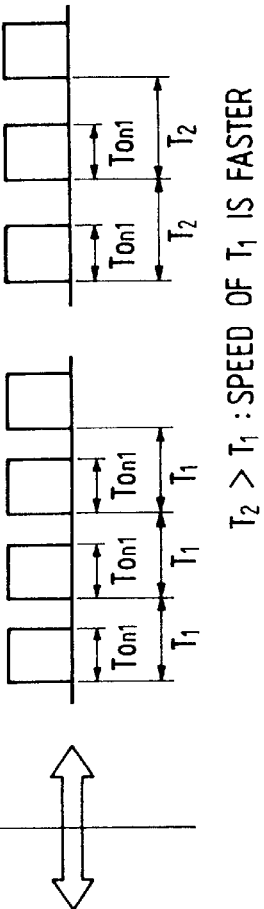
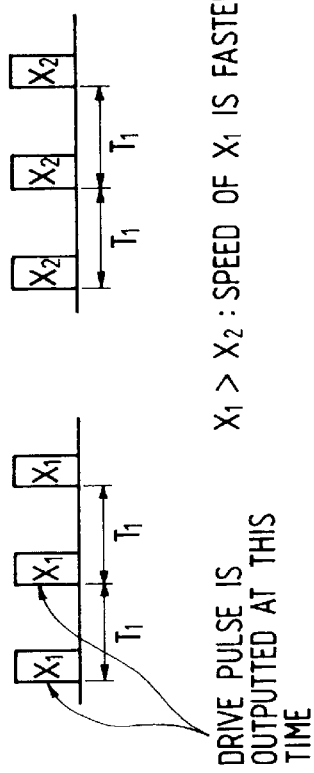
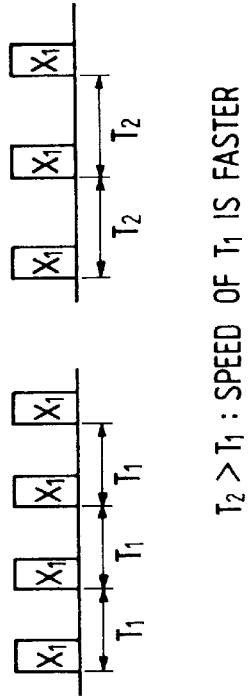

FIG. 19

| | | V0 | V1 | V2 | V3 | V4 | V5 | V6 | V7 | V8 | V9 | V10 | V11 | V12 | V13 | V14 | V15 |
|---|---|---|---|---|---|---|---|---|---|---|---|---|---|---|---|---|---|
| ① DFC=4.664 FLK=0.007155 F =5.6 | T=0.048:x | 0.25 | 0.36 | 0.51 | 0.72 | 1.02 | 1.44 | 2.03 | 2.87 | 4.06 | 5.75 | 8.13 | 11.5 | 16.3 | 23.0 | 32.5 | 46.0 |
| | x=3 :T | 567 | 400 | 284 | 200 | 142 | 100 | 70.9 | 50.1 | 35.4 | 25.1 | 17.7 | 12.5 | 8.86 | 6.26 | 4.43 | 3.13 |
| ② DFC=1.16247 FLK=0.009354 F =2.83 | T=0.048:x | 0.39 | 0.55 | 0.78 | 1.10 | 1.56 | 2.21 | 3.12 | 4.42 | 6.25 | 8.83 | 12.5 | 17.7 | 25.0 | 35.3 | 50.0 | 70.7 |
| | x=3 :T | 369 | 261 | 184 | 130 | 92.2 | 65.2 | 46.1 | 32.6 | 23.1 | 16.3 | 11.5 | 8.15 | 5.76 | 4.08 | 2.88 | 2.04 |
| ③ DFC=3.515 FLK=0.008756 F =3.36 | T=0.048:x | 0.16 | 0.23 | 0.33 | 0.46 | 0.66 | 0.93 | 1.31 | 1.85 | 2.62 | 3.71 | 5.24 | 7.41 | 10.5 | 14.8 | 21.0 | 29.6 |
| | x=3 :T | 879 | 622 | 440 | 311 | 220 | 155 | 110 | 77.7 | 55.0 | 38.9 | 27.5 | 19.4 | 13.7 | 9.72 | 6.87 | 4.86 |
| ④ DFC=2.2683 FLK=0.003704 F =2.82 | T=0.048:x | 0.05 | 0.71 | 1.01 | 1.42 | 2.01 | 2.85 | 4.03 | 5.70 | 8.06 | 11.4 | 16.1 | 22.8 | 32.2 | 45.6 | 64.4 | 91.1 |
| | x=3 :T | 286 | 202 | 143 | 101 | 71.5 | 50.6 | 35.8 | 25.3 | 17.9 | 12.6 | 8.94 | 6.32 | 4.47 | 3.16 | 2.23 | 1.58 |

$$V_n = 2^{\frac{n}{2}-5} \quad (n = 0 \sim 15)$$

| FIG. 20A |
| FIG. 20B |

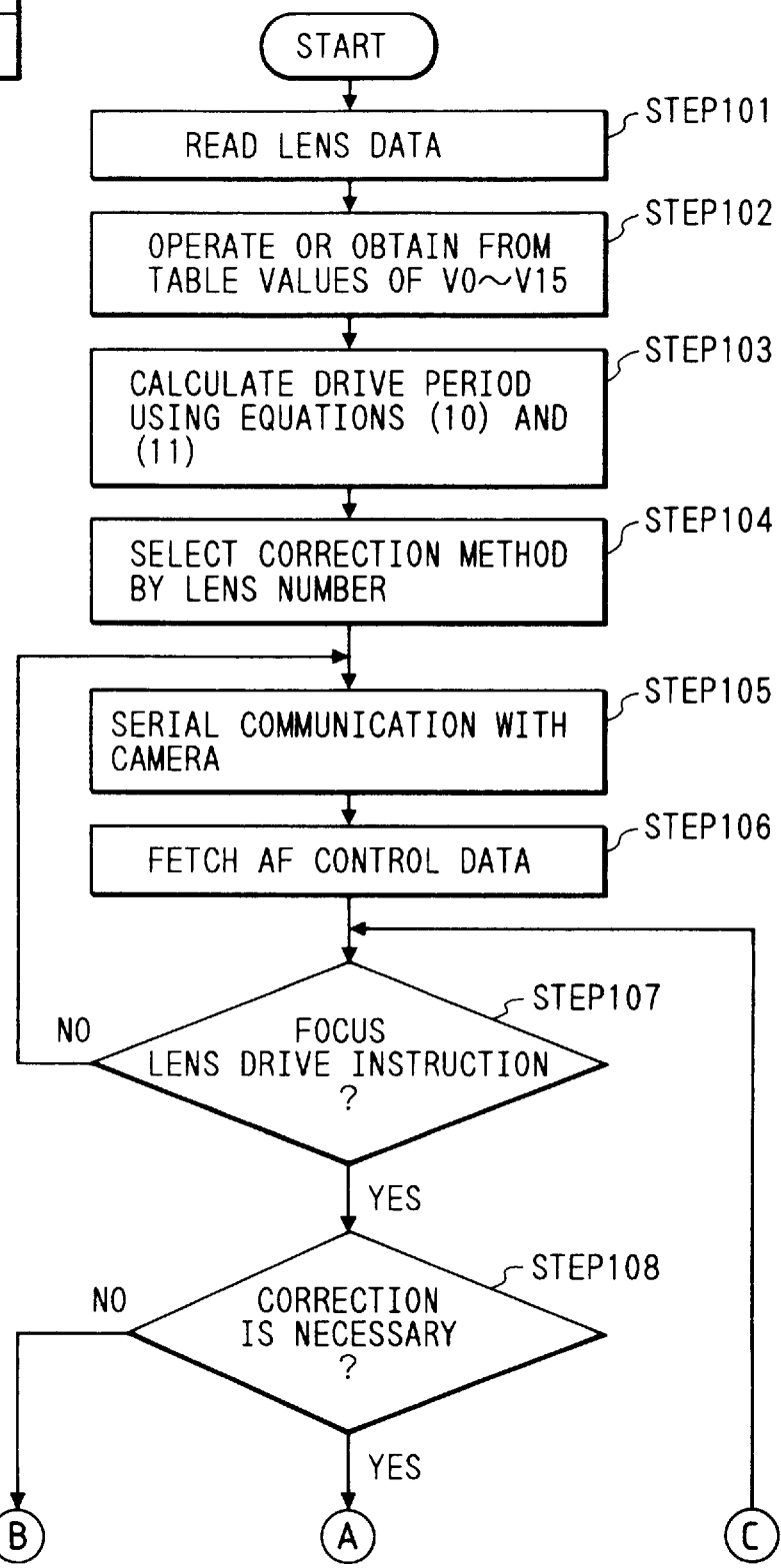

AF ON

AF ON

AF OFF

AF OFF

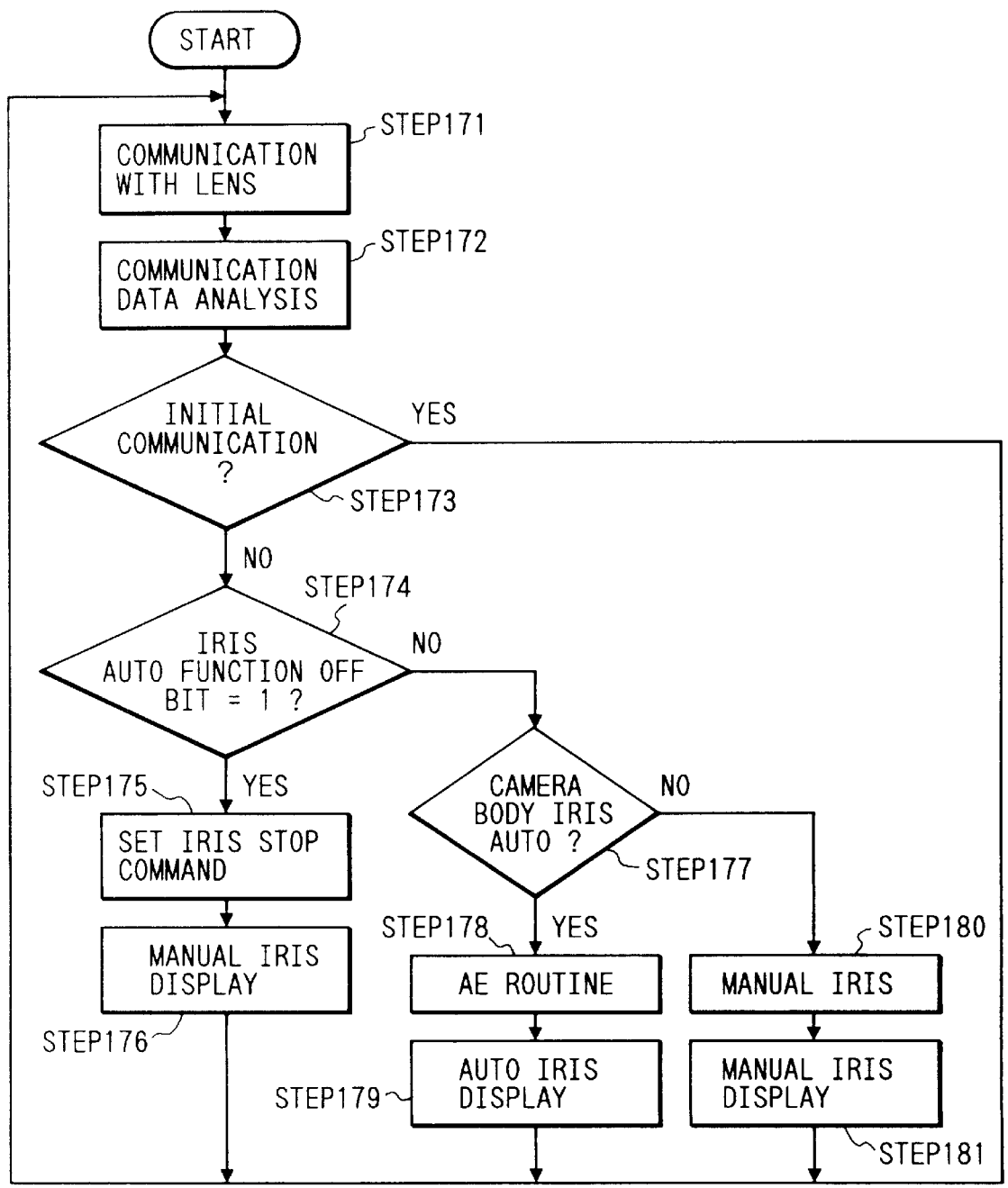

FIG. 36A

| LENS IRIS ON/OFF SWITCH | LENS IRIS AUTO FUNCTION OFF BIT | CAMERA IRIS ON/OFF SWITCH | IRIS OPERATION |
|---|---|---|---|
| OFF | 1 | OFF | AE INHIBITION |
| OFF | 1 | ON | AE INHIBITION |
| ON | 0 | OFF | AE INHIBITION |
| ON | 0 | ON | AE |

FIG. 36B

| NO LENS IRIS ON/OFF SWITCH | LENS IRIS AUTO FUNCTION OFF BIT | CAMERA IRIS ON/OFF SWITCH | IRIS OPERATION |
|---|---|---|---|
| — | 0 | OFF | AE INHIBITION |
| — | 0 | ON | AE |

INTERCHANGEABLE LENS TYPE CAMERA APPARATUS

This is a continuation application under 37 CFR 1.62 of prior application Ser. No. 08/238,585, filed May 5, 1994 abandoned, which is a continuation of Ser. No. 07/827,940, filed Jan. 29, 1992 (abandoned).

BACKGROUND OF THE INVENTION

1. Field of the Invention

The present invention relates to a lens-interchangeable video camera apparatus.

2. Related Background Art

Interchangeable lenses have been conventionally used in the field of cameras, and appropriate lenses can be selected in accordance with photographic conditions and applications.

As another tendency, various functions such as focus control, exposure control, and zoom control, all of which are required to operate a camera, are automated to improve operability. These automatic functions must be equipped as standard functions.

The recent developments in video equipment such as a video camera and an electronic still camera have been remarkable. Interchangeable lenses which have been conventionally used in only sliver-chloride film cameras except for some special equipment are proposed to be used in video cameras.

Optimal lens units can be selected in accordance with photographic conditions and applications, and the range of use of video cameras can be remarkably increased.

When interchangeable lenses are to be used in video cameras, video camera interchangeable lenses must be newly designed. However, demand may have arisen for use/connect interchangeable lenses for silver chloride film cameras in video cameras. It is therefore expected that an adapter for connecting any lens unit to a video camera be necessary.

In an interchangeable lens type camera unit of this type, a control signal is sent from a camera side to a lens unit side to control each drive system in the lens unit. For example, no problem occurs when a still camera lens unit is mounted on the camera body to perform a manual operation. However, when automatic control is to be performed from the camera side, a system cannot perform a normal auto focus operation even if the system mounted with the still camera lens unit is to be controlled as in a system mounted with a video interchangeable lens system due to the following reasons. A focus encoder may not be arranged. Even if it is arranged, the encoder area divisions are not equal to those of the video lens unit. A focus ring cannot be stopped at an optimal position even if the focus ring is controlled to be stopped at a boundary of divisions of the encoder.

When interchangeable lenses are to be mounted on video cameras and a lens unit (e.g., an existing still camera lens unit) having standards different from those of a video camera lens unit is to be connected to a video camera, an adapter is required to connect a lens unit for a silver chloride film camera to a video camera because mounts for the still and video cameras are different from each other and various differences caused by still image photography and moving image photography are present in operation and control systems.

In connection of an existing still camera lens unit to a video camera through an adapter, since design and specifications of the video camera lens are different from those of the still camera lens unit, data cannot be directly exchanged between the video camera and the mounted lens unit. For example, in an auto focus operation, an appropriate auto focus speed cannot be selected.

More specifically, a stable auto focus operation cannot be performed in lenses having different image variable magnification factors corresponding to a movement of a distance ring unless a control speed is set variable.

For example, at a nearly focused position, hunting occurs to largely change an image angle in a lens having a large image variable magnification factor as in a video camera lens unless a focus speed is controlled to be reduced. On the other hand, in a lens having a small image variable magnification factor as in a still camera lens, a change in image angle is small even if hunting occurs because the focus speed is controlled to be relatively high. However, if the focus speed is controlled as in the video camera lens, the focus speed is too low in the still camera lens although it is appropriate for the video camera lens.

Since the shortest range photographic distances of the video camera lens unit and the still camera lens unit are different from each other, a period required for shifting the state from a much unfocused state to a nearly focused state in the video camera lens unit is largely different from that in the still camera lens.

Appropriate control cannot be performed when a still camera lens unit is simply connected to a video camera unit.

SUMMARY OF THE INVENTION

The present invention has been made in consideration of the above conventional problems, and has as its first object to provide an interchangeable lens type video camera apparatus capable of always and optimally controlling a plurality of lens units having different standards and functions without causing operation errors and degradation of accuracy.

It is the second object of the present invention to provide a video camera capable of discriminating specifications of a mounted lens unit and performing optimal control in accordance with a discrimination result.

It is the third object of the present invention to provide a video camera capable of controlling each individual lens unit regardless of the type of mounted lens in a manual operation, and capable of discriminating specifications of a mounted lens unit, changing the control mode, and performing optimal control of any mounted lens in automatic control through data communication from a camera side.

In order to achieve the first to third objects according to an aspect of the present invention, there is disclosed an interchangeable lens type video camera on which a lens unit can be detachably mounted, comprising correction means for correcting focus control data to be transmitted to a lens unit in accordance with characteristics of a mounted lens, mode switching means for switching a focus control mode, and control means for controlling an operation of the correction means in accordance with a state of the mode switching means.

It is the fourth object of the present invention to provide an interchangeable lens type video camera on which a lens having standards different from those of a video camera lens can be mounted.

It is the fifth object of the present invention to provide an interchangeable lens system wherein a lens having standards (still camera lens) different from those of a video camera lens unit can be connected to a video camera, and control can be optimally performed on the basis of the characteristics of the mounted lens.

In order to achieve the fourth and fifth objects according to another aspect of the present invention, there is disclosed an interchangeable lens type camera system for driving a lens unit detachably mounted on a camera on the basis of control data sent from a camera body, comprising relay means for mounting the lens unit on the camera body, the relay means having correction means for correcting the control data from the camera body in accordance with characteristics of the lens unit.

According to still another aspect of the present invention, there is also provided an interchangeable lens type camera for driving a lens unit in accordance with control data sent through an adapter, the lens unit being mounted on the adapter, comprising means for discriminating the presence/absence of the adapter, and control means for changing the control data in accordance with an output from the discriminating means.

There is also disclosed an adapter apparatus for mounting a lens unit on a camera body, comprising communicating means for receiving control data outputted from the camera body and transmitting the control data to the lens unit, and correction means for correcting the control data on the basis of a control state discrimination data outputted from the camera body.

It is the sixth object of the present invention to provide an interchangeable lens type camera system capable of matching two different AF control systems, using an interchangeable lens group of a still camera interchangeable lens system in, e.g., a video movie interchangeable lens system, and performing excellent AF control.

It is the seventh object of the present invention to provide an interchangeable lens type video camera capable of connecting a still camera lens unit having an AF system different from that of a lens system of, e.g., an interchangeable lens type video camera to this camera, so that a still camera interchangeable lens group can be operated in the video camera as if it is a video movie interchangeable lens group, thereby eliminating differences in lens groups, and capable of causing the still camera interchangeable lens group to operate as if it processes data from a still camera, thereby allowing use of any lens group without any modifications.

In order to achieve the sixth and seventh objects according to still another aspect of the present invention, there is disclosed an interchangeable lens type camera system having auto focus control means, comprising means for converting a focus control signal outputted from a camera unit into a control signal corresponding to an auto focus control system of a lens unit when the lens unit is to be connected to the camera unit and a system of the focus control means of the camera unit is different from a system of the auto focus control means of the lens unit connected to the camera unit, and means for outputting a drive signal to drive a drive motor in the lens unit by a constant drive period system on the basis of a result from the converting means.

According to still another aspect of the present invention, there is disclosed an interchangeable lens type camera system having auto focus control means, comprising means for converting a focus control signal outputted from a camera unit into a control signal corresponding to an auto focus control system of a lens unit when the lens unit is to be connected to the camera unit and a system of the auto focus control means of the camera unit is different from a system of the auto focus control means of the lens unit connected to the camera unit, and means for outputting a drive signal to drive a drive motor in the lens unit by a constant pulse count-variable drive period system on the basis of a result from the converting means.

In according to still another aspect of the present invention, there is disclosed a lens control apparatus in an interchangeable lens type camera system having auto focus control means, comprising means for converting a focus control signal outputted from a camera unit into a control signal corresponding to an auto focus control system of a lens unit when the lens unit is to be connected to the camera unit and a system of the auto focus control means of the camera unit is different from a system of the auto focus control means of the lens unit connected to the camera unit, and means for outputting a drive signal to drive a drive motor in the lens unit by switching between a variable pulse count-constant drive period system and a constant pulse count-variable drive period system on the basis of a result from the converting means.

It is the eighth object of the present invention to provide an interchangeable lens system capable of performing high-precision auto focus control free from errors even if lens units having different standards are selectively mounted.

In order to achieve the eighth object according still another aspect of the present invention, there is disclosed an interchangeable lens system capable of detachably mounting a lens unit on a camera body, comprising data conversion means for converting focus control data outputted from the camera body to drive a focusing lens into data capable of driving the focusing lens in the lens unit, the data conversion means being provided with correction means for performing correction in accordance with a maximum defocus amount for one drive pitch of the focusing lens, that is, comprising the data conversion means for converting the focus control data outputted from the camera body to drive the focusing lens into the data capable of driving the focusing lens in the lens unit, the data conversion means having the function of performing correction in accordance with the maximum defocus amount for one drive pitch of the focusing lens.

It is the ninth object of the present invention to provide an interchangeable lens type camera capable of performing control without any error even if some lens functions are identical to camera functions.

It is the tenth object of the present invention to provide an interchangeable lens type camera capable of performing appropriate operation control and display so that camera and lens operation states match with display contents upon detection of the lens operation state on the camera side even if switches for setting an auto focus function in an ON/OFF state are respectively arranged on the lens and camera sides.

In order to achieve the ninth and tenth objects according to still another aspect of the present invention, there is disclosed a lens-interchangeable video camera apparatus having focus control means, comprising first discriminating means for discriminating an operation mode of the focus control means set on a lens side, second discriminating means for discriminating an operation mode of the focus control means set on a camera side, display means for displaying the operation mode of the focus control means on the camera side, and control means for controlling the display means on the basis of outputs from the first and second discriminating means.

It is the eleventh object of the present invention to provide an interchangeable lens type camera system capable of performing optimal exposure control regardless of a mounted lens.

It is twelfth object of the present invention to provide a video camera capable of causing a camera body to read an operation result of an auto iris ON/OFF switch of a lens, performing auto iris control when a logical AND product of the read result and an output result of an auto iris ON/OFF switch of the camera is obtained, i.e., when both the control switches are set in an ON state, performing auto iris control by only the lens auto iris ON/OFF switch having better operability than the camera auto iris ON/OFF switch while the camera auto iris ON/OFF switch is kept on.

In order to achieve the eleventh and twelfth objects according to still another aspect of the present invention, there is provided an interchangeable lens type camera system having auto exposure control means, comprising communicating means for receiving data representing an operation state of lens operating means for ON/OFF-operating an auto exposure control unit on a lens side, first detecting means for detecting the operation state of the lens operating means transmitted through the communicating means, camera operating means for ON/OFF-controlling the auto exposure control unit on a camera side, second detecting means for detecting an operation state of the camera operating means, and control means for controlling the auto exposure control unit on the basis of detection results from the first and second detecting means and setting the auto exposure control unit in an operative state when the first and second detecting means detect that the auto exposure control unit is set in the ON state.

According to still another aspect of the present invention, there is provided a lens-interchangeable video camera apparatus, comprising communicating means for receiving data representing an operation state of lens operating means for ON/OFF-controlling driving means on a lens side, first detecting means for detecting the operation state of the lens operating means transmitted through the communicating means, camera operating means for ON/OFF-controlling the driving means on a camera side, second detecting means for detecting the operation state of the camera operating means, and control means for controlling the driving means on the basis of detection results from the first and second detecting means and setting the driving means in an operative state when the first and second detecting means detect that the driving means is set in the ON state.

The above and other objects, features, and advantages of the present invention will be apparent from the following detailed description in conjunction with the accompanying drawings.

BRIEF DESCRIPTION OF THE DRAWINGS

FIG. 14 is a view showing a conversion table according to the fourth embodiment of the present invention;

FIG. 17 is a view showing a conversion table according to the seventh embodiment of the present invention;

FIG. 18 is a view showing duty driving of a pulse motor and a DC motor so as to explain the ninth embodiment of the present invention;

FIG. 19 is a view showing a table obtained by calculating the number of drive pulses in a constant drive period mode and a drive period in a constant pulse count mode in four types of lenses so as to explain the ninth embodiment of the present invention;

FIG. 33 is a flow chart showing a control operation of a camera microcomputer in the camera body;

FIGS. 36A and 36B are views showing iris operation control patterns in FIGS. 30 and 31.

DETAILED DESCRIPTION OF THE PREFERRED EMBODIMENTS

Interchangeable lens type camera systems according to preferred embodiments of the present invention will be described with reference to the accompanying drawings.

Figure 1:
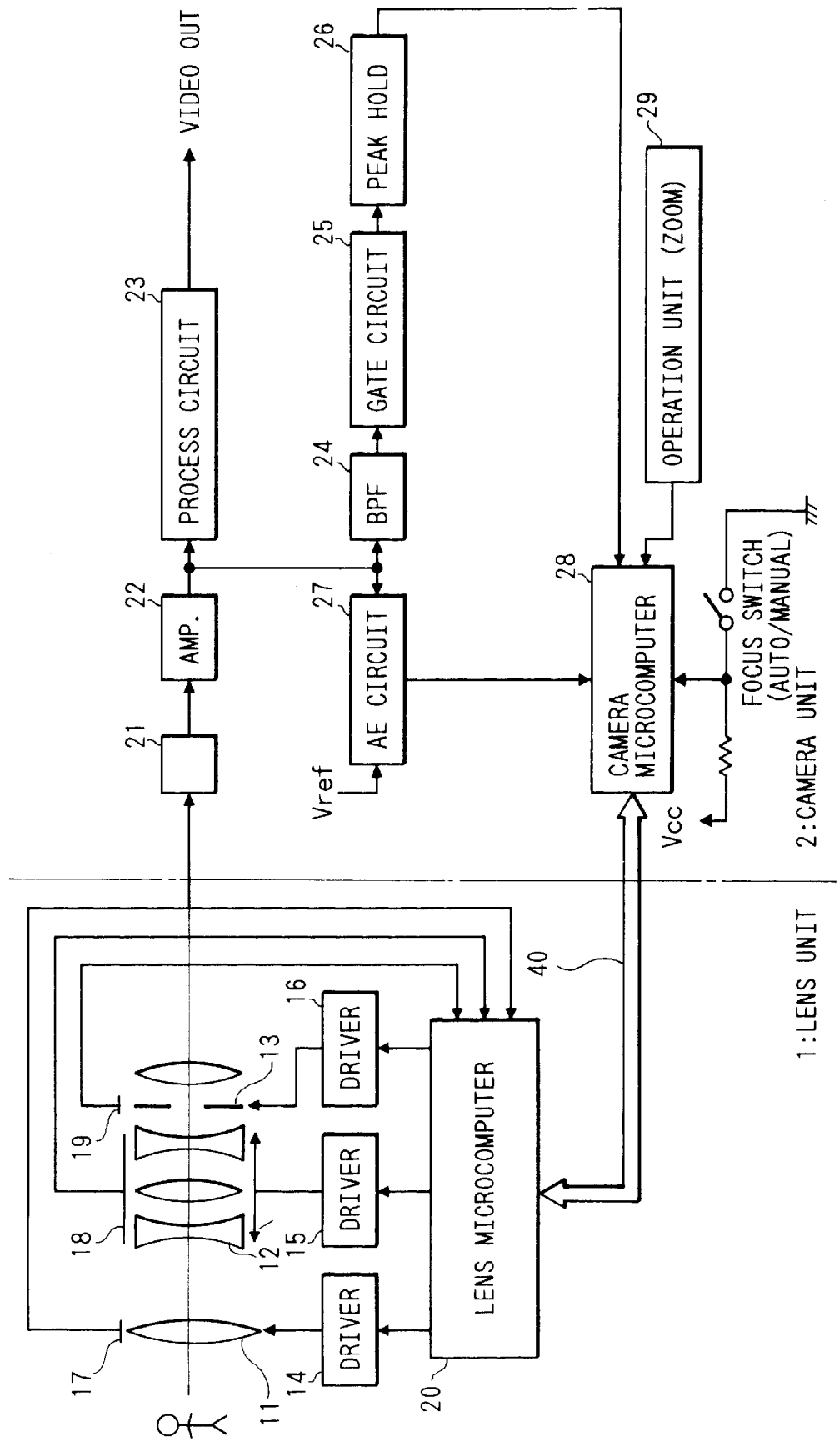
FIG. 1 is a block diagram showing an arrangement of an interchangeable lens type camera apparatus according to the first embodiment of the present invention.

FIG. 1 is a block diagram showing a system in which an interchangeable lens unit is connected to a video camera body according to the first embodiment of the present invention.

This system comprises a lens unit 1 and a video camera body 2. An object to be photographed is represented by reference numeral 100.

The lens unit 1 includes a focusing lens 11, a zoom lens group 12, a diaphragm (iris diaphragm) 13, a focus driver 14, a zoom driver 15, an iris driver 16, a focus encoder 17, a zoom encoder 18, an iris encoder 19, and a lens side microcomputer (to be referred to as a lens microcomputer hereinafter) 20. The focus driver 14 includes a motor for driving the focusing lens 11. The zoom driver 15 includes a zoom motor for driving the zoom lens group 12. The iris driver 16 includes an IG meter and a stepping motor for driving the diaphragm 13. The focus encoder 17 detects a drive position of the focusing lens 11. The zoom encoder 18 detects a position of the zoom lens group 12. The iris encoder 19 detects an F-number. The lens microcomputer 20 exchanges control data with the video camera body 2 to control operations of the lenses and the diaphragm within the lens unit and transmits data as status signals representing the operations of the lenses and the diaphragm to the video camera side.

The video camera body 2 includes an image pickup element 21, a preamplifier 22, a camera process circuit 23, a band pass filter (BPF) 24, a gate circuit 25, and a peak hold circuit 26. The image pickup element 21 such as a CCD photoelectrically converts an object image focused by the still lens unit 1 connected thereto and outputs an image pickup signal. The preamplifier 22 amplifies the image pickup signal outputted from the image pickup element 21 to a predetermined level. The camera process circuit 23 performs signal processing (e.g., gamma correction, blanking processing, addition of a sync signal) of the image pickup signal outputted from the preamplifier 22 and outputs a standardized television signal. The BPF 24 extracts a high-frequency component of a luminance signal which changes in accordance with a focus state from the image pickup signal. The gate circuit 25 gates the high-frequency signal outputted from the BPF 24 to set an area subjected to focus detection within the image pickup surface and causes to pass only a signal corresponding to the area. The peak hold circuit 26 detects a peak value of each field of the high-frequency signal having passed through the gate circuit 25.

The peak value of the high-frequency component outputted from the peak hold circuit 26 is a value changing in accordance with a focus state. A camera microcomputer (to be described later) calculates a drive speed of the focusing lens on the basis of this value.

A photometric circuit (AE circuit) 27 compares the luminance level of the image pickup signal outputted from the preamplifier 22 with a predetermined reference level and controls the F-number or gain so that the luminance level coincides with the predetermined reference level. An output from the AE circuit 27 is supplied to a camera microcomputer (to be described in detail later), and diaphragm control data for the lens unit is calculated.

A camera side microcomputer (to be referred to as a camera microcomputer hereinafter) 28 calculates focusing lens drive data and diaphragm control data on the basis of outputs from the peak hold circuit 26 and the AE circuit 27 and calculates control data for controlling the lens unit on the basis of operation data inputted from an operation unit 29 for performing various operations including zooming.

A focus mode selection switch 30 selects an auto focus mode or a manual focus mode.

A communication transmission line 40 is connected by coupling the lens unit and the camera body. The communication transmission line 40 transmits various control data (e.g., the focusing lens control data outputted from the camera microcomputer 28, the diaphragm control data, and zoom lens control data) to the lens microcomputer 20 on the lens unit side and receives various status signals outputted from the lens microcomputer 20.

Light emitted from the object 100 is focused on the image pickup surface of the image pickup element 21 in the camera body and is photoelectrically converted by the image pickup element 21, thereby outputting an image pickup signal.

The image pickup signal outputted from the image pickup element 21 is converted into a standard video signal such as an NTSC signal by the camera process circuit 23 through the preamplifier 22 and is outputted to the AE circuit 27 and the BPF 24 serving as an AF circuit.

In the AF circuit, the high-frequency component is extracted from the video signal by the BPF 24, and the gate circuit 25 extracts only a signal corresponding to a focused state detection area. The peak hold circuit 26 extracts the peak level of the signal corresponding to the focused state detection area. The extracted peak value is supplied to the camera microcomputer 28 as data corresponding to a focused state. This data is used together with data representing the depth of field calculated by a value of the focus encoder 17 from the lens unit side and values from the zoom encoder 18 and the diaphragm encoder 19, thereby calculating a focusing lens drive speed. The focusing lens drive speed is transmitted to the lens unit 1.

In the AE circuit 27, the luminance signal level is compared with a predetermined reference level, and a signal representing a difference therebetween is supplied to the camera microcomputer 28. The camera microcomputer 28 calculates diaphragm control data with reference to the diaphragm encoder data transmitted from the lens unit 1. This diaphragm control data is outputted to the lens unit 1 through the communication transmission line 40.

The lens unit 1 controls the respective drivers on the basis of the focusing lens drive speed data, the diaphragm control data, and the zoom lens drive data from the camera side and sends back to the camera microcomputer 28 each encoder data representing a drive state of each optical system.

In the AE circuit 27, the luminance signal level is compared with the predetermined reference level, and a signal representing a difference therebetween is supplied to the camera microcomputer 28. The camera microcomputer 28 refers to the focus encoder data sent back from the lens unit 1 through the adapter 3 and calculates the diaphragm control data. This diaphragm control data is outputted to the lens microcomputer 20 through the communication transmission line 40.

Figure 2:
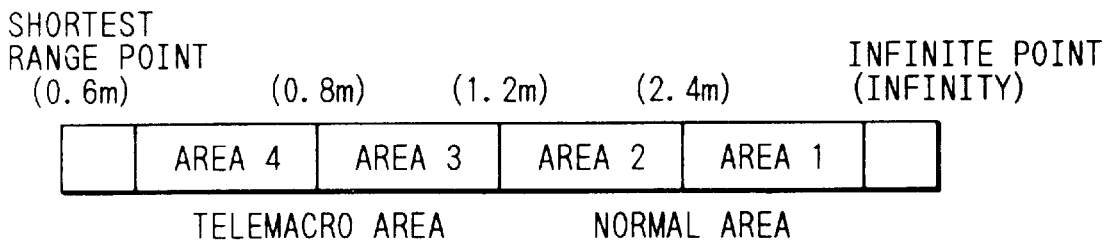
FIG. 2 is a view for explaining an arrangement of a focus encoder in a video camera lens unit.

FIG. 2 shows an arrangement of the focus encoder in the video camera lens unit. The area ranging from the infinite point (infinity) to the shortest range point of 1.2 m is divided into areas 1 and 2. The telemacro area ranging from 1.2 m to 0.6 m is divided into areas 3 and 4.

Figure 3:
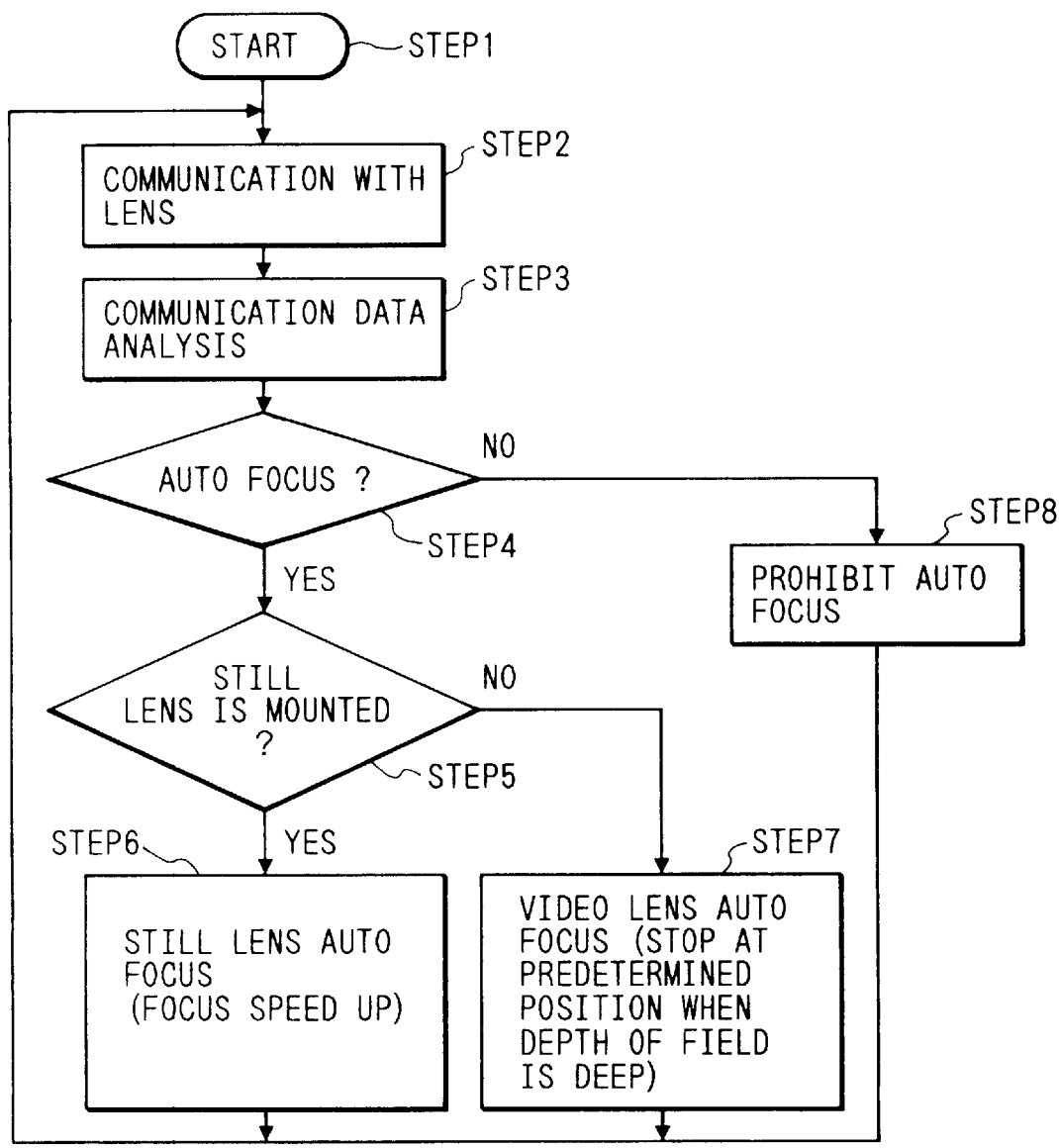
FIG. 3 is a flow chart showing a control operation of a camera microcomputer in the interchangeable lens type camera apparatus of the first embodiment.

FIG. 3 is a flow chart showing a focus control operation in the camera microcomputer.

Referring to FIG. 3, when the flow is started in step 1, various control data are exchanged between the camera microcomputer 28 and the lens microcomputer 20 in the lens unit 1 in accordance with a predetermined format in step 2. The various control data such as the focusing lens control data, the diaphragm control data, and the zoom lens control data outputted from the camera microcomputer 28 are transmitted to the lens microcomputer 20 on the lens unit side. The camera microcomputer 28 receives status signals of various encoders outputted from the lens microcomputer 20.

In step 3, analysis of communication data fetched from the lens unit 1 is performed to decide specifications of the lens unit.

A focus mode is checked in step 4. If an auto focus mode is not set but a manual focus mode is set, the flow advances to step 8 to disable an auto focus control system and prohibit an auto focus operation. The flow then returns to step 2. That is, in the manual focus mode, focus control is performed by the manual focus regardless of the type of lens unit mounted on the camera body.

When the auto focus mode is set in step 4, the flow advances to step 5 to discriminate whether the video camera lens is mounted on the video camera body or, e.g., a still camera lens unit is mounted on the video camera body through an adapter or the like.

It is discriminated in step 5 that the video camera lens unit is mounted on the video camera body, the flow advances to step 7. Various control data such as the focusing lens control data, the diaphragm control data, and the zoom lens control data calculated on the basis of the various status signals outputted from the lens microcomputer 20 are transmitted from the camera microcomputer 28 to the lens microcomputer 20. The flow then returns to step 2, and the above operations are repeated.

It is determined in step 5 that the lens unit mounted on the video camera body is not the video camera lens unit but the still camera lens unit, the flow advances to step 6, and processing corresponding to the still camera lens unit is performed. Control (step 6) performed when the still camera lens unit is mounted is the gist of the present invention.

A difference between an auto focus operation corresponding to the still camera lens unit and an auto focus operation corresponding to the video camera lens unit will be described with reference to FIG. 2.

When the zoom lens is set to a wide side during a normal auto focus operation or when the diaphragm is set in a small size, i.e., when the depth of field is increased, all objects within the normal area seem to be set in a focused state at a focus lens position of 2.4 m in the normal area (infinity to 1.2 m).

In this state, even if the focusing lens is driven, the power is wasted, and the focusing lens is preferably kept stopped.

In addition, the stop position is preferably the central position, i.e., the 2.4-m position of the normal area in consideration of immediate movement of the focusing lens 11 in either direction, i.e., the direction of the infinite point to the shortest range point.

When the camera microcomputer 28 is programmed so that the focusing lens is stopped at a boundary between areas 1 and 2 of the focus encoder 17 in a normal video camera lens unit, the focusing lens 11 can be stopped at this position on the basis of an output from the focus encoder 17.

If the focus encoder is not arranged as described above, or if a still camera lens unit having different area divisions is employed although a focus encoder is arranged, areas 1 to 4 of the video camera lens unit, as shown in FIG. 2 cannot be obtained. For example, a lens unit having area 1 constituted by the areas 1 to 4 described above is mounted on the camera body, the same control as in the video camera lens unit causes continuous driving even if the lens unit reaches the infinite point or the shortest range point because no boundary is defined between areas 1 and 2. Therefore, the lens unit is kept at either point.

Assume that the focusing lens is kept at the shortest range point. Even if the focusing lens is stopped at the 2.4-m point, objects having distances up to 0.8 m can seem to be set in the focused state because the focused state is set in the range of 1.2 m to the infinite point. However, far objects are out of focus because they are located outside the range of the depth of field.

In order to prevent the above operation, when a lens having standards (e.g., still camera lens unit) other than the video camera lens unit is mounted on the video camera body, the control operation of the mounted lens unit must be changed.

When the still camera lens unit is mounted on the video camera body, control for stopping the focusing lens at the specific position, i.e., the 2.4-m point is not performed in step 6. Even if the depth of field is increased, the focusing lens is kept driven, thereby preventing the above problem.

Since the still camera lens unit does not normally have a boundary in the telemacro area, the distance ring is moved to perform a search operation through the entire range in the auto focus operation. Once out of focus occurs, it takes a long period of time to obtain a focused state, and a focus speed is undesirably decreased.

In use of a still camera lens unit, the search speed is set higher than that in the video camera lens in step 6, thereby solving the above problem.

Control is switched between the video camera lens unit mounted on the video camera body and the still camera lens unit mounted on the video camera body. Characteristics of the auto focus operation can be corrected regardless of the lens unit mounted on the video camera body, thereby providing a system capable of natural, optimal control.

The operations in the respective steps are repeatedly performed to always provide optimal control regardless of a type of lens unit mounted on the video camera body.

In an auto focus mode wherein a still camera lens having different optical characteristics from those of a video camera lens and the lens unit is controlled on the basis of data transmitted from the camera side, focusing lens control is changed on the basis of the specifications and characteristics of the lens unit. Therefore, optimal control can always be performed in accordance with the characteristics of the mounted lens regardless of the type of lens mounted on the camera body.

An interchangeable lens type camera system in which a silver chloride film still camera lens having different standards from those of a video camera is mounted on a video camera through an adapter according to the second embodiment of the present invention will be described below.

Figure 4:
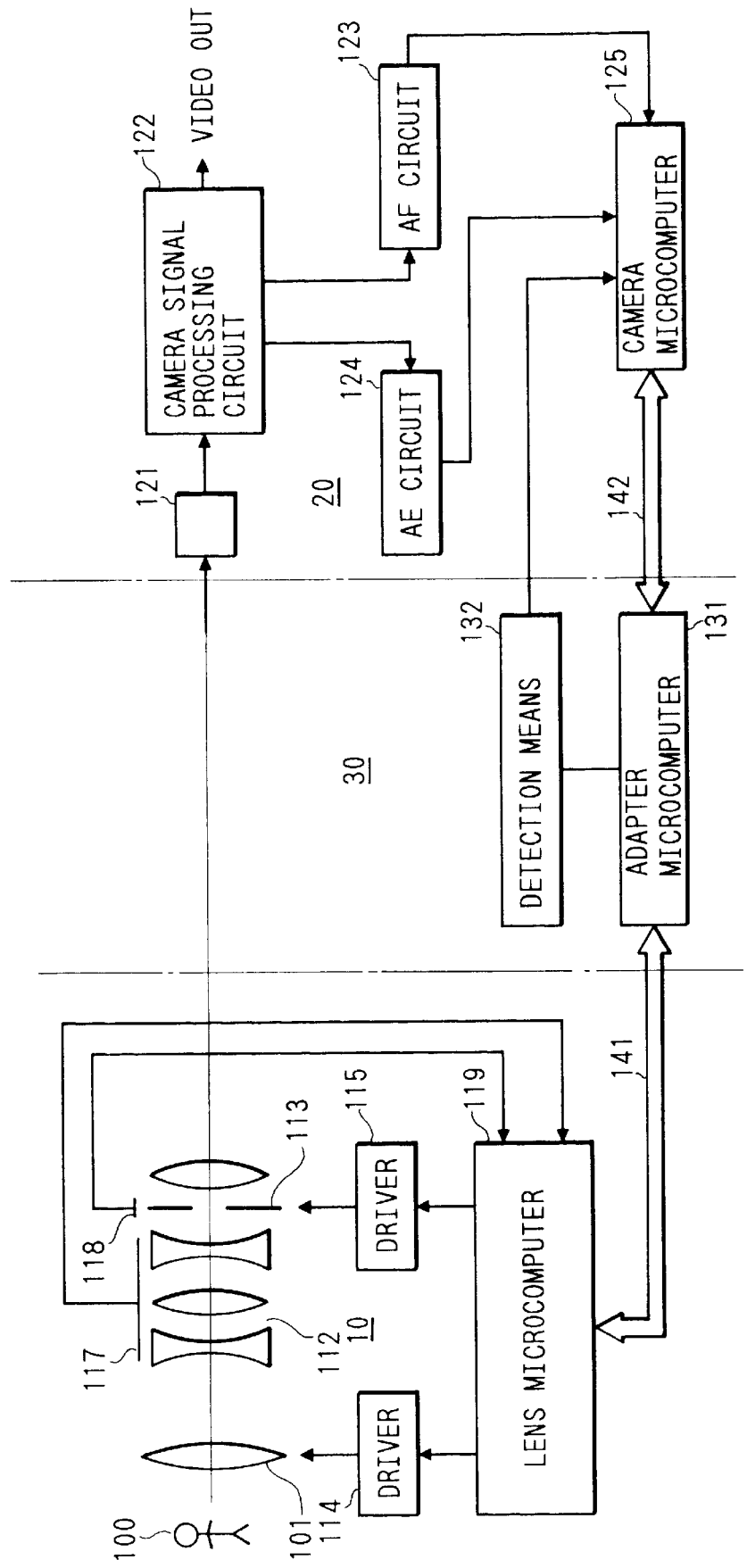
FIG. 4 is a block diagram showing an arrangement of an interchangeable lens type camera system according to the second embodiment of the present invention.

FIG. 4 is a block diagram showing a system in which a still camera lens unit (to be referred to as a still lens unit hereinafter) is connected to a video camera body through an adapter.

Referring to FIG. 4, the system comprises a still lens unit 10, a video camera body 20, and an adapter 30 for connecting the still lens unit 10 to the video camera body 20. An object to be photographed is represented by reference numeral 100.

The still lens unit 10 includes a focusing lens 101, a zoom lens group 112, a diaphragm 113, a focus driver 114, an iris driver 115, a focus encoder 116, a zoom encoder 117, an iris encoder 118, and a lens side microcomputer (to be referred to as a lens microcomputer hereinafter) 119. The focus driver 114 includes a motor for driving the focusing lens 101. The iris driver 115 includes an IG meter and a stepping motor for driving the diaphragm 113. The focus encoder 116 detects a drive position of the focusing lens 101. The zoom encoder 117 detects a position of the zoom lens group 112. The iris encoder 118 detects an F-number. The lens microcomputer 119 exchanges control data with the video camera body 20 through the adapter 30 to control operations of the lenses and the diaphragm within the lens unit and transmits data concerning status signals of the operation of the lenses and the diaphragm to the video camera side.

The video camera body 20 includes an image pickup element 121, a camera signal processing circuit 122, a focused state detection circuit (to be referred to as an AF circuit hereinafter) 123, an exposure control circuit (to be referred to as an AE circuit hereinafter) 124, and a camera side microcomputer (to be referred to as a camera microcomputer hereinafter) 125. The image pickup element 121 such as a CCD photoelectrically converts an object image focused by the still lens unit 10 connected thereto and outputs an image pickup signal. The camera signal processing circuit 122 performs signal processing (e.g., gamma correction, blanking processing, addition of a sync signal) of the image pickup signal outputted from the image pickup element 121 and outputting a standardized television signal. The AF circuit 123 extracts a luminance signal component before gamma correction from the camera signal processing circuit 122 and detects a focused state from a component changing in accordance with a focus state such as a high-frequency component (e.g., an edge portion of an image). The AE circuit 124 detects a luminance signal level of a video signal and controls the diaphragm on the lens unit side so that the F-number is kept at a predetermined level. The camera microcomputer 125 converts a focus control signal outputted from the AF circuit 123, an exposure control signal outputted from the AE circuit 124, and various control data into forms for controlling the lens unit and sends the converted data to the lens unit side.

Communication lines 141 and 142 exchange control data between the lens unit 10 and the adapter 30 and between the camera body 20 and the adapter 30.

Light emitted from the object 100 is focused on the image pickup surface of the image pickup element 121 in the camera body 20 and is photoelectrically converted into an image pickup signal by the image pickup element 121.

The image pickup signal outputted from the image pickup element 121 is converted into a standard video signal such as an NTSC signal by the camera signal processing circuit 122, and the standard video signal is outputted to the AF circuit 123 and the AE circuit 124.

In the AF circuit 123, a high-frequency component of the video signal is extracted and focused state detection is performed in accordance with the level of the high-frequency component. Focus data representing a focus state is outputted to the camera microcomputer 125. In the camera microcomputer 125, a focusing lens drive speed is selected in accordance with the focus data supplied from the AF circuit 123 and the focus encoder data transmitted from the lens unit 10 through the adapter 30. The selected drive speed is outputted to the adapter 30 through the communication line 142.

In the AE circuit 124, the luminance signal level is compared with a predetermined reference level, and a signal representing a difference therebetween is supplied to the camera microcomputer 125. In the camera microcomputer 125, diaphragm control data is calculated with reference to iris encoder data transmitted from the lens unit 10 through the adapter 30. This diaphragm control data is outputted to the adapter 30 through the communication line 142.

In a system constituted by a normal video camera lens unit (to be referred to as a video lens unit hereinafter) and the video camera body, various control signals outputted from the camera microcomputer are transmitted to the lens microcomputer in the lens unit through the communication line to control the respective drive units on the lens unit side. However, when the still lens unit is connected through the adapter 30 as in this embodiment, the various control data outputted from the camera unit 20 are converted into control data suitable for controlling the still lens unit by the adapter 30, and the converted data are supplied to the lens microcomputer 119. Even if the still lens unit is mounted on the video camera body, the same control as in the video lens unit can be performed.

In this system, a control microcomputer (to be referred to as an adapter microcomputer hereinafter) 131 is arranged in the adapter 30 to fetch various optical lens data by using a communication format for the still lens unit, perform correction corresponding to the input optical data, and transmit the corrected data to the lens unit. Any lens unit can be optimally controlled on the basis of the control data from the camera side regardless of the type of lens unit (to be described in detail later).

In this case, the control data cannot be corrected on the camera side because the communication format with the video camera lens cannot receive precise optical data.

The presence/absence of the adapter 30 can be detected by a detecting means 132 including a detection pin and a switch constituting an electric contact at a coupling portion with the camera body. In addition, the presence/absence of the adapter 30 may be detected on the camera side through data communication between the camera microcomputer and the adapter microcomputer.

Figure 5:
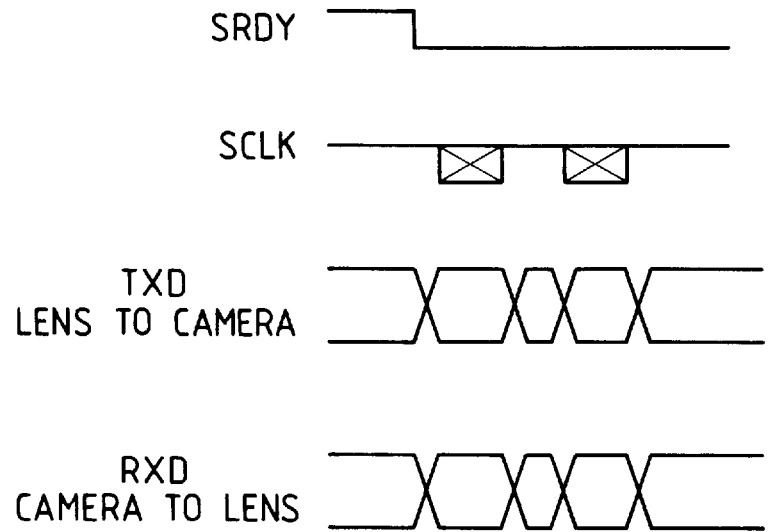
FIG. 5 is a timing chart showing a communication format in the interchangeable lens type camera system of the second embodiment.

FIG. 5 shows timings and a data format in control data communication between the camera body 20 and the adapter 30. Various control data and various status data can be transmitted and received in the illustrated formats, thereby controlling the AF and AE drivers in the lens unit.

Referring to FIG. 5, a signal SRDY is a chip select signal for causing communication with the lens unit. A signal SCLK is a serial clock signal outputted by the camera. Data TXD is data sent from the lens unit to the camera unit. Data RXD is data sent from the camera unit to the lens unit.

Figure 6:
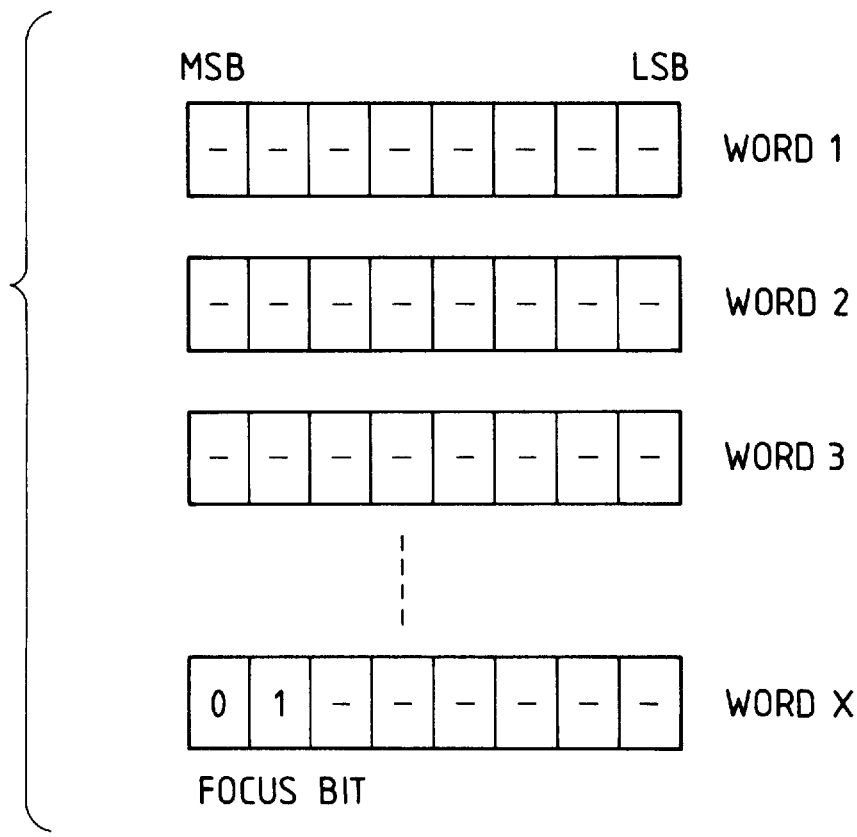
FIG. 6 is a view showing a data format of control data transmitted from a camera body to a lens unit side.

FIG. 6 shows a data format of the control data RXD (FIG. 5) sent from the camera unit to the lens unit.

The data RXD is constituted by a predetermined number of words each consisting of 8 bits. Two bits from the MSB of the Xth word are assigned as focus bits representing a focus state, and the adapter 30 corrects a focusing lens drive speed corresponding to optical characteristics of the lens unit on the basis of the focus state represented by these two bits. Even a still lens unit can be optimally controlled as in the case wherein the video lens unit is mounted on the camera body.

Figures 7, 8:
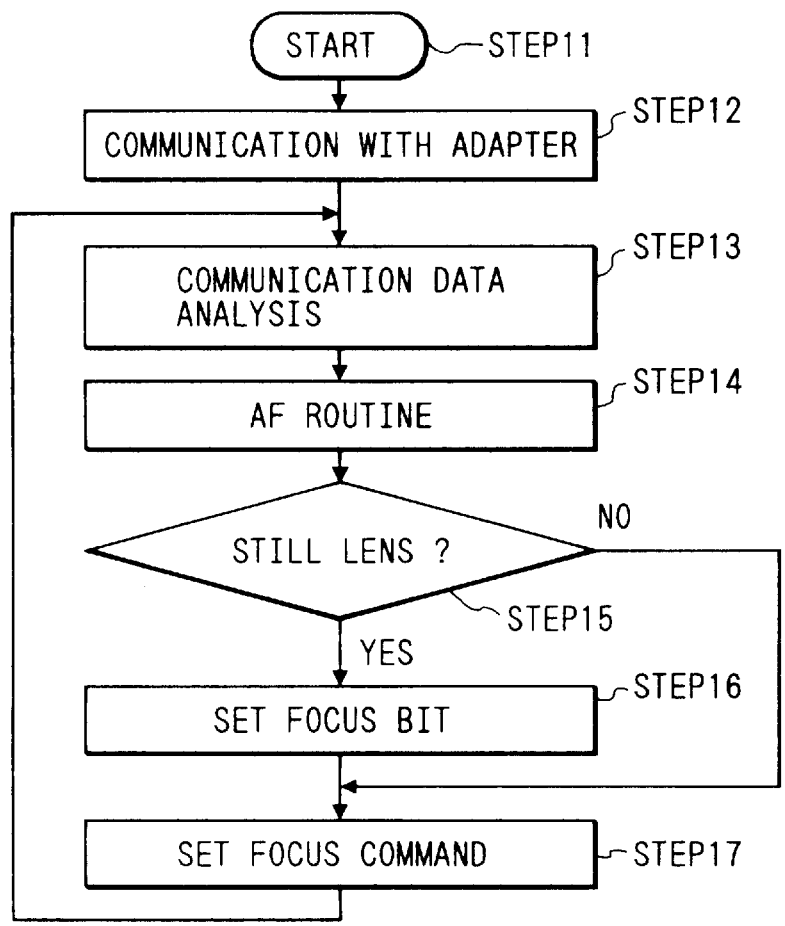
FIG. 7 is a view for explaining data representing a focus state and included in control data transmitted from the camera body to the lens unit side.
FIG. 8 is a flow chart showing a control operation of a camera microcomputer in the camera body of the second embodiment.

FIG. 7 is a view showing the content of the two focus bits. If these two bits are set to be "0" and "0", respectively, a nearly focused state is represented. If the bits are set to be "1" and "1", respectively, a much unfocused state is represented. If the bits are set to be "0" and "1", respectively, a slightly unfocused state is represented. If the bits are set to be "1" and "0", respectively, an unfocused state between the slightly unfocused state and the much unfocused state is represented.

An operation of the adapter 30 will be described below. For example, when a lens unit mounted on the camera body has a lens having a large rotational angle of a distance ring (i.e., the shortest range photographic distance of a lens unit is small), it takes a long period of time when a much unfocused state is set and the focusing lens returns to a focused point upon its abutment against an end point.

When the focus bits in the data RXD transmitted from the camera body are set to be "1" and "1", respectively, i.e., a much unfocused state, the actual focusing lens drive speed is corrected to be higher than the focusing lens drive speed currently sent from the camera. The updated focusing lens drive speed is transmitted to the lens microcomputer in the lens unit 10, thereby performing immediate focus control.

In a lens unit having a large image variable magnification factor upon movement of a distance ring, a large change in image angle occurs even with slight hunting at the nearly focused point. Therefore, the focusing lens drive speed at the nearly focused point must be decreased.

When the focus bits in the data RXD transmitted from the camera are set to be "0" and "0", i.e., a nearly focused point, the focusing drive speed must be corrected so that the actual focusing lens drive speed is set to be lower than the focusing lens drive speed currently transmitted from the camera. The updated focusing lens drive speed is transmitted to the lens microcomputer in the lens unit, thereby performing stable, natural focus control.

In the slightly unfocused state or the unfocused state between the slightly unfocused state and the much unfocused state, the focusing lens drive speed data transmitted from the camera side to the lens unit side is corrected in accordance with the optical characteristics of the lens unit mounted on the camera body, and the focusing lens drive speed for the currently mounted lens unit can be kept optimized.

Since a speed correction amount performed in the adapter microcomputer 131 in the adapter 30 varies depending on a focus state, the current focus state is represented by the focus bits and signaled to the adapter, thereby finely setting the speed correction amount corresponding to the characteristics of the currently mounted lens unit in each focus state. Even if a still lens unit is mounted on the interchangeable lens system for a video camera, auto focus characteristics equal to those in the case wherein the video lens is mounted on the video camera body can be obtained.

A control operation in the camera microcomputer in the camera body will be described with reference to a flow chart in FIG. 8.

Referring to FIG. 8, a control operation is started in step 11, and the flow advances to step 12 to cause communication of various control data between the camera body 20 and the lens unit 10 through the adapter 30.

AF control will be described below. AF control data is sent from the camera side to the lens unit to drive the AF driver. The camera side receives position data of the focusing lens, the diaphragm, and the zoom lens group from the lens unit.

When the adapter 30 is connected between the camera body and the lens unit, control data communication can be performed through the adapter 30.

In step 13, the communication data received from the lens unit is analyzed to obtain position data of the focusing lens, the diaphragm, and the zoom lens group.

In step 14, a focused state is detected from, e.g., a high-frequency component of the video signal in the AF circuit in the camera unit. The depth of field is calculated from the F-number and the focal length data from the lens, and the focusing lens drive speed data is then calculated.

It is determined in step 14 whether the mounted lens unit is a still lens unit or a video lens unit.

When it is determined in step 14 that the video lens unit is mounted, the focus bits are kept to be "0" and "0", respectively, and the flow advances to step 16. The focusing lens drive speed data calculated by the camera microcomputer is set as transmission data for the lens unit, and the flow returns to steps 12. In step 12, the camera microcomputer transmits the data to the lens microcomputer in the lens unit.

If it is decided in step 14 that the still lens unit is mounted through the adapter, the flow advances to step 15, and the focus bits are set in accordance with the focused state, as shown in FIG. 7. The flow then advances to step 16 to set the focusing lens drive data set with the focus bits as the transmission data for the lens unit. The flow returns to steps 12 to transmit the set data to the lens microcomputer in the lens unit.

The above operations are repeatedly performed to always perform optimal control regardless of the type of lens unit mounted on the camera body.

In particular, when a still lens unit is mounted on a video camera body, fine speed control can be performed appropriately by the adapter microcomputer 131 in the adapter 30. The auto focus operation can be improved as in the video lens unit even when the still lens unit is mounted.

When a still lens unit having different optical characteristics from those of a video lens unit is mounted on the video camera body, the focusing lens speed data and the focus bits representing a focus state are transmitted to the adapter, so that an optimal speed correction amount can be set for the characteristics of the lens unit connected to the adapter in each focused state. Even if the still lens unit is mounted, good auto focus control as in the video lens unit can be performed.

The conversion adapter for connecting to control a camera and a lens, which have different standards, as in a system wherein an interchangeable lens in a still camera interchangeable lens system having standards different from those of an interchangeable lens type video camera apparatus is connected to the interchangeable lens type video camera has been described above. In the following embodiment, detailed control in use of a conversion adapter will be described below.

A conversion adapter is required to connect a video movie camera and a still camera lens. This conversion adapter is required to satisfy the following three reasons.

(1) The conversion adapter is required to match the mount of the video movie interchangeable lens system with the mount of the still camera interchangeable lens system.

(2) The conversion adapter is required to compensate for a difference in optical path due to a difference between the distances between the image pickup surfaces and the mount positions of the video movie camera and the still camera.

(3) The conversion adapter is required to match the communication formats and data/control formats for exchanging various control data between the video movie interchangeable lens system and the still camera interchangeable lens system.

Large differences are present in forms, photographic conditions, and functions between the movie camera and the still camera. For this reason, a difference is present in AF control system between the movie camera and the still camera. The AF control systems will be briefly described below.

A focus control system of a camera integral VTR will be described with reference to FIG. 9. Light from an object 201 is focused on a camera side image pickup element 221 through a focusing lens unit 202, a zooming lens unit 203, and a diaphragm mechanism 204. As a result, a television signal is generated and outputted from a camera signal processing circuit 222.

On the other hand, a high-definition signal which tends to be generated in a large amount during a focus operation is extracted by a high pass filter (HPF) 223, and converted into a digital signal by an A/D converter 224. This digital signal serves as decision data for an AF (auto focus) decision circuit 225. Position data of the focusing lens unit is obtained by a focus encoder 207, position data of the zooming lens unit is obtained by a zoom encoder 210, and F-number data is obtained from an iris encoder 213. These data are used as reference data.

In order to decide an unfocused direction, i.e., a lens drive direction, a signal, having a period which is several times a frame frequency, generated by a timing generation circuit 226 is supplied to a driver 227 to drive an actuator 228 such as a bimorph plate, thereby vibrating the image pickup element 221 with a small amplitude before and after the focal plane. A near- or far-focus state is detected by a decision circuit, i.e., the focus encoder 207 using this vibration. The decision result is transmitted to a lens side focusing lens unit driver 206, and the focusing lens unit 202 is driven to a focused position by a motor 205.

The zooming lens unit 203 is driven by a zooming lens unit driver 209 and a motor 208. The diaphragm mechanism 204 is driven by a diaphragm mechanism driver 212 and an IG meter 211. Drive control signals are generated by the camera independently of the AF control circuit and are supplied as a zoom control signal 230 and an iris control signal 229.

A focus control system of an interchangeable lens type VTR will be described with reference to FIG. 10.

Figure 9:
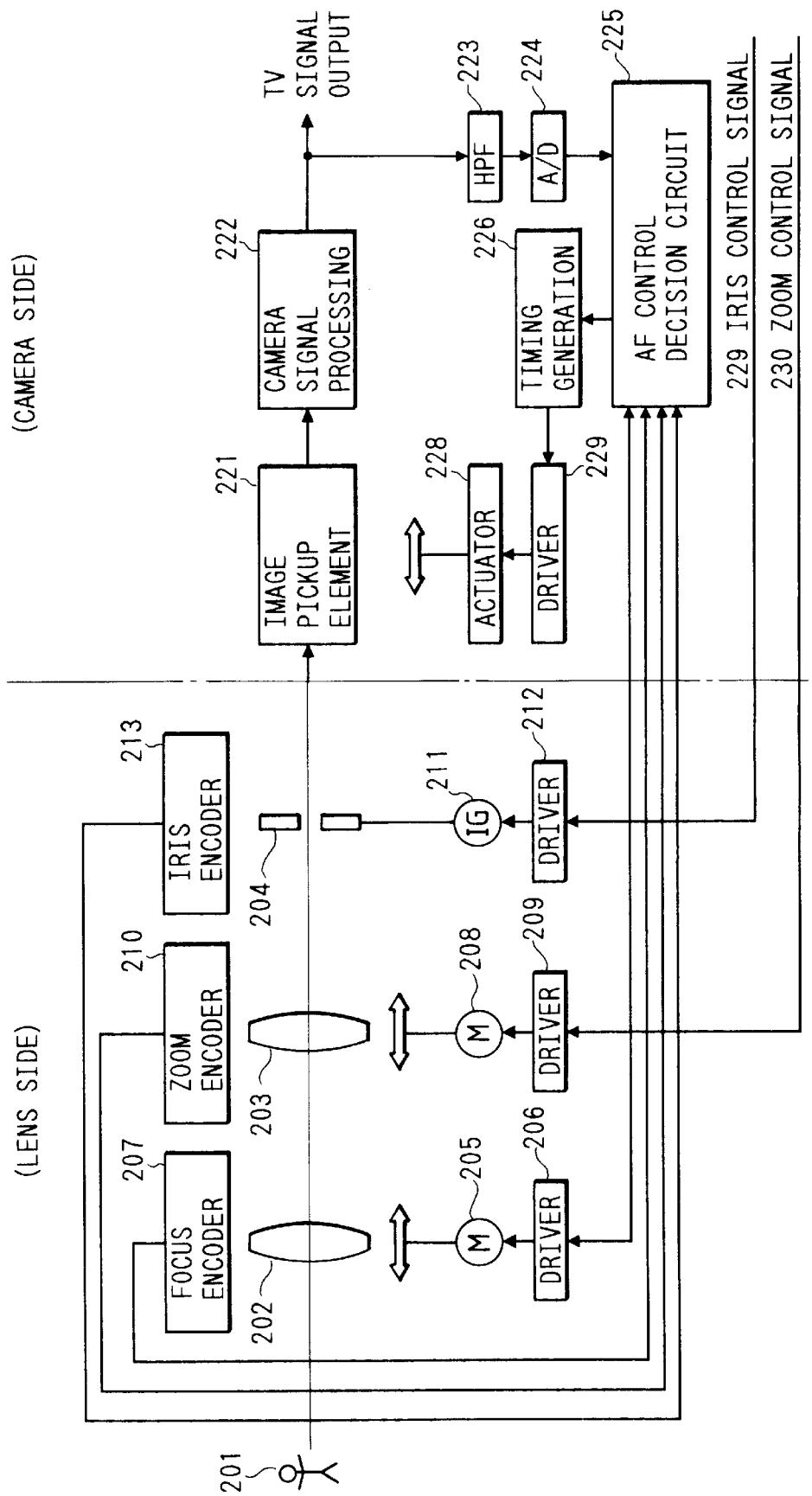
FIG. 9 is a block diagram showing an AF control in an integral video movie camera.
Figure 10:
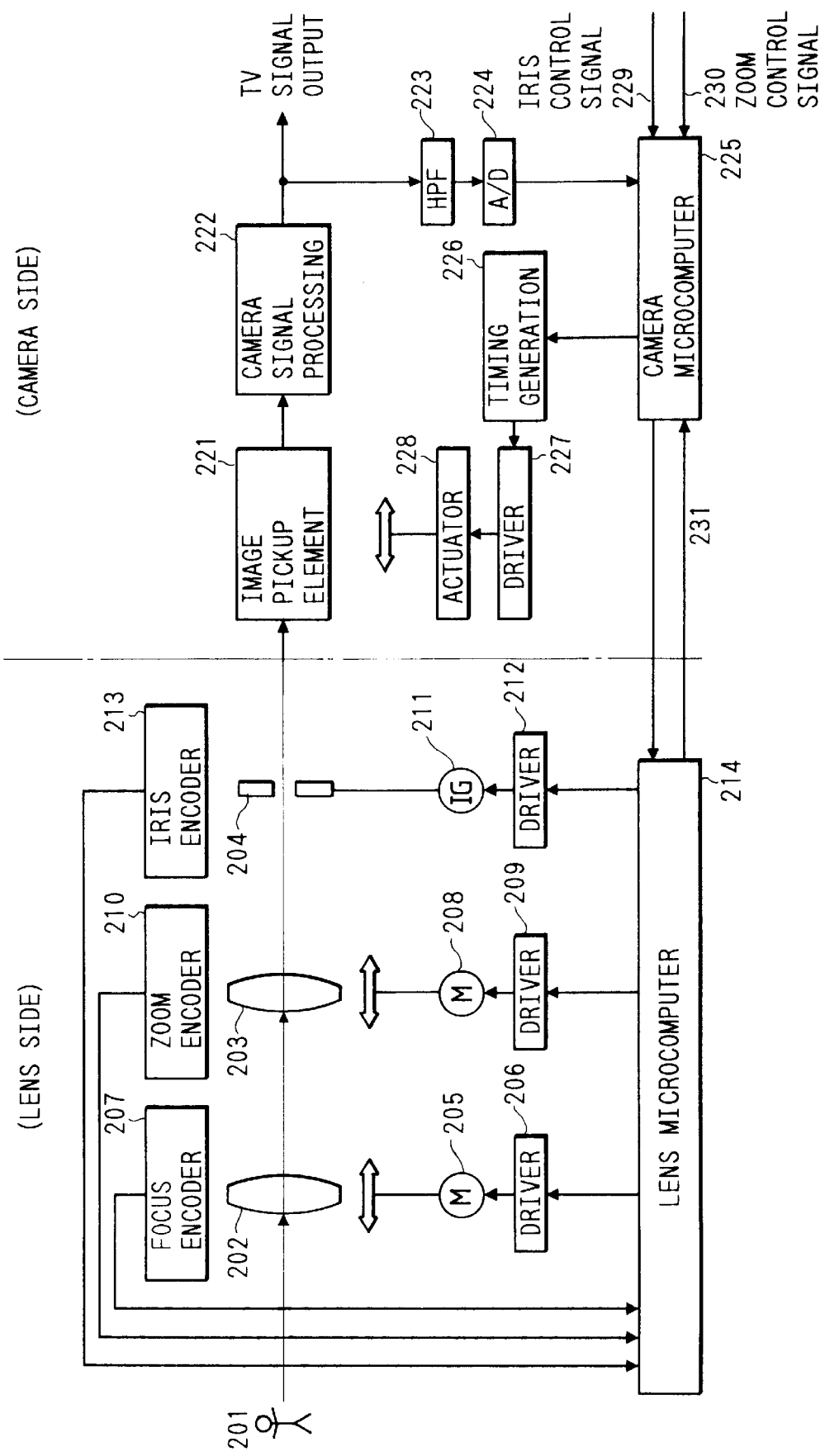
FIG. 10 is a block diagram showing an AF control in an interchangeable lens type video system.

The same reference numerals as in FIG. 9 denote the same parts in FIG. 10. The basic arrangement for forming the AF control signal in FIG. 10 is substantially the same as that of FIG. 9, and only parts different from those in FIG. 9 will be described.

Focused state decision data and the focusing lens unit drive direction data are supplied to a camera microcomputer 225 having an AF control decision function. In the camera microcomputer 225, the AF data and the iris control signal 229 and the zoom control signal 230, which latter two of which are supplied from a circuit other than the AF control circuit, are converted in accordance with a predetermined format which satisfies compatibility of control of the interchangeable lens.

In view of focusing, this data conversion means is to normalize, e.g., a focus motor drive speed with a change in speed of the diameter of a circuit of confusion on the image pickup surface in an full-aperture state.

The camera microcomputer 225 performs parallel-serial conversion (serial conversion) of various data to reduce the number of data communication lines to the lens and transmits the converted data to the lens side through a bidirectional serial communication line 231. This serial communication data is received by a lens microcomputer 214. The lens microcomputer 214 performs serial-parallel conversion and outputs drive signals to the focusing lens unit driver 206, the zooming lens unit driver 207, and the diaphragm mechanism driver 212 in accordance with the contents of the control signals, thereby driving the motors and IG meter.

Each encoder data serving as position data of each unit is temporarily fetched by the lens microcomputer 214 and is converted into a predetermined format to satisfy compatibility of interchangeable lens control. This data is then converted into serial data, and the serial data is transmitted to the camera microcomputer 225 through the bidirectional serial communication line 231. This position data is converted into parallel data by the camera microcomputer 225 and is used as decision data for deciding an AF focused state.

Figure 11:
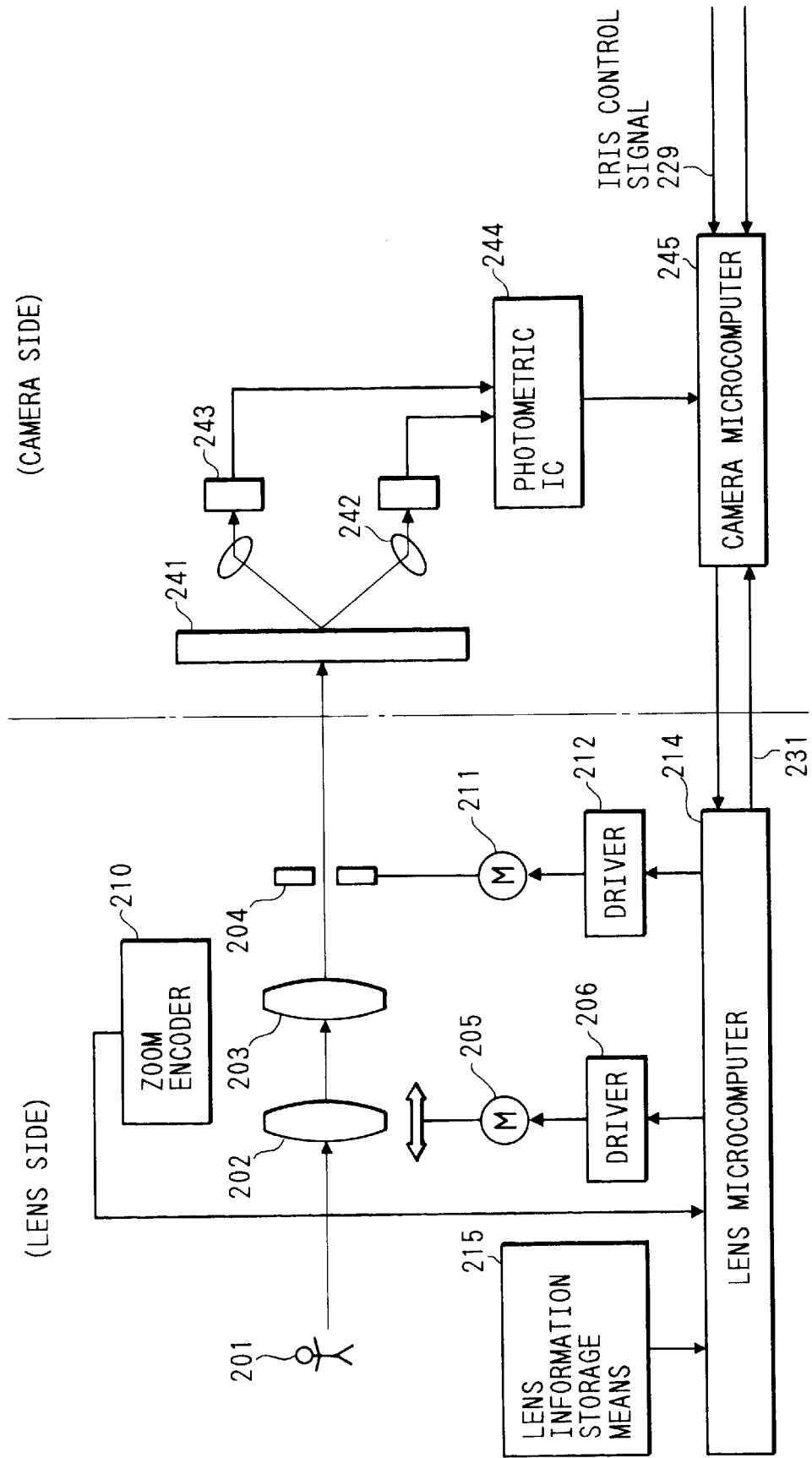
FIG. 11 is a block diagram showing an AF control in a still camera system.

A focus control system of a still camera will be finally described with reference to FIG. 11. Light from an object 201 is focused on a camera side film surface 241 through a focusing lens unit 202, a zooming lens unit 203, and a diaphragm mechanism 204. An AF optical system independently samples two light beams having passed through two different areas of a photographic lens and an image formed on the film surface (primary focal plane corresponding to a focal plane) is refocused on AF photometric sensors 243 by a pair of secondary focusing lenses 242 integral with prisms. Outputs from the AF photometric sensors 243 are supplied to a photometric IC 244. The photometric IC 244 calculates object luminance data in accordance with the outputs from the AF photometric sensors 243 and supplies the calculated data to a camera microcomputer 245 for performing AF control. The camera microcomputer 245 compares two image data with a focused state reference interval to obtain a defocus amount. When the defocus amount is calculated, the focusing lens unit is moved to set the defocus amount to zero, thereby obtaining a focused state.

Since this defocus amount serves as a focal plane reference of the camera, however, an actual rotational amount of the distance ring for absorbing an optical defocus amount largely varies in accordance with a focal length of a lens currently used and a position (object distance) of the distance ring. The rotational amount also varies depending on the focusing type of the lens currently used. In order to accurately obtain lens drive data by the camera microcomputer 245, lens data such as a lens extension amount, a sensitivity coefficient, a distance ring drive amount, a maximum defocus amount, and a minimum F-number, and focal length data must be obtained. In a lens microcomputer 214, necessary data selected from the lens data read out from a lens information storage means 215 (data may be stored as ROM data in the lens microcomputer) are converted into serial data, and the serial data is transmitted to the camera side through a bidirectional serial communication line 231. The serial data transmitted from the lens is converted into parallel data in the camera and is used to form an AF control signal. The above data are transmitted in accordance with a predetermined format which satisfies compatibility of interchangeable lens control.

As described above, the AF control system of the video movie interchangeable lens system is different from the AF control system of the still camera interchangeable lens system in control content and means.

When a photographic atmosphere is taken into consideration, an object to be photographed in the still camera is a stationary object. In order not to miss a shutter chance, high-speed focus and iris operations are required. The focusing lens is required to immediately reach the focused position in an optimal exposure state. For this reason, an actuator (motor) used in the still camera lens is a component which satisfies the above conditions, i.e., a pulse motor.

To the contrary, in the video camera, an object to be photographed is an object moving as a function of time. A time required to obtain a focused state is preferably short. If an object except for the target object crosses the screen, unnatural photography is caused at a high focus speed if the consecutive frame images are regarded as continuous images. For this reason, smoothness is required rather than a high-speed operation. An actuator used in a video camera lens comprises, e.g., an IG meter and a DC motor (an AC motor is more preferable than the DC motor but is expensive). As described above, lens data required in AF control, and communication formats are different between the video and still cameras.

It is, therefore, impossible to directly use AF control data from the camera in the video movie interchangeable lens system as AF control data in the still camera interchangeable lens system.

This embodiment aims at solving this problem and providing an interchangeable lens type camera system in which two different AF control systems are matched with each other, an interchangeable lens group of a still camera interchangeable lens system can be used in a video movie interchangeable lens system, and excellent AF control can be performed. According to the characteristic feature of this embodiment, there is disclosed an interchangeable lens type camera system having auto focus control means, comprising means for converting a focus control signal outputted from a camera unit into a control signal corresponding to an auto focus control system of a lens unit when the lens unit is to be connected to the camera unit and a system of the auto focus control means of the camera unit is different from a system of the auto focus control means of the lens unit connected to the camera unit, and means for outputting a drive signal to drive a drive motor in the lens unit by a constant drive period system on the basis of a result from the converting means.

According to this embodiment of the present invention, there is disclosed an interchangeable lens type camera system having auto focus control means, comprising means for converting a focus control signal outputted from a camera unit into a control signal corresponding to an auto focus control system of a lens unit when the lens unit is to be connected to the camera unit and a system of the auto focus control means of the camera unit is different from a system of the auto focus control means of the lens unit connected to the camera unit, and means for outputting a drive signal to drive a drive motor in the lens unit by a constant pulse count-variable drive period system on the basis of a result from the converting means.

According to this embodiment of the present invention, there is disclosed a lens control apparatus in an interchangeable lens type camera system having auto focus control means, comprising means for converting a focus control signal outputted from a camera unit into a control signal corresponding to an auto focus control system of a lens unit when the lens unit is to be connected to the camera unit and a system of the auto focus control means of the camera unit is different from a system of the auto focus control means of the lens unit connected to the camera unit, and means for outputting a drive signal to drive a drive motor in the lens unit by switching between a variable pulse count-constant drive period system and a constant pulse count-variable drive period system on the basis of a result from the converting means.

Various control operations between a camera and a lens having different control system from that of the camera can be performed. For example, a still camera lens unit having an AF system different from that of the interchangeable lens type video camera can be connected to this interchangeable lens type video camera. When viewed from the video camera, the still camera interchangeable lens group can be operated as if it is a video movie interchangeable lens group, thereby eliminating a difference between the still and video camera interchangeable lens groups. In addition, the still camera interchangeable lens group can be operated as if it can process data from a still camera. Any change need not be performed in the lens group.

Figure 12:
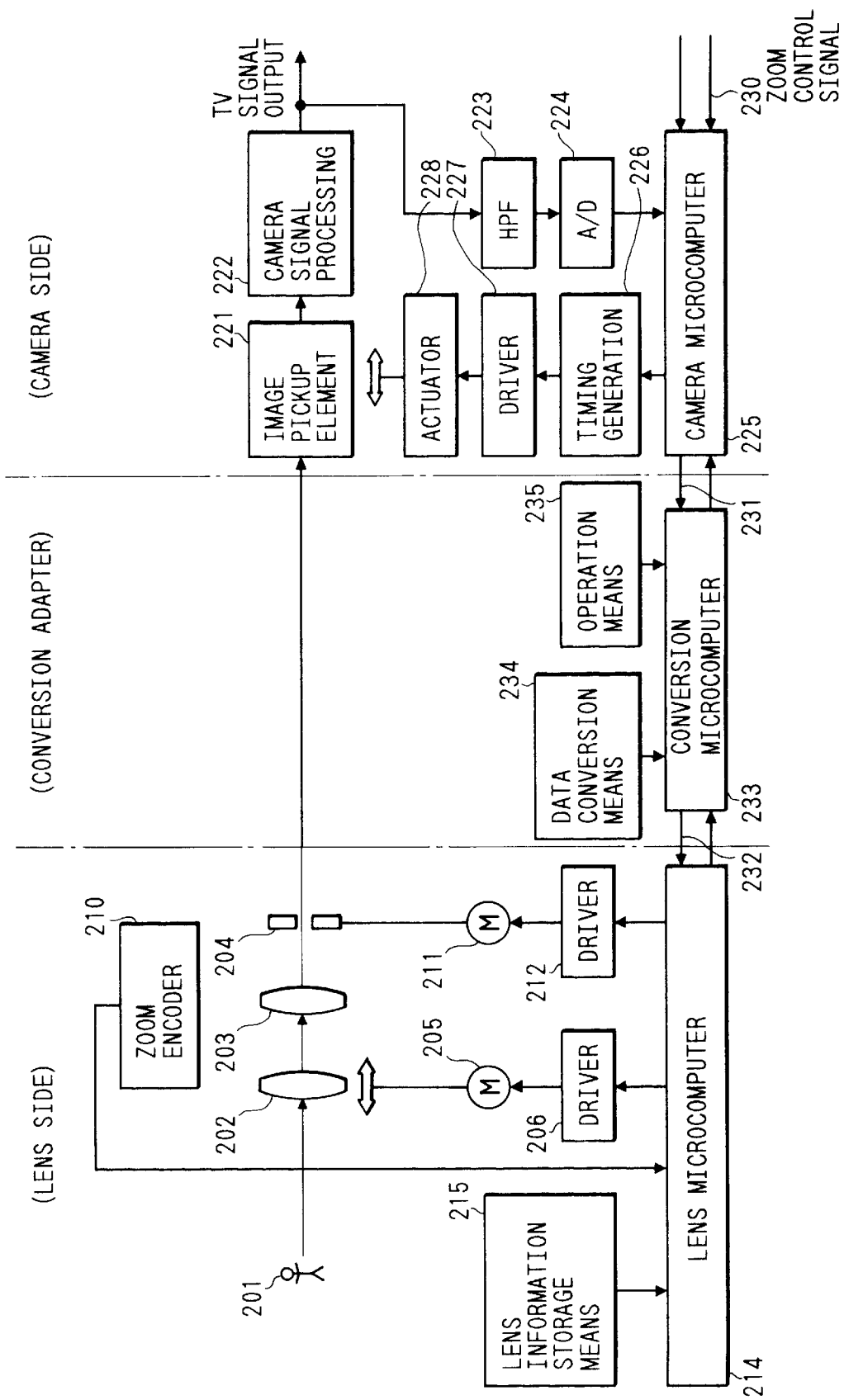
FIG. 12 is a block diagram showing an AF control in the present invention using a conversion adapter.

The third embodiment of the present invention will be described in detail with reference to the accompanying drawings. FIG. 12 is a block diagram showing a conversion adapter according to this embodiment of the present invention. The same reference numerals as in the conventional arrangement described above denote the same parts in this embodiment, and a detailed description thereof will be omitted.

Portions divided by two lines are defined as a camera side, a conversion adapter, and a lens side from the right of FIG. 12.

On the camera side, a control signal generated by an AF circuit finally in the same method as in FIG. 10 is converted into serial data by a camera microcomputer 225 and is sent to a conversion microcomputer 233 in the conversion adapter through a bidirectional serial communication line 231.

The conversion microcomputer 233 converts the input serial data sent from the camera into parallel data, thereby extracting AF control data. In the conversion microcomputer 233, both or one of data conversion means 234 (to be described in detail later) (data may be stored as ROM data in the conversion microcomputer) and operation means 235 (data may be stored as ROM data in the conversion microcomputer) is used to convert the input data into a data format suitable for the still camera lens. The converted data is then converted into serial data in the lens microcomputer 233 and is sent to the lens side through a bidirectional serial communication line 232.

The serial data sent from the conversion adapter is converted into parallel data by a lens microcomputer 214 and is supplied to a focusing lens unit driver 206 to drive a focusing lens unit 202. By this means, the still camera lens is driven on the basis of the control signal generated by the AF control circuit in the video camera, thereby performing AF control.

A detailed data conversion means (operation means) in the conversion microcomputer will be described below. An AF control signal from the video camera is sent as normalized data in the form of a "change in speed of the diameter of a circle of confusion on the image pickup surface in the full-aperture state" for a DC motor as a target object, as described above.

To the contrary, an AF control signal for the still camera lens must be transmitted in the forms of the "number of drive pulses for a pulse motor in the lens" and a "drive direction". Data must be converted in the conversion adapter on the basis of a relationship between these two factors.

A focusing lens extension amount (FLK) for pulse of the focusing motor, and a focusing lens extension amount and defocus coefficient (DFC) are sent as lens data from the lens side. A minimum F-number (F) is also sent as lens data.

A drive expression represented by the AF control data from the video camera is given as driving of "speed+ direction". A driving means incorporated in the still camera lens is constituted by a pulse motor due to its high-speed response. However, the form of "speed" cannot be given in the pulse motor. The pulse motor is important in one-pulse driving, but a time required for one-pulse driving cannot be obtained from the still camera lens.

The still camera require high-speed specifications, and its speed is changed in accordance with the performance of the lens mounted thereon. When speed control of the still camera is taken into consideration, the form of speed must be generated by a pseudo-method.

According to the present invention, a so-called duty drive system for driving a target object by x pulses every constant period T is employed to constitute this pseudo-method.

A defocus amount D for one pulse of the pulse motor is represented by equation (1):

$$D = DFC \times FLK \quad (1)$$

where DFC is the focusing lens extension amount for one pulse of the focusing pulse motor, and DFC is the focusing lens extension amount and defocus coefficient.

The number of pulses obtained when the defocus amount D becomes zero by driving using P pulses is given by the following relation:

$$Dm/D = P \quad (2)$$

where Dm is the maximum defocus amount.

By using this maximum defocus amount Dm, the maximum diameter δm of a circle of confusion in the open full-aperture state is given as follows:

$$\delta m = Dm/F \quad (3)$$

where F is the minimum F-number of the lens.

A time Tt required to set the diameter of the circle of confusion to be zero at a given speed Vn (mm/sec) is defined as follows:

$$Tt = \delta m/Vn \text{ (sec)} \quad (4)$$

The suffix n represents the drive speed from the camera wherein the speed varies in the range of n=0 to 15.

The number R of drive cycles is given as follows:

$$R = Tt/T \quad (5)$$

where T is the drive period per cycle.

The number x of pulses for drive cycle to nullify the maximum diameter of the circle of confusion is obtained as follows:

$$x = P/R \quad (6)$$

Substitutions of equations (1) to (5) into equation (6) yield the following equation:

$$x = (T \times F \times Vn)/(DFC \times FLK) \quad (7)$$

Equation (7) is rewritten to obtain the speed Vn as follows:

$$Vn = (x \times DFC \times FLK)/(T \times F) \quad (8)$$

Equation (8) is a relation between the normalized speed data supplied from the video camera and the drive data supplied to the lens. If the drive speed in equation (8) is fixed, a drive instruction for driving the lens by x pulses represented by equation (9) is supplied to the lens every drive period so as to obtain a pseudo speed supplied from the camera:

$$x = (Vn \times T \times F)/(DFC \times FLK) \quad (9)$$

In the above embodiment, the number of pulses is calculated by the operation means 235. When the AF control command is sent from the camera, the conversion microcomputer 233 performs a calculation using equation (9) by the operation means 235. The resultant number of pulses is transmitted to the lens side within one period. The lens drives the pulse motor within the constant period on the basis of the input data, thereby driving the focusing lens unit 202 according to the instruction of the camera side. In this case, processing of the conversion microprocessor in this case is briefly shown in a flow chart in FIG. 13.

Figure 13:
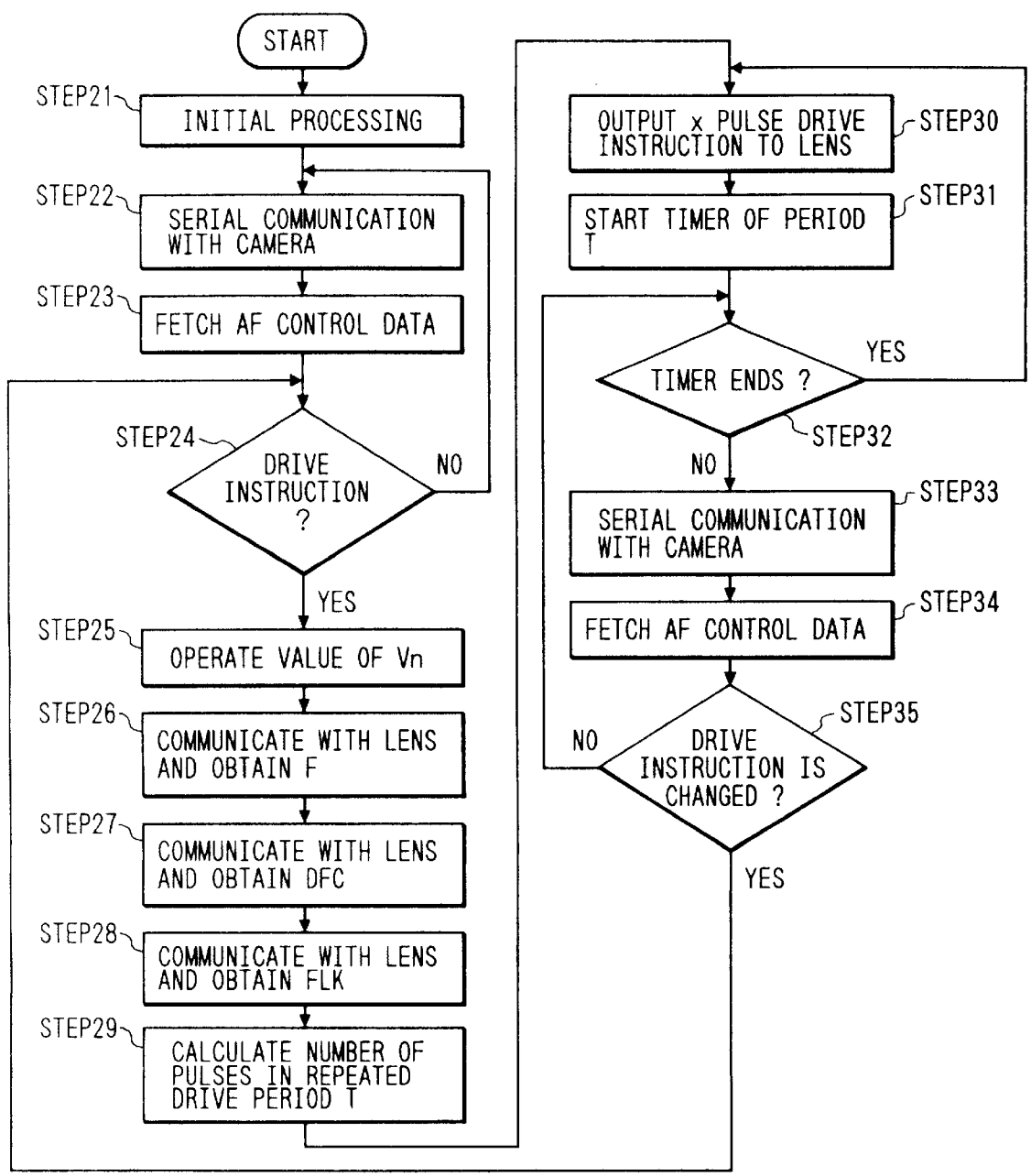
FIG. 13 is a flow chart showing processing of a microcomputer in a conversion adapter according to the third embodiment of the present invention.

Referring to FIG. 13, when control in the conversion adapter is started, initial processing such as clearing of the internal RAM, and setup of various internal states and input/output ports is performed in step 21.

Serial communication with the camera is performed in step 22. In practice, in this serial communication, the camera side serves as a master, and, for example, external interrupt processing is performed in the conversion microcomputer. Since this does not change the contents of the present invention, the above expression form is employed for the illustrative convenience.

In step 23, the content of the serial communication is converted into parallel data, so that AF control data can be extracted.

It is decided in step 24 whether the input AF control instruction is a drive instruction for actually driving the motor. If NO in step 24 (e.g., a stop instruction), the flow returns to step 22. However, if it is decided in step 24 that the input AF control instruction is a drive instruction, processing from step 25 is performed.

In step 25, a speed Vn (n=1 to 15) corresponding to a control instruction speed is calculated.

In steps 26, 27, and 28, data F, DFC, and FLK are obtained from the lens. More specifically, a code corresponding to each data request command is converted into serial data and sent in the form of serial communication to the lens. Data sent back from the lens is converted into parallel data to obtain the above data.

In step 29, the drive period is fixed (e.g., 48 msec) on the basis of the resultant data. The number x of pulses to be actually sent to the lens is obtained in accordance with equation (9). The resultant number of pulses is outputted in the form of a focusing motor drive instruction in step 30. More specifically, a code and the number of drive pulses which correspond to the focusing lens drive command are converted into serial data and are sent to the lens in the form of serial communication.

A repeated drive period generation timer is started in step 31.

The end of this timer (the next drive pulse output timing) is checked in step 32. If the timer is ended, the flow returns to step 30 to output the drive pulses to the lens again. However, if the timer is not ended, the command from the camera is checked in steps 33 and 34. If the drive instruction is not changed in step 35, the flow returns to step 32 to continuously check the timer. However, if the drive instruction has been changed, the flow returns to step 34 to calculate the number of pulses again.

Even if a lens unit having a format different from that of a video camera, e.g., a still camera lens unit, is to be mounted on the video camera, differences in motor characteristics and speed data can be calculated by the conversion adapter. Therefore, the still camera lens unit can be controlled as in the video camera lens unit.

The fourth embodiment of the present invention will be described below. In the above embodiment, the number of pulses is calculated by the operation means 235. However, in this embodiment, the number of pulses is calculated by the data conversion means 234.

The calculations performed in the embodiment using the operation means 235 is performed every time a drive command is received from the camera. This operation is disadvantageous in view of processing capacity.

A conversion table corresponding to the data conversion means 234 is prepared as the data conversion means 234. An example of this conversion table is shown in FIG. 14.

In this table, a drive repetition period is set to be T=48 msec, DFC=2.5, a minimum F-number, i.e., F =3.51, and Vn=2 (n/2-5). The number x of pulses upon a change in FLK is obtained in advance in accordance with equation (9). The results are then stored in a table. A plurality of such tables are prepared within the DFC and F ranges and are selectively used in accordance with data from the lens, thereby obtaining the necessary number of pulses. The subsequent processing is the same as that using the operation means 235, and a detailed description thereof will be omitted.

An operation for calculating the number of pulses by using both the operation means 235 and the data conversion means 234 will be described with reference to the fifth embodiment below.

The conversion table in the fourth embodiment is effective when the data from the lens fall within a relatively narrow data range. If the range of data obtained from various lenses is broad, the table volume is increased to undesirably increase the capacity of the memory of the microcomputer.

For this reason, data in equation (9) is divided into constant data and variable data with respect to a lens state. The operation of the constant data with respect to the lens state is performed in the initial operation, and the results are formatted in a table stored in the microcomputer. A further operation is performed using the table data and the variable data in accordance with a changed lens state.

In equation (9), the FLK is the constant data, and the data DFC is the variable data. The drive period T can be defined as a constant. Since the data Vn is defined as a speed determined by a format, speeds ranging from V0 to V15 can be regarded as constants. As a result, a constant C as in equation (10) is calculated in advance and is stored in the microcomputer. Every time the data DFC is changed, a calculation given by equation (11) for the speed Vn is performed. The result is stored as a speed table in the microcomputer. When a drive command is supplied from the camera, the table data is referred to every drive period, and a drive instruction for the lens is outputted. At this time, processing in the conversion microcomputer is shown in a flow chart of FIG. 15.

$$C=(T \times F)/FLK \tag{10}$$

$$x=C \times Vn/DFC \tag{11}$$

Figure 15B:
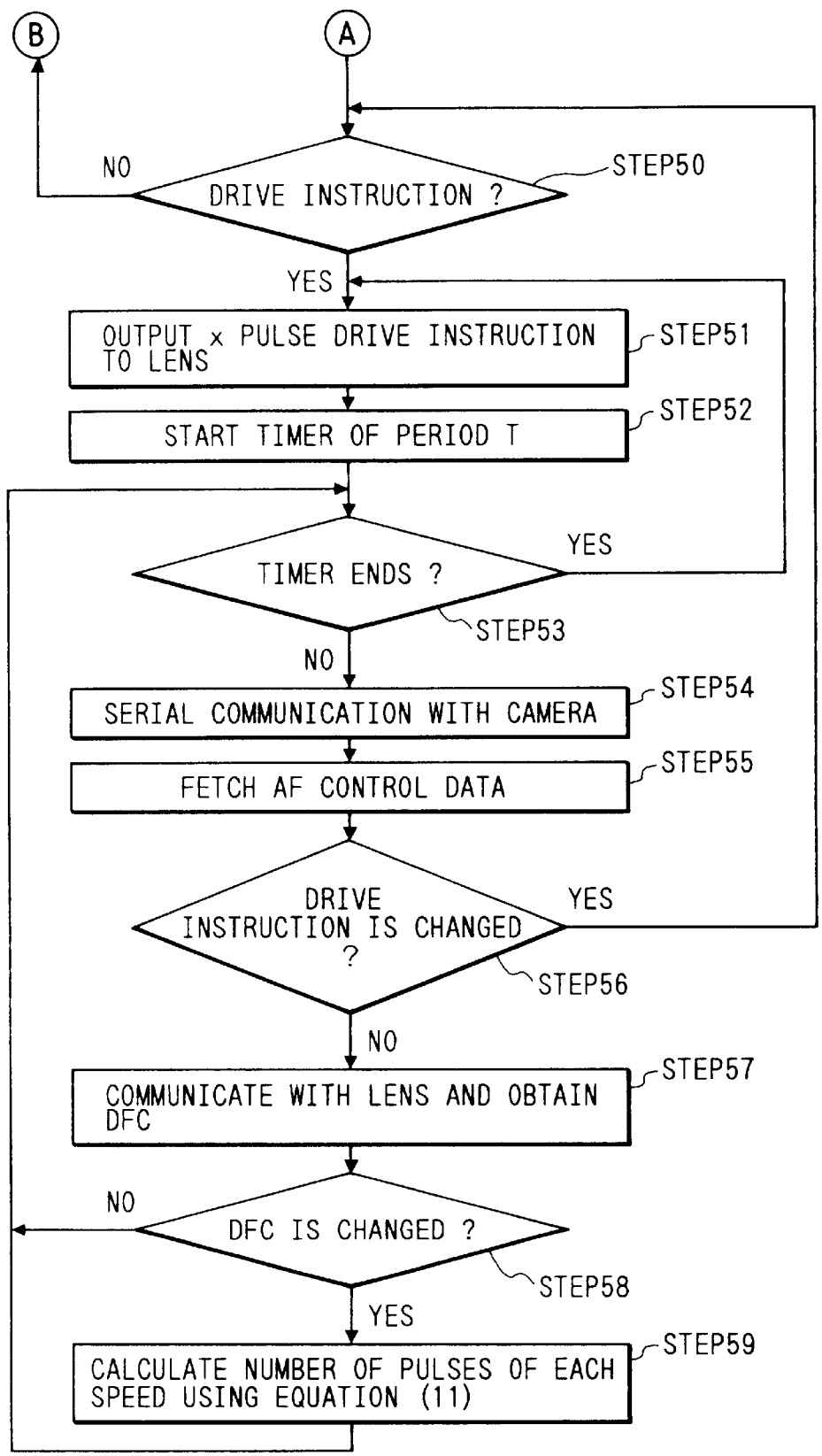
FIG. 15 is a flow chart showing processing of a conversion microcomputer according to fifth and sixth embodiments of the present invention.

Referring to FIG. 15, in step S41, initial processing such as clearing of the internal RAM and setup of various internal states and input/output ports is performed.

Data F, DFC, and FLK are obtained from the lens in steps 42, 43, and 44. A code corresponding to each data request command is converted into serial data and is sent to the lens in the form of serial communication. Each data sent back from the lens is converted into parallel data, thereby obtaining the data F, DFC, and FLK. In step 45, a value of the data Vn corresponding to each control speed is obtained. This value may be obtained by an arithmetic operation. Alternatively, since the speed value can be regarded as a constant, a value calculated beforehand may be stored in the form of a table in the microcomputer, and may be selectively utilized.

A drive period is fixed (e.g., 48 msec) on the basis of the data obtained in steps 42 to 45, and the constant C and the number x of pulses to be actually sent to the lens are calculated in accordance with equations (10) and (11) in steps 46 and 47.

Serial communication with the camera is performed in step 48. In practice, in this serial communication, the camera side serves as a master, and, for example, external interrupt processing is performed in the conversion microcomputer. Since this does not change the contents of the present invention, the above expression form is employed for the illustrative convenience. In step 49, the content of the serial communication is converted into parallel data, so that AF control data can be extracted.

It is decided in step 50 whether the input AF control instruction is a drive instruction for actually driving the motor. If NO in step 50 (e.g., a stop instruction), the flow returns to step 48. However, if it is decided in step 50 that the input AF control instruction is a drive instruction, processing from step 51 is performed. Alternatively, the number of pulses corresponding to the drive instruction speed data of the numbers of pulses obtained in step 59 is outputted in the form of a focusing motor drive instruction to the lens in step 51.

More specifically, the code and the number of drive pulses corresponding to the focusing motor drive command are converted into serial data and sent to the lens in the form of serial communication.

A repetition drive period generation timer is started in step 52. The end of this timer is checked in step 53 (the next drive pulse output timing). If the timer is ended, the flow returns to step 51 to output drive pulses to the lens again. However, if the timer is not ended, a command from the camera is checked in steps 54 and 55. When the drive instruction is changed in step 55, the flow returns to step 50 to change the number of pulses, and the updated drive instruction is sent to the lens again. When the drive instruction is not changed, communication with the lens is performed in step 57 to obtain a DFC value. This value is compared with the present value in step 58. If no change is detected, the flow returns to step 53 to continuously check the timer. However, when a change is detected, the number of pulses of each speed is calculated in accordance with equation (11) in step 59. The end of the drive period is confirmed in step 58, and the flow returns to step 51. A drive instruction representing an updated number of pulses is outputted to the lens in step 51.

Various control operations between a camera and a lens having a control system different from that of the camera can be performed. For example, a still camera lens unit having an AF system different from that of the interchangeable lens type video camera can be connected to this interchangeable lens type video camera. When viewed from the video camera, the still camera interchangeable lens group can be operated as if it is a video movie interchangeable lens group, thereby eliminating a difference between the still and video camera interchangeable lens groups. In addition, the still camera interchangeable lens group can be operated as if it can process data from a still camera. Any change need not be performed in the lens group.

In each embodiment described above, control data transmitted from the camera side to the lens side through the conversion adapter is data associated with the number of drive pulses for the pulse motor in the lens unit. The drive period T of the pulse motor in the lens unit is kept constant and the number x of pulses is set variable to control the speed. However, the drive period T may be set variable while the number x of pulses may be kept constant, thereby performing speed control. The sixth to eighth embodiments using the latter method will be described below.

When the number x of drive pulses is kept constant in equation (8), a drive instruction is supplied to the lens so that the lens is driven at the period T, as indicated by equation (9') so as to obtain pseudo speed data suitable for the lens side.

$$T = (x \times DFC \times FLK)/(Vn \times F) \qquad (9')$$

When an AF control command is sent from the camera side, a conversion microcomputer 233 causes an operation means 235 to calculate the drive period. That is, when an AF control command is sent from the camera side, the conversion microcomputer 233 causes the operation means 235 to perform a calculation using equation (9'). A constant number of drive pulses is transmitted to the lens side within the drive period.

When the lens drives the pulse motor using the constant number of drive pulses on the basis of this data, a focusing lens unit 202 can be driven by an amount required on the camera side.

Figure 16:
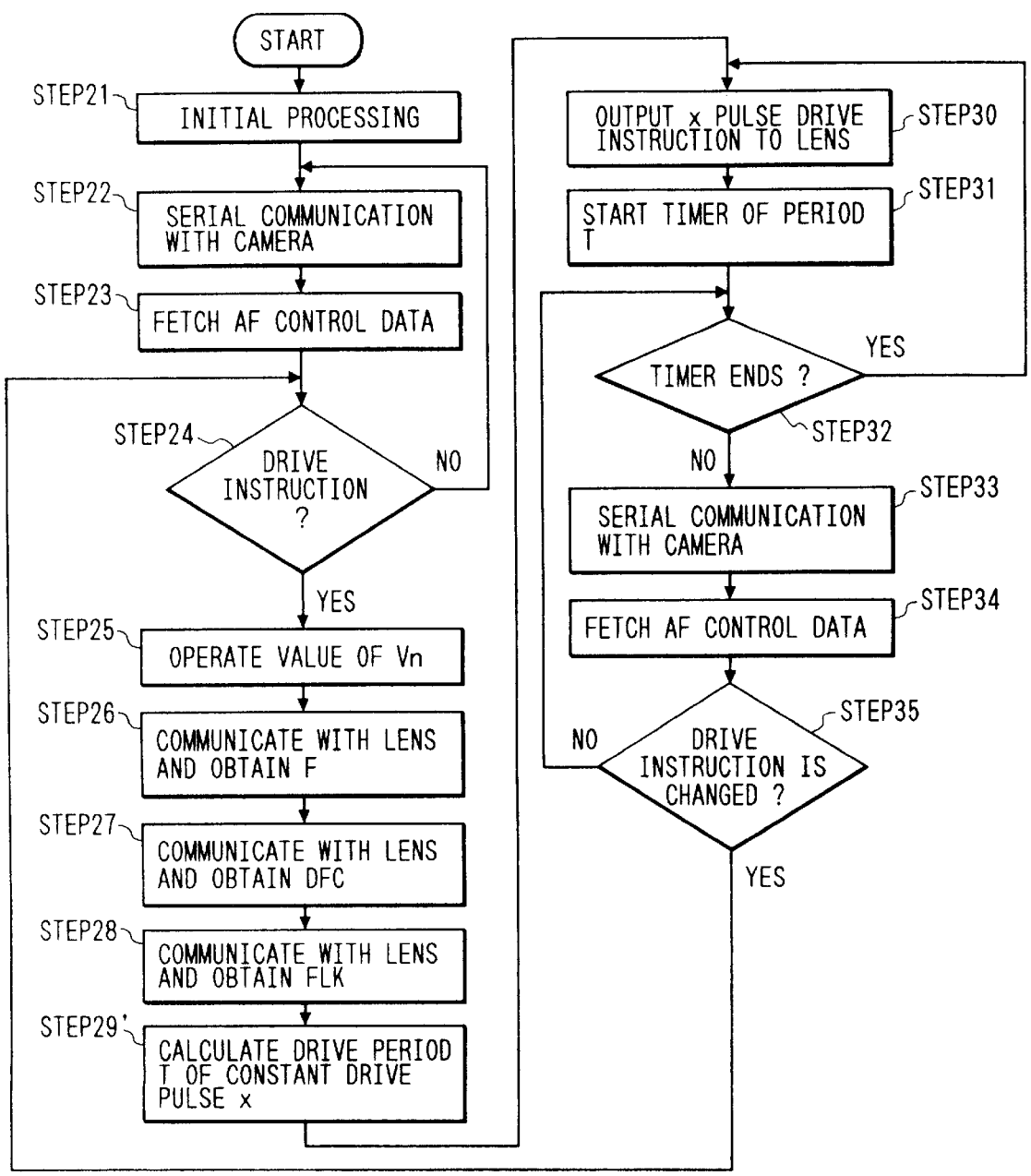
FIG. 16 is a flow chart showing processing of a microcomputer in a conversion adapter according to the sixth embodiment of the present invention.

FIG. 16 is a flow chart showing processing operations in the sixth embodiment. The basic operations of this flow chart are substantially the same as those of the flow chart in FIG. 13, except that the number of drive pulses is set variable while the drive period is kept constant in the third to fifth embodiments in drive speed control of the pulse motor on the lens side, but the number of pulses is kept constant and the drive period is set variable in the sixth embodiment. The same processing steps in the sixth embodiment denote the same step numbers as in the previous embodiments.

In the flow chart of FIG. 16, communication between the camera microcomputer and the conversion adapter microcomputer is started. In step 25, a speed Vn corresponding to a control instruction speed (n) from the camera side is calculated in step 25. After data F, DFC, and FLK are obtained in steps 26 to 28, a speed is calculated in step 29' under the condition that the number of drive pulses is kept constant (e.g., three pulses) and a drive period T to be actually transmitted to the lens side is calculated using equation (9'), unlike in the above embodiment.

Data representing the constant number of pulses (x=3 in this embodiment) is outputted to the lens in the form of a focusing motor drive instruction in step 30. More specifically, a code and the number of drive pulses corresponding to the focusing motor drive command are converted into serial data and sent to the lens in the form of serial communication.

In step 31, the timer is started by the drive period calculated in step 30. The end of the timer is checked in step 32 (the next drive pulse output timing). If the timer is not ended, the command from the camera is checked in steps 33 and 34. If the drive instruction is not changed in step 35, the flow returns to steps 32 to continuously check the timer. However, when the drive instruction is changed in step 35, the flow returns to step 24 to calculate a drive period again.

The seventh embodiment of the present invention will be described below. In the above embodiment, the number of pulses is calculated by the operation means 235. However, in this embodiment, the number of drive pulses is calculated by the data conversion means 234.

More specifically, the arithmetic operations of the above embodiment performed every time a drive command is supplied from the camera are disadvantageous in view of processing capacity. A conversion table corresponding to the data conversion means 234 is prepared to cope with the data conversion means 234. An example of the conversion table is shown in FIG. 17.

In this table, the constant number of pulses is x=3, DFC=2.5, a minimum F-number, i.e., F=3.51, and Vn=2 (n/2−5). A drive period T obtained upon a change in FLK is calculated by equation (9') in advance, and the calculated value is stored in a table. A plurality of such tables are prepared in the DFC and F ranges, and an appropriate table is selectively used in accordance with data from the lens to obtain a necessary drive pulse period. The subsequent processing is the same as that of the embodiment described above, and a detailed description thereof will be omitted.

An operation for calculating the drive period using an operation means 235 and a data conversion means 234 according to the eighth embodiment of the present invention will be described below.

The conversion table in this embodiment is effective when the data from the lens fall within a relatively narrow data range as in the fifth embodiment. If the range of data obtained from various lenses is broad, the table volume is increased to undesirably increase the capacity of the memory of the microcomputer. For this reason, data in equation (9') is divided into constant data and variable data with respect to a lens state. The operation of the constant data with respect to the lens state is performed in the initial operation, and the results are formatted in a table stored in the microcomputer. A further operation is performed using the table data and the variable data in accordance with a changed lens state. This principle is substantially the same as that of the fifth embodiment, and a detailed description thereof will be omitted.

In equation (9'), the F and FLK are the constant data, and the data DFC is the variable data. Since the drive period is set variable while the number of drive pulses x is set constant, the number x of drive pulses can be regarded as a constant. Since the data Vn is defined as a speed determined by a format, speeds ranging from V0 to V15 can be regarded as constants. As a result, a constant C' as in equation (10') is calculated in advance and is stored in the microcomputer. Every time the data DFC is changed, a calculation given by equation (11') for the speed Vn is performed. The result is stored as a speed table in the microcomputer. When a drive command is supplied from the camera, the table data is referred to every drive period T', and a drive instruction for the lens is outputted.

The basic algorithm of processing in the conversion microcomputer is equal to that in the flow chart in FIG. 15 except that in this arithmetic processing, equations (9'), (10'), and (11') are used in place of equations (9), (10), and (11) used in steps 46, 47, and 49, the drive period is set variable while the number x of drive pulses is kept constant. This embodiment will be described with reference to the flow chart in FIG. 15.

$$C'=(x \times FLK)/F \quad (10')$$

$$T'=C \times DFC/Vn \quad (11')$$

Referring to FIG. 15, initial processing is performed in step 41, data F, DFC, and FLK are obtained from the lens in steps 42, 43, and 44, respectively. A value of the data Vn corresponding to each control speed is obtained in step 45 in accordance with these input data. However, this value may be obtained by an arithmetic operation. Alternatively, since this value is regarded as a constant, data stored in the form of a table in the microcomputer may be utilized.

The number of drive pulses is fixed on the basis of the data obtained in steps 42 to 45 (e.g., three pulses). The constant C' and the number x of drive pulses to be actually transmitted to the lens are calculated in accordance with equations (10') and (11') in steps 46 and 47, respectively. Serial communication with the camera is performed in step 48. AF control data is extracted from the content of the serial communication in step 49.

It is decided in step 50 whether the input AF control instruction is an instruction for actually driving the motor. If NO in step 50 (e.g., a stop instruction), the flow returns to step 48. However, if YES in step 50, processing from step 51 is performed.

In step 51, the constant number x of drive pulses is outputted to the lens in the form of a focusing motor drive instruction. More specifically, a code and the number of drive pulses corresponding to the focusing motor drive command are converted into serial data and sent to the lens in the form of serial communication. In step 52, the drive period generation timer is started on the basis of the drive period corresponding to the speed data of the drive instruction and selected from the drive periods T' obtained in step 47 or step 50 using equation (11').

In step 53, the end of this time is checked (i.e., the next drive pulse output timing). If the timer is ended, the flow returns to step 51 to output the drive pulses (x=3) to the lens again. However, if the timer is not ended, the command from the camera is checked in steps 54 and 55. If the drive instruction is changed in step 55, the flow returns to step 50 to change the drive period T', and a drive instruction is outputted again to the lens. However, if the drive instruction is not changed, communication with lens is performed in step 57 to obtain a DFC value. This value is compared with the current value in step 58. If the value is not changed, the flow returns to step 53 to continuously check the timer. However, if the value is changed, a speed drive period T' is calculated again in accordance with equation (11'). After the end of the S drive period is checked in step 53, and the flow returns to step 51 to output a drive instruction to the lens at the updated drive period.

As in each embodiment as described above, various control operations between a camera and a lens having a control system different from that of the camera can be performed. For example, a still camera lens unit having an AF system different from that of an interchangeable lens type video camera can be connected to this interchangeable lens type video camera, and the still camera lens unit can be operated as in the video movie interchangeable lens group.

In each embodiment described above, the speed data from the camera side can be converted into a drive signal for driving the lens pulse motor through the conversion adapter and is supplied to the lens side.

When a drive instruction is to be actually outputted to the lens, a so-called duty drive system is employed in which the number x of pulses is outputted within a period T, and this operation is repeated to realize average speed control since the lens includes a pulse motor so as to execute the speed instruction from the camera. This duty driving includes the following two systems, as is apparent from the above description:

(A) a constant drive period system in which the period T is kept constant and the number x of pulses is changed to change the speed; and (B) a constant pulse count drive system in which the number x of pulses is kept constant and the period T is changed to change the speed.

These two drive systems correspond to a constant drive period-variable ON period system and a constant ON period-variable drive period system in duty driving of a DC motor or the like, respectively. The constant drive period-variable ON period system and the constant ON period-variable drive period system are shown in FIG. 18. The features of the above drive systems are apparent from FIG. 18. The drive system A in FIG. 18 has pulse trains x1 and x2 each having a predetermined number of pulses and periods T1 and T2. The pulse train widths are given as ON times Ton1 and Ton2 upon duty driving of a DC motor.

In the constant drive period-variable pulse count system A, speed data from the camera is converted into the number of drive pulses for actually driving the pulse motor in the lens in accordance with equations (10) and (11), and the converted data are transmitted to the lens side.

In a constant pulse count-variable drive period system B, speed data from the camera is converted into the number of pulses for actually driving the pulse motor in the lens in accordance with equations (10') and (11').

FIG. 19 shows drive speeds obtained by equations (10) and (11) in which the drive period is set constant (T=4.8 sec) and equations (10') and (11') in which the number x of drive pulses is set as x=3. Referring to FIG. 19, ① to ④ are obtained when different DFC, FLK, and F values are set. V0 to V15 are sixteen speed signals from the camera side. In ① to ④, the upper rows the numbers of pulses when the drive period is kept constant, and the lower rows represent periods when the number of pulses is kept constant.

When the system A is used, some numbers x of pulses at low speeds (V0 side) are less than 1. Decimal parts of the numbers x of pulses are error factors which cannot contribute to actual driving. The number of pulses in the range of speeds V0 to V3 is less than one. Even if these values are rounded, the number of pulses in the range of V0 to V1 is zero, and the number of pulses in the range of V2 to V5 is one. This indicates that the drive pulse is not actually outputted in the speed range of V0 to V1, and the same speed is set in the range of V2 to V5. That is, in the system A, lower speeds cannot be set. On the other hand, when the system B is used, the above problem occurred in the system A can be solved in the system B. However, times corresponding to the values at high speeds (V15 side) are very short. A pulse motor generally requires a relatively short drive time, but must have a certain length of time for driving. For this reason, high speeds cannot be obtained.

The object of the ninth object of the present invention is to solve the above problems and provide duty driving means capable of performing control at both high and low speeds. There is disclosed an interchangeable lens type camera system and a conversion adapter wherein the constant pulse count drive system B is used at low speeds, and the constant drive period system A is used at high speeds, so that duty control can be performed at both high and low speeds, thereby realizing a smooth AF operation.

Processing in the conversion adapter according to this embodiment will be described with reference to a flow chart in FIG. 20.

Figures 20, 20A:
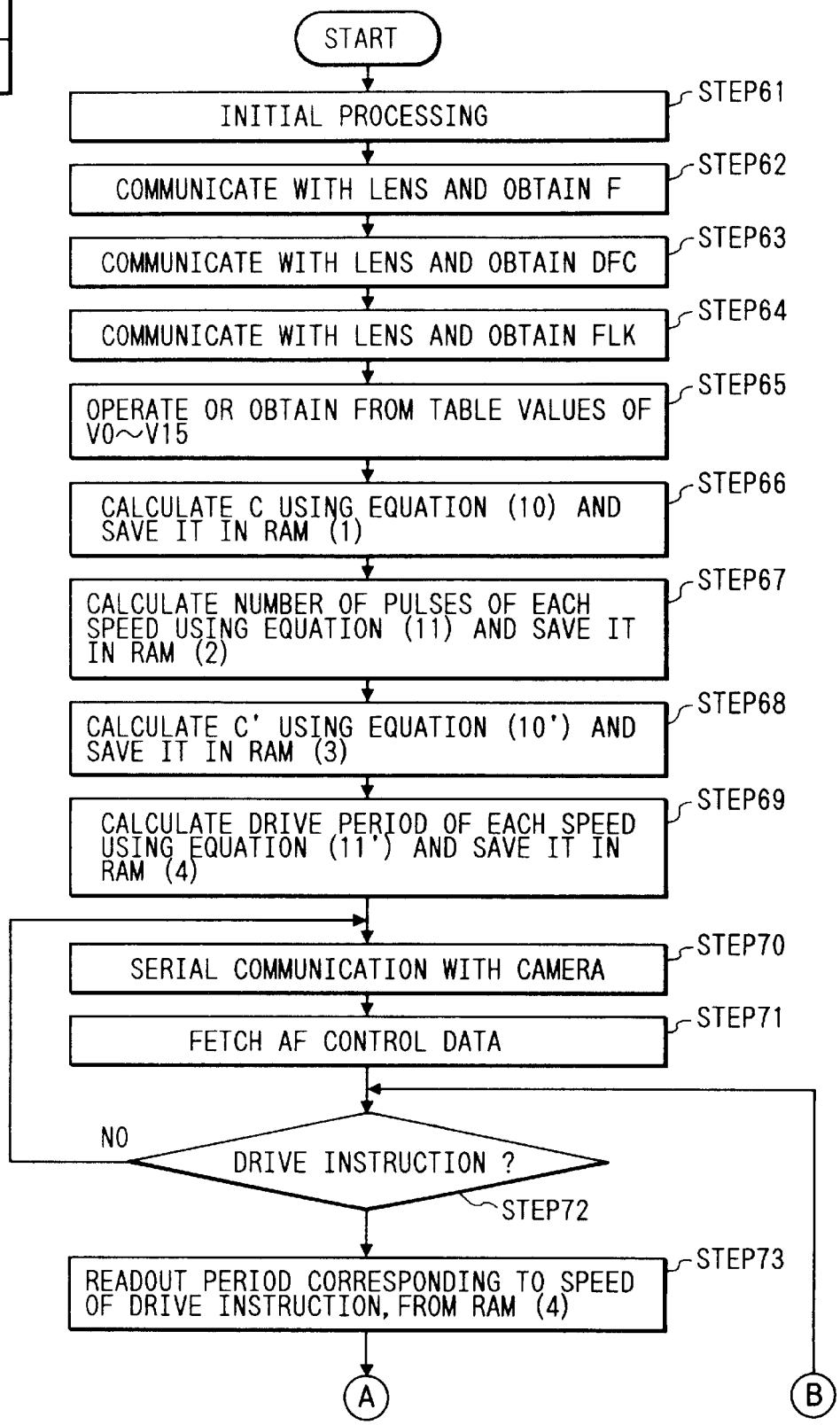
FIG. 20 is a flow chart showing an operation of the ninth embodiment of the present invention.
Figure 20B:
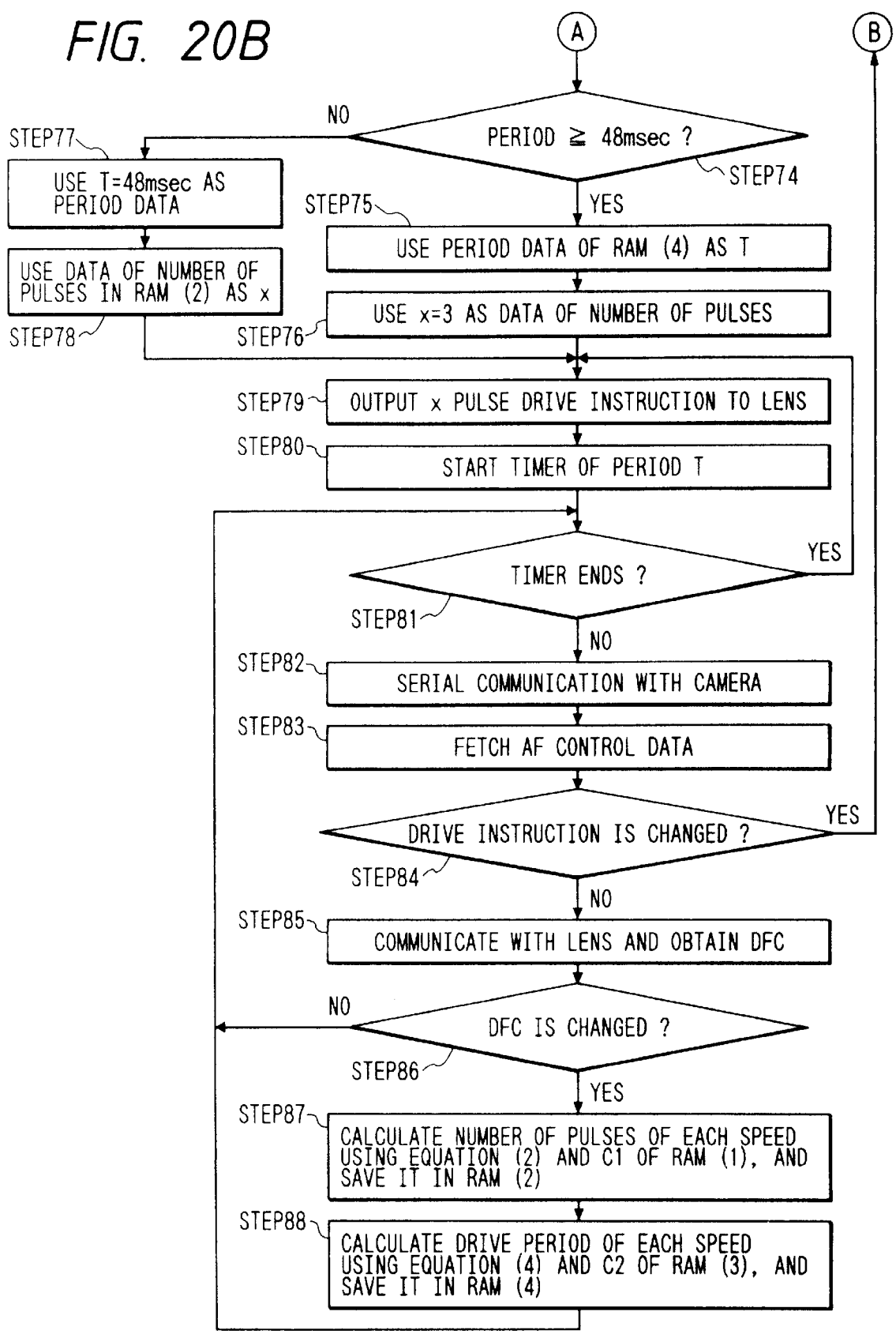

Referring to FIG. 20, when the control flow is started, initial processing such as clearing of the internal RAM in the conversion microcomputer, and setup of various internal states and input/output ports is performed in step 61. In steps 62, 63, and 64, data of a minimum F-number F, a focusing lens extension amount and defocus coefficient DFC, and a focusing lens extension amount FLK for one pulse of the focusing pulse motor from the lens are obtained. More specifically, a code corresponding to each data request command is converted into serial data and sent to the lens in the form of serial communication. Each data from the lens is converted into parallel data, thereby obtaining the data F, DFC, and FLK.

In step 65, a value of the speed Vn corresponding to each control speed is obtained. This value may be arithmetically obtained. Alternatively, a value calculated beforehand may be stored in the form of a table in the microcomputer, and the stored data may be utilized. A value C in equation (10) is obtained in step 66 on the basis of the data obtained in steps 62 to 65 and is stored in a RAM (1). In step 67, the number x of drive pulses at each speed for the drive period T=4.8 msec is obtained and is stored in an area represented by a RAM (2).

A value C' in equation (10') is obtained in step 68 on the basis of the data obtained in steps 62 to 65 and is stored in a RAM (3). In step 69, a drive period T(n) (msec) at each speed for the number x of pulses (x=3) is obtained. The drive periods T(n) are stored in the area represented by a RAM (4). The number of pulses is kept to be three to minimize a phenomenon in which a smaller number of pulses adversely affects rounding to result in identical speeds although drive speeds represented by instructions from the camera are different from each other.

Serial communication with the camera is performed in step 70. In practice, in this serial communication, the camera side serves as a master, and, for example, external interrupt processing is performed in the conversion microcomputer. Since this does not change the contents of the present invention, the above expression form is employed for illustrative convenience. In step 71, the content of the serial communication is converted into parallel data, so that AF control data can be extracted. It is decided in step 72 whether the input AF control instruction is a drive instruction for actually driving the motor. If NO in step 72 (e.g., a stop instruction), the flow returns to step 70. However, if it is decided in step 72 that the input AF control instruction is a drive instruction, processing from step 73 is performed. A drive period obtained in step 69 or in step 83 (to be described later) and corresponding to a speed represented by the drive instruction in step 73 is read out from the RAM (4).

It is decided in step 74 whether the readout period is equal to or longer than 48 msec. If YES in step 74, the constant drive pulse count mode B is set. More specifically, the speed drive period read out in step 73 is set to an actual drive period in steps 75 and 76. The drive pulses outputted every drive timing are given as the number of pulses as x=3, and the flow advances to step 79.

However, if NO in step 74, the constant drive period mode A is set. More specifically, the constant data (T=48 msec) is used as the period data in steps 67 and 68. The number of drive pulses outputted every drive timing is the number of pulses obtained in step 67 or in step 87 (to be described later) and the corresponding speed represented by the drive instruction is read out from the RAM (2). In step 79, the number of drive pulses obtained in the above step is outputted to the lens in the form of a focusing motor drive instruction. More specifically, a code and the number of drive pulses corresponding to the focusing motor drive command is converted into serial data and sent in the form of serial communication.

In step 80, a drive period generation timer is started on the basis of the drive period obtained in the above step. The end of this timer is checked in step 81 (i.e., the next drive pulse output timing). If the timer is ended, the flow returns to steps 79, and the drive pulses are outputted to the lens. When the timer is not ended, the command from the camera is checked in steps 82 and 83. If the drive instruction is changed in steps 84, the flow returns to step 72 to update the drive period. The updated drive instruction is outputted to the lens. However, if the drive instruction is not changed, communication with the lens is performed in step 85 to obtain a DFC value. This value is compared with the current value in step 86. If the value is not changed, the flow returns to step 81 to continuously check the timer. However, if the value is changed, the number of drive pulses and a drive pulse at each speed are calculated in steps 87 and 88 by equations (10) and (11) using values C1 and C2 stored in the RAM (1) and the RAM (2). The calculated values are saved in the RAM (2) and the RAM (4) again. After the end of the drive period is confirmed in step 221, the flow returns to step 79 to output a drive instruction to the lens at a new drive period.

As described above, by using the conversion adapter having the conversion means according to this embodiment, good AF control can be performed when a still camera system interchangeable lens group is connected to a camera of a video movie interchangeable lens system.

As described above, for example, a still camera lens is mounted on a video camera having a format different from that of the still camera lens, the conversion means of the present invention or the conversion adapter serving as the conversion means is used to perform the same control as in mounting of the video lens unit in the video camera system such that good AF control can be performed when a still camera system interchangeable lens is connected to the video camera system of the video movie interchangeable lens system.

The tenth embodiment of the present invention will be described below. This embodiment aims at performing good AF control in a conversion adapter for an interchangeable lens system so as to eliminate variations in AF control for various types of interchangeable lenses. A signal conversion means for converting an AF control signal transmitted from a video camera to the conversion adapter into an AF control signal capable of controlling (driving) a still camera interchangeable lens group has a correction means for correcting a maximum defocus amount for one pitch of the lens. In the video camera, speed control of lenses having similar optical characteristics and almost the same changes in correction amounts can be efficiently performed to obtain a desired control speed. Variations in AF control performance by the lens can be suppressed, and good AF control can be performed. Therefore, good AF control can be uniformly performed for various types of interchangeable lenses.

Figure 21:
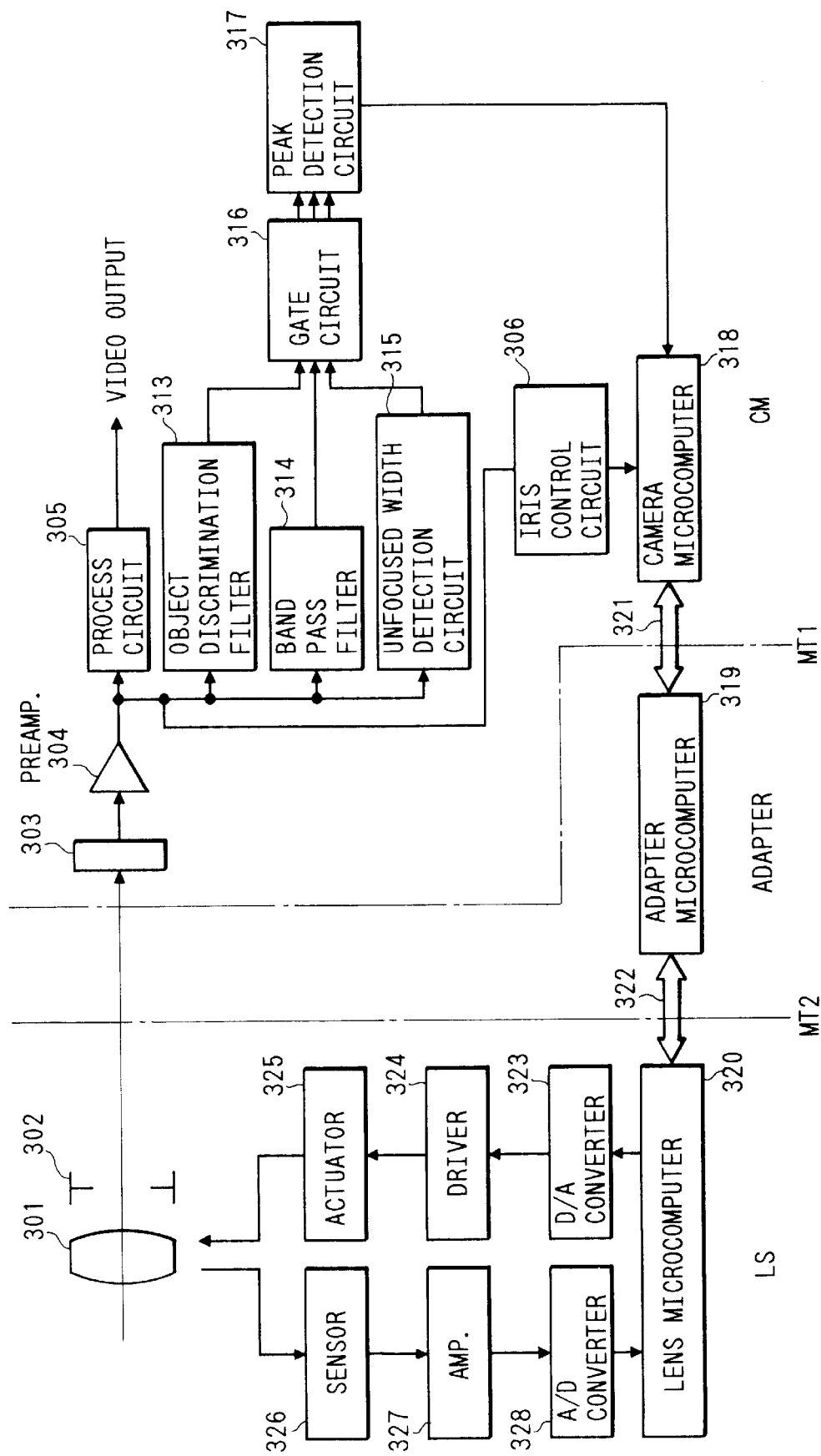
FIG. 21 is a block diagram showing an arrangement of an interchangeable lens system in a video camera.

FIG. 21 is a basic block diagram of a system in which a still camera lens unit is connected to a video camera through a conversion adapter.

Referring to FIG. 21, right, left, and central portions with respect to boundaries as mount units MT1 and MT2 represented by alternate long and short dashed lines are respectively a camera unit CM, a lens unit LS, and an adapter between the camera unit and the lens unit.

The conversion adapter is connected between the camera unit and the lens unit in consideration of an optical. The conversion adapter converts data exchanged between the camera and lens in a controllable form. The conversion adapter corrects the data as needed and can control the camera and the lens through data communication lines 321 and 322.

This system includes a photographic lens system 301, a diaphragm (iris diaphragm) 302, an image pickup element 303, a preamplifier 304, and a process circuit 305. The photographic lens system 301 includes a focusing lens for performing focus control (to be referred to as a focusing lens 301 hereinafter). The diaphragm 302 controls an amount of incident light. The image pickup element 303 such as a CCD photoelectrically converts an object image focused on the image pickup surface by the focusing lens 301 into an image pickup image. The preamplifier 304 amplifies the image pickup signal outputted from the image pickup element 303 to a predetermined level. The process circuit 305 performs signal processing (e.g., gamma correction, blanking processing, addition of a sync signal) of the image pickup signal outputted from the preamplifier 304 and outputting a standardized television signal from a video output terminal. The television signal outputted from the video output terminal is supplied as a video output to a video recorder (not shown) or an electronic viewfinder.

An object discrimination filter 313 is set to discriminate the magnitude of contrast of an object from the video signal outputted from the preamplifier 304. A band pass filter 314 extracts a necessary high-frequency component for performing focused state detection from the video signal outputted from the preamplifier 304. An unfocused width detection circuit 315 detects an unfocused width (i.e., a width of an edge portion of the object) of the object image from the video signal. The unfocused width detection circuit 315 performs focused state detection by utilizing a feature wherein the unfocused width of the object is decreased in a nearer focused state. A method of performing focused state detection by the unfocused width detection circuit is described in Japanese Laid-Open Patent Application No. 62-103616, and a detailed description thereof will be omitted.

A gate circuit 316 gates outputs from the object discrimination filter 313, the band pass filter 314, and the unfocused width detection circuit 315 and filters only a signal corresponding to a designated area on the image pickup area. The gate circuit 316 gates only the signal corresponding to the designated area from a one-field video signal in response to a gate pulse supplied from a camera microcomputer 318 (to be described in detail later), and an area from which a high-frequency component is to be extracted, i.e., a focused state detection area in which a focused state is to be detected, can be set at an arbitrary position within the image pickup surface.

A peak detection circuit 317 detects horizontal and vertical positions (within the image pickup surface) of a peak value of the high-frequency component from the video signal corresponding to the focused state detection area extracted by the gate circuit 316. The peak position detection circuit 317 detects a specific one of a predetermined number of blocks to which the peak position detected within the one-field period belongs. The blocks are obtained by dividing the focused state detection area in the horizontal and vertical directions. The peak position detection circuit 317 outputs horizontal and vertical coordinates of the detected peak position.

The camera microcomputer 318 performs focused state detection of the object on the basis of the video signal corresponding to the set focused state detection area and performs focus control. That is, the camera microcomputer 318 fetches unfocused width data supplied from the unfocused width detection circuit 315 and high-frequency component peak value data supplied from the band pass filter 314 and transmits, to an adapter microcomputer 319 through the mount unit MT1, a focus control instruction (e.g., rotational direction and speed of a focusing motor, and its rotation/stop) for driving the focusing lens 301 to a position where the unfocused width within the one-field period is minimized and the peak value of the high-frequency component within the one-field period is maximized.

At this time, the camera microcomputer 318 calculates a depth of field on the basis of an F-number and focal length data of the lens from the adapter microcomputer 319 and outputs a focus control instruction.

The adapter microcomputer 319 transmits the focus control instruction from the camera microcomputer 318 to a lens microcomputer 320, converts data in a controllable from, and transmits the converted data to the lens microcomputer 320 through the mount unit MT2. At this time, a focus control instruction corrected on the basis of the lens data from the lens microcomputer 320 is transmitted as needed.

In the lens microcomputer 320, the focus control instruction from the adapter microcomputer 319 is converted into an analog signal by a D/A converter 323, and the analog signal is supplied to an AF driver 324. The focusing lens 301 is controlled through a focus actuator 325. A driving result is detected by a sensor 326 and is converted into a digital signal by an A/D converter 328 through a sensor amplifier 327. The digital signal is then supplied to the lens microcomputer 320. This status data is supplied from the lens microcomputer 320 to the camera microcomputer 318 through the adapter microcomputer 319.

Even if a still camera system interchangeable lens is mountable through the conversion adapter, the still camera lenses include a wide-angled lens, a normal lens, a telephoto lens, a micro lens, and a soft focus lens, which lenses have a single-focal length or a variable focal length as in a zoom lens. In AF control of these lenses, the focusing lens is operated at each calculated speed, the actual speed of the lens may often be different from the designated speed, thereby posing the following problems.

(1) A control speed may be excessively high depending on the types of lenses, and the focusing lens is not stable at the near focused point, thereby causing hunting.

(2) A control speed may be excessively low depending on the types of lenses, and an operation for obtaining a focused state is time-consuming, or a focused state cannot be obtained.

(3) Although control speeds from a much unfocused state to a nearly focused state are appropriate, a control speed in the nearly focused state may be excessively high, thus causing hunting.

(4) Although a control speed at the nearly focused point is appropriate, control speeds from the much unfocused state to the nearly focused state are excessively low, a focused state may not be obtained.

(5) It is not practical to perform different control operations for various types of lenses.

The tenth embodiment of the present invention has been made to solve the above problems and to provide an interchangeable lens system capable of detachably mounting a lens unit on a camera body, comprising data conversion means for converting focus control data outputted from the camera body to drive a focusing lens into data capable of driving the focusing lens in the lens unit, the data conversion means being provided with correction means for performing correction in accordance with a maximum defocus amount for one drive pitch of the focusing lens, that is, comprising the data conversion means for converting the focus control data outputted from the camera body to drive the focusing lens into the data capable of driving the focusing lens in the lens unit, the data conversion means having the function of performing correction in accordance with the maximum defocus amount for one drive pitch of the focusing lens.

By the function of this correction means, speed control of lenses having similar optical characteristics and almost the same changes in correction amounts can be efficiently performed to obtain a desired control speed. Variations in AF control performance by the lens can be suppressed, and good AF control can be performed.

The tenth embodiment of the present invention will be described below.

Figure 22:
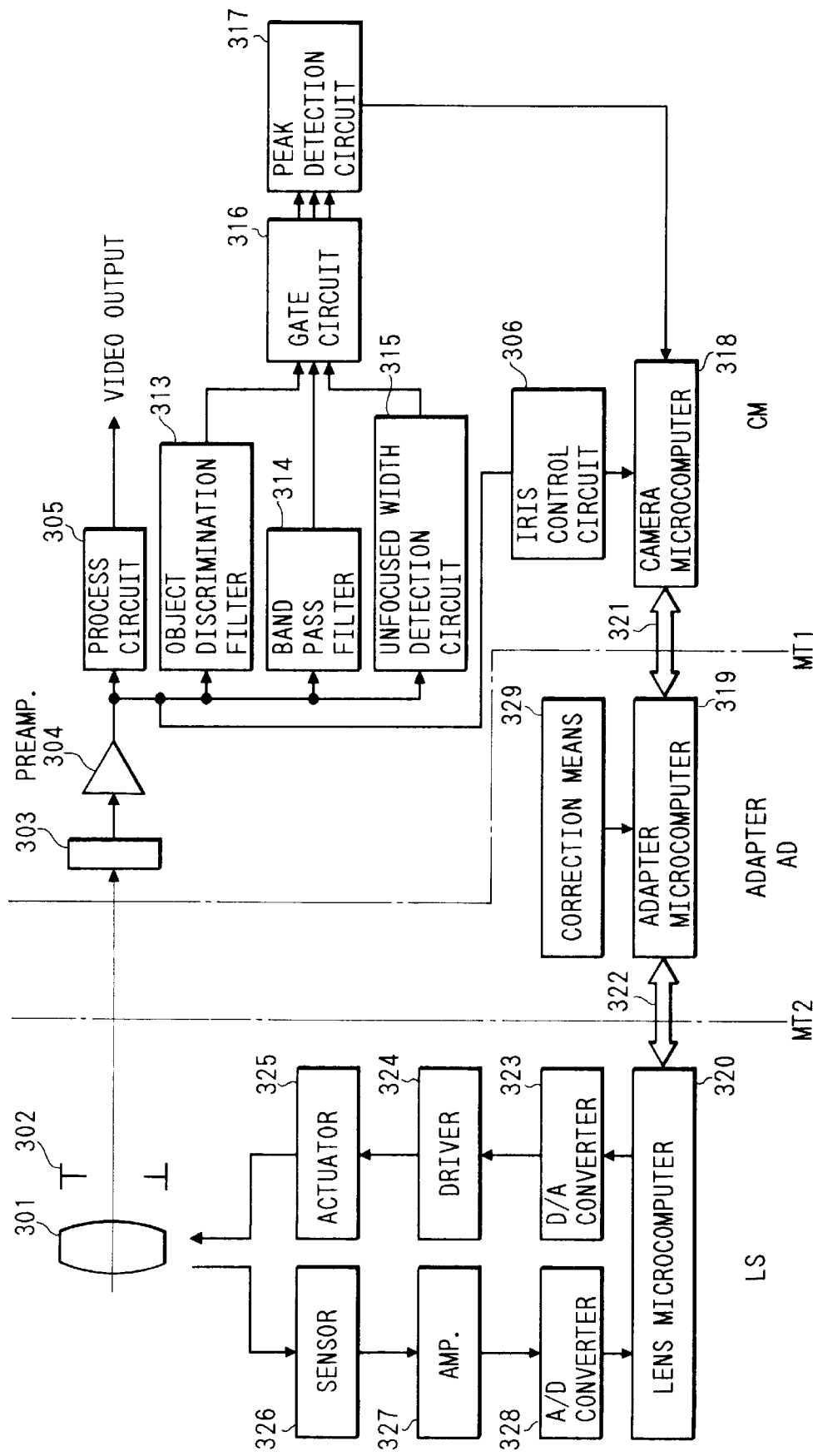
FIG. 22 is a block diagram showing an arrangement of an adapter apparatus in the interchangeable lens system according to the present invention.

FIG. 22 is a block diagram in which a still camera lens unit is connected to a video camera using a conversion adapter according to the present invention. The same reference numerals as in FIG. 21 denote the same parts in FIG. 22, and a detailed description thereof will be omitted.

Right, central, and left portions with respect to boundaries as mount portions MT1 and MT2 represented by alternate long and short dashed lines are respectively a camera unit CM, a conversion adapter AD, and a lens unit LS. The camera unit CM, the conversion adapter AD, and the lens unit LS comprise microcomputers 318, 319, and 320, respectively, as in FIG. 21.

The adapter microcomputer 319 converts a focus control instruction transmitted from the camera microcomputer 318 through the mount unit MT1 into data capable of being decoded and controlled in the lens microcomputer 320. The adapter microcomputer 319 transmits the resultant data to the lens microcomputer 320 through the mount unit MT2. At this time, a correction means 329 performs necessary correction on the basis of the lens data outputted from the lens microcomputer 320, thereby transmitting the focus control instruction.

In the lens microcomputer 320, the focus control instruction from the adapter microcomputer 319 is converted into an analog signal by a D/A converter 323, and the analog signal is supplied to an AF driver 324 to control a focusing lens 301 through a focus actuator 325. A driving result is detected by a diaphragm sensor 326 and is converted into a digital signal by an A/D converter 328 through a sensor amplifier 327. The digital signal is supplied to the lens microcomputer 320.

The role of the adapter microcomputer 319 in the conversion adapter and data conversion are substantially the same as in the conversion microcomputer 233 of the third embodiment, and operations as described on pages 49 to 52 are performed. The number x of pulses per unit driving for nullifying the maximum diameter of the circle of confusion can be obtained by equation (7). By rewriting equation (7), the speed Vn represented by equation (8) can be obtained.

Equation (8) is a relation between normalized speed data supplied from the video camera and drive data supplied to the lens. In order to obtain a pseudo speed supplied from the camera while the number of drive pulses is fixed in equation (8), a drive instruction is supplied to the lens so that the lens is driven at the period T represented by equation (9') of the sixth embodiment.

According to the present invention, data in equation (9') is divided into constant data and variable data with respect to a lens state. The operation of the constant data with respect to the lens state is performed in the initial operation, and the results are formatted in a table stored in the adapter microcomputer. A further operation is performed using the table data and the variable data in accordance with a changed lens state, thereby simplifying the arithmetic operations and increasing the operation speed.

In equation (9'), the F and FLK are the constant data, and the data DFC is the variable data. Since the drive period is set variable while the number of drive pulses x is set constant, the number x of drive pulses can be regarded as a constant. Since the data Vn is defined as a speed determined by a format, speeds ranging from V0 to V15 can be regarded as constants.

As a result, constants C' and T' as in equations (10') and (11') are calculated in advance and are stored in the microcomputer. Every time the data DFC is changed, a calculation given by equation (11') for the speed Vn is performed. The result is stored as a speed table in the microcomputer. When a drive command is supplied from the camera, the table data is referred to every drive period, and a drive instruction for the lens is outputted.

The above operations are performed by the conversion adapter apparatus. Arithmetic operations for converting the video camera drive signal from the camera side into a still camera lens drive signal can be performed in the same manner as in the third to ninth embodiments.

Figure 23B:
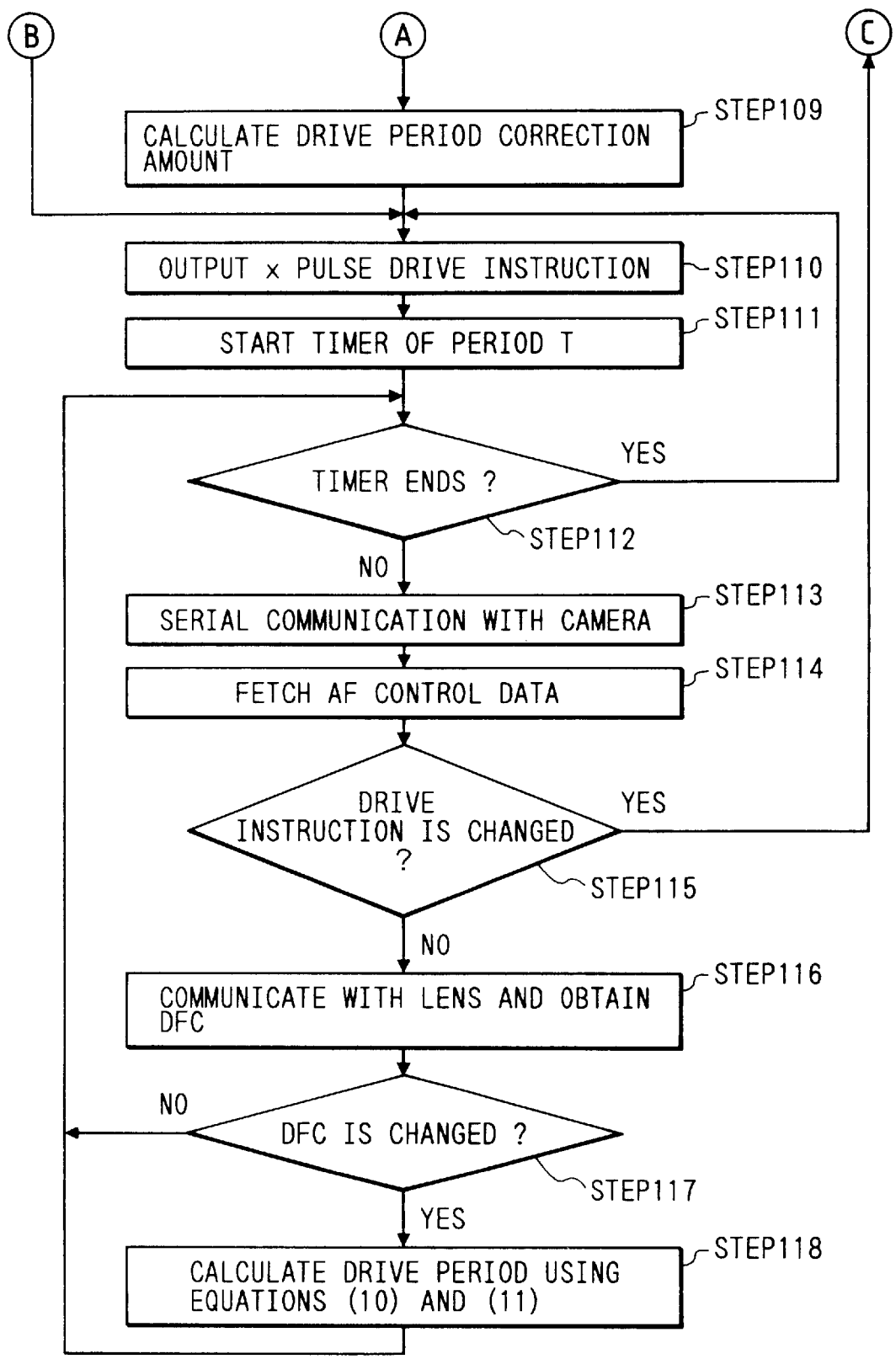
FIG. 23 is a flow chart showing a control operation of the adapter apparatus in the interchangeable lens system according to the present invention.

A control operation of the adapter microcomputer according to the present invention will be described with reference to a flow chart of FIG. 23.

When the flow is started, lens data is read through communication in step 101.

In step 102, a focusing lens drive speed for the lens side corresponding to a focus control instruction (speed instructions V0 to V15) from the camera is obtained on the basis of the above arithmetic operation or lens data from the conversion table so as to control the focusing lens. In step 103, a drive period T is obtained from equations (10') and (11').

When a focusing lens is actually operated at each speed obtained as described above, correction may often be required because the actual speed is different from the designated speed.

Correction operations performed for various types of lenses are not efficient in consideration of the microcomputer capacity.

According to this embodiment, a correction amount is determined by a maximum defocus amount for one pitch obtained in the process for obtaining the speed from the lens data. Lenses can be classified into groups each having the same change in correction amount for optical characteristics. Efficient correction can be performed for various types of interchangeable lens groups.

In step 104, the lenses are classified in accordance with the maximum defocus amount for one pitch, and a correction method corresponding to the predetermined maximum defocus amount for one pitch is selected.

In step 105, communication with the camera is performed. AF control data is extracted in step 106. It is decided in step 107 whether the input AF control instruction is a drive instruction for actually driving the motor. If NO in step 107, the flow returns to step 105. However, if YES in step 107, processing from step 108 is performed. It is decided in step 108 whether correction selected in step 104 is required on the basis of the AF control data. If correction is not required, the flow advances to step 110. However, if correction is required, a correction amount is calculated in step 109. Correction is performed by changing a drive period (a method of correcting the speed may also be performed by changing the number of drive pulses).

In step 110, the constant number of drive pulses is outputted in the form of a focusing motor drive instruction. More specifically, a code and the number of drive pulses corresponding to the focusing motor drive command are converted into serial data and sent to the lens in the form of serial communication.

A drive period generation timer is started in step 111 on the basis of a drive period corresponding to the speed of the drive instruction and selected from the drive periods obtained in step 103 or step 118 (to be described later).

The end of timer is checked in step 112 (i.e., the next drive pulse output timing). If YES in step 112, the flow returns to step 110 to output the drive pulses to the lens again.

If the timer is not ended, the command from the camera is checked in steps 115 and 114. If the drive instruction is changed in step 115, the flow returns to step 107. The drive period is changed and the updated drive instruction is outputted to the lens.

If the drive instruction is not changed in step 115, communication with the lens is performed in step 116 to obtain a DFC value. This value is compared with the current value in step 117. If the value is not changed, the flow returns to step 112 to continuously check the timer. However, if the value is changed, a speed drive period is calculated again in accordance with equation (11) in step 118. After the end of the S drive period is checked in step 112, and the flow returns to step 110 to output a drive instruction to the lens at the updated drive period.

The above operations are repeatedly performed.

Figure 24:
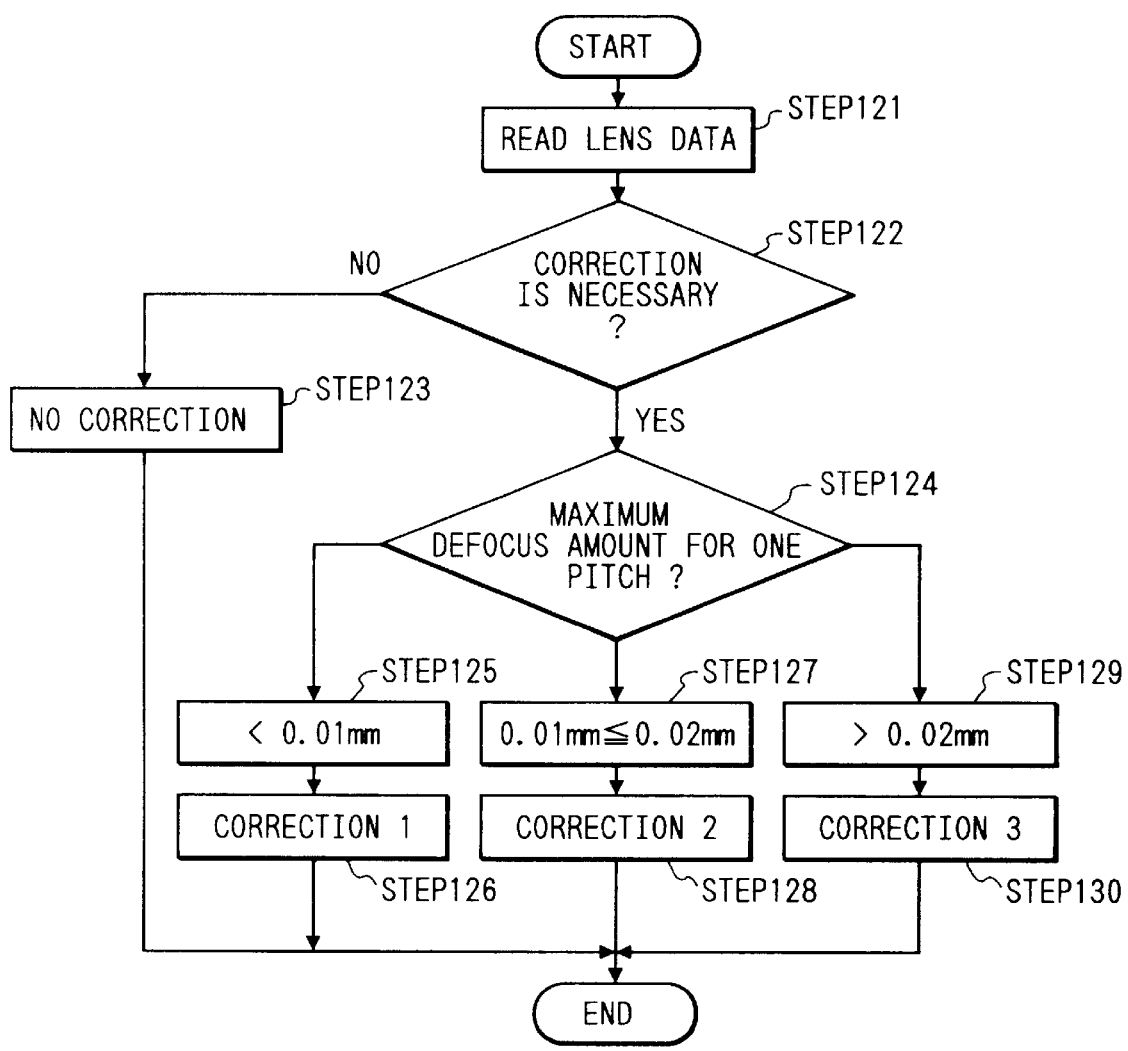
FIG. 24 is a flow chart for explaining processing of a correction means in the control operation of the adapter apparatus in the interchangeable lens system according to the present invention.

A method of selecting a control method (correction method) in step 104 of FIG. 23 will be described in detail with reference to a flow chart in FIG. 24.

The maximum defocus amount for one pitch is read in step 121 to decide in step 122 whether the mounted lens requires correction. If NO in step 122, the flow advances to step 123 and is ended.

If, however, YES in step 122, the flow advances to step 124, and correction methods are respectively set for lenses requiring correction operations. If the maximum defocus amount for one pitch is less than 0.01 mm in step 125, correction 1 is performed in step 126. If the maximum defocus amount for one pitch is 0.01 mm or more and less than 0.02 mm in step 126, correction 2 is performed in step 128. However, if the maximum defocus amount for one pitch is 0.02 mm or more in step 129, correction 3 is performed in step 130.

For example, in correction 1, actual speeds for the focusing lens drive control speeds V0 to V5 are corrected to be increased, and actual speeds for V10 to V15 are corrected to be decreased.

In correction 2, actual speeds for V0 to V5 are corrected to be decreased, and actual speeds for V10 to V15 are corrected to be increased. Similarly, in correction 3, speed correction is performed in accordance with the characteristics of the mounted lens. In this manner, focus control is performed in accordance with several correction methods for the maximum defocus amount for one pitch of the focusing lens.

A still camera lens unit originally not suitable for a video camera format can be connected to the video camera. In addition, differences in lens characteristics and variations thereof can be appropriately corrected as if a video lens is mounted on the video camera body.

As has been described above, in the interchangeable lens system according to the present invention, the data conversion means for converting the focus control data, outputted from the camera body, for driving the focusing lens into data for driving the focusing lens in the lens unit, and the data conversion means has a function of performing correction in accordance with the maximum defocus amount for one pitch of the focusing lens. The control speed of lenses having similar optical characteristics and the same changes in correction amounts can be controlled, and a desired control speed can be obtained. Variations in AF control performance can be suppressed, and good AF control can be performed.

When a still camera system interchangeable lens is connected to a camera of a video movie interchangeable lens system, good AF control can be uniformly and efficiently performed.

The conversion adapter apparatus for connecting a lens unit not suitable for an interchangeable lens type video camera, e.g., a sliver chloride film still camera lens unit to the interchangeable lens type video camera has been described.

A video camera apparatus free from operation errors even if identical functions or operation units are present in both a lens unit and a camera unit will be described according to the eleventh and twelfth embodiments of the present invention.

More specifically, in the interchangeable lens type video camera apparatus, an auto focus control function (AF) as one of the functions of the video camera will be exemplified. A mode display representing an AF operation mode or a manual focus mode, and various display contents such as a focus detection area are displayed on the screen of an electronic viewfinder. This display operations can be performed in the interchangeable lens type video camera system by deciding whether control data communication between the lens and the camera body is normally performed, or by an ON/OFF state of a lens ON/OFF detection switch.

When interchangeable lenses can be mounted on a video camera, these lenses have different specifications. If a switch for enabling/disabling the AF function is arranged on only the camera side, no problem occurs. Assuming that a switch for enabling/disabling the AF function on the lens unit side is also arranged in the lens unit, the AF operation mode is undesirably set such that the AF function ON/OFF switch on the camera body side is kept on although the AF switch on the lens unit is kept off. The actual display content may be different from an actual operation state, thereby degrading operability and causing operation errors. Therefore, the operator is confused with the operations and display contents.

An auto exposure control function (auto iris control) will be exemplified. In a conventional video camera, an auto iris ON/OFF switch is arranged on the camera body side, and the ON/OFF operation of auto iris control is performed on the camera side.

An auto iris ON/OFF switch may also be arranged on the lens side. In this case, since the auto iris ON/OFF switch is also arranged on the camera body side, the operator cannot decide which switch is effective for auto iris ON/OFF control and is confused with key operations, thus causing operation errors. In addition, optimal diaphragm control becomes time-consuming during photography, and an important shutter chance may be missed, thus posing problems in terms of operability, reliability, and safety.

In order to solve the above problems, according to the eleventh embodiment of the present invention, there is provided a lens-interchangeable video camera apparatus having focus control means, comprising first discriminating means for discriminating an operation mode of the focus control means set on a lens side, second discriminating means for discriminating an operation mode of the focus control means set on a camera side, display means for displaying the operation mode of the focus control means on the camera side, and control means for controlling the display means on the basis of outputs from the first and second discriminating means.

According to another feature of the present invention, there is provided an lens-interchangeable video camera apparatus having auto focus control means, comprising first discriminating means for discriminating an ON/OFF state of the auto focus control means on a lens side, second discriminating means for discriminating an ON/OFF state of the auto focus control means on a camera side, display means for displaying an operating state of the focus control means on the camera side, and control means for controlling the display means on the basis of outputs from the first and second discriminating means.

When even if switches for enabling/disabling the auto focus functions are independently arranged on the lens and camera sides, the operation state on the lens side can be detected on the camera side, and appropriate operation and display control free from a difference between the operation state on the camera side and that on the lens side can be performed.

According to the twelfth embodiment of the present invention, there is disclosed an interchangeable lens type camera system having auto exposure control means, comprising communicating means for receiving data representing an operation state of lens operating means for ON/OFF-operating an auto exposure control unit on a lens side, first detecting means for detecting the operation state of the lens operating means transmitted through the communicating means, camera operating means for ON/OFF-controlling the auto exposure control unit on a camera side, second detecting means for detecting an operation state of the camera operating means, and control means for controlling the auto exposure control unit on the basis of detection results from the first and second detecting means and setting the auto exposure control unit in an operative state when the first and second detecting means detect that the auto exposure control unit is set in the ON state.

According to still another feature of the twelfth embodiment, there is disclosed a lens-interchangeable video camera apparatus, comprising communicating means for receiving data representing an operation state of lens operating means for ON/OFF-controlling driving means on a lens side, first detecting means for detecting the operation state of the lens operating means transmitted through the communicating means, camera operating means for ON/OFF-controlling the driving means on a camera side, second detecting means for detecting the operation state of the camera operating means, and control means for controlling the driving means on the basis of detection results from the first and second detecting means and setting the driving means in an operative state when the first and second detecting means detect that the driving means is set in the ON state.

There is also disclosed a lens-interchangeable video camera apparatus comprising communicating means for receiving data representing an operation state of lens operating means for setting an operation mode of driving means on a lens side, first detecting means for detecting the operation state of the lens operating means transmitted through the communicating means, camera operating means for controlling an operation of the driving means on a camera side, second detecting means for detecting the operation state of the camera operating means, and control means for controlling the driving means on the basis of detection results from the first and second detecting means, and for setting the driving means in an operation mode detected by the first and second detecting means when the first and second detecting means detect that the lens operating means and the camera operating means are operated in the same operation mode.

The operation result of the auto iris ON/OFF switch on the lens side is read by the camera body. Auto iris control is performed when a logical AND product of the read result and an output result of an auto iris ON/OFF switch of the camera is obtained, to i.e., when both the control switches are set in ON state. Auto iris control is performed by only the lens auto iris ON/OFF switch having better operability than the camera auto iris ON/OFF switch while the camera auto iris ON/OFF switch is kept on.

The eleventh embodiment will be described first with reference to FIGS. 25 to 29D.

Figure 25:
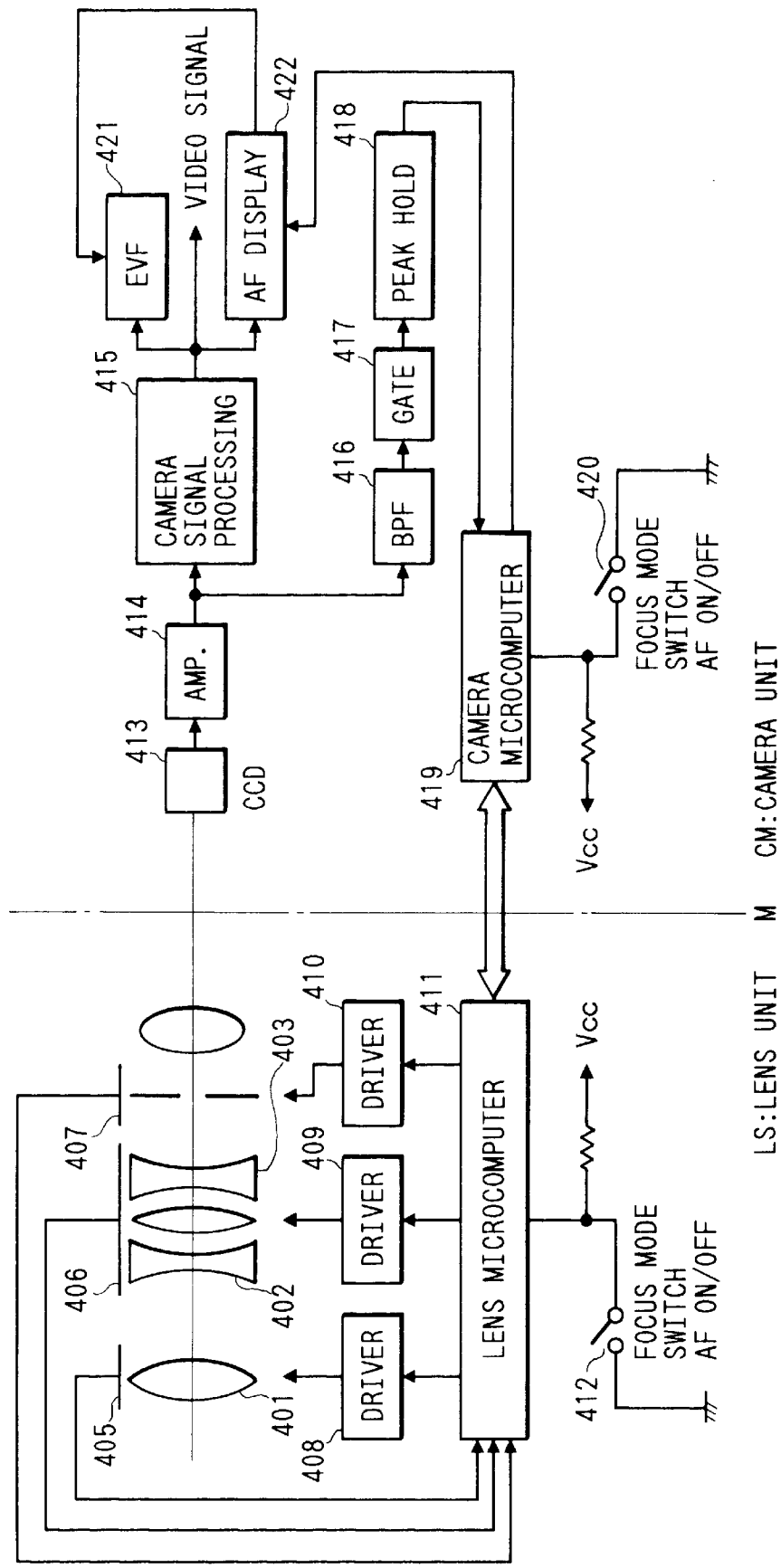
FIG. 25 is a block diagram showing an arrangement of an interchangeable lens type camera system according to still another embodiment of the present invention.

Referring to FIG. 25, a lens unit LS and a camera body CM are connected through a mount unit M. An object to be photographed is represented by reference numeral 100.

The lens unit LS includes a focusing lens 401, a zoom lens 402, a diaphragm (iris diaphragm) 403, a relay lens 404, a focus encoder 405 for detecting a position of the focusing lens 401, a zoom encoder 406 for detecting a movement position, i.e., a focal length of the zoom lens 402, a diaphragm encoder 407 for detecting an F-number of the diaphragm 403, a focus driver 408 including a motor for driving the focusing lens 401, a zoom driver 409 including a zoom motor for driving the zoom lens 402, an iris driver 410 including an IG meter and a motor for driving the diaphragm 403, a lens control microcomputer (to be referred to as a lens microcomputer hereinafter) 411 for controlling the respective drivers on the basis of control data transmitted from the camera side to systematically control the lenses and the diaphragm, and a focus mode switch 412 for setting an ON/OFF state of an auto focus control operation (AF) on the lens side. An operation status signal of this switch is fetched by the lens microcomputer 411 and is transmitted to the camera side in accordance with a predetermined format. A communication line 422 exchanges various control data with the camera side.

The camera body includes an image pickup element 413, a preamplifier 414, a process circuit 415, a band pass filter 416, a gate circuit 417, a peak hold circuit 418, a camera control microcomputer (to be referred to as a camera microcomputer hereinafter) 419, and a focus mode switch 420. The image pickup element 413 such as a CCD photoelectrically converts an object image focused by the lens unit connected thereto and outputs an image pickup signal. The preamplifier 414 amplifies the image pickup signal outputted from the image pickup element 413 to a predetermined level. The process circuit 415 performs signal processing (e.g., gamma correction, blanking processing, addition of a sync signal) of the image pickup signal outputted from the preamplifier 414 and outputting a standardized television signal such as an NTSC television signal. The BPF 416 extracts a high-frequency component of a luminance signal which changes in accordance with a degree of a focus state from the image pickup signal. The gate circuit 417 gates the high-frequency signal outputted from the BPF 416 to set a focus or focused state detection area (distance measuring area) set within the image pickup surface and causes to pass only a signal corresponding to the area. The peak hold circuit 418 detects a peak value of the high-frequency signal (within the focus detection area) having passed through the gate circuit 417 within a one-field period. The camera microcomputer 419 receives the peak value of each field outputted from the peak hold circuit 418, calculates a speed and a drive direction to drive the focusing lens in a direction to maximize the peak value, and outputs the calculated speed and drive direction to the lens side. The camera microcomputer 419 also supplies control data corresponding to exposure control and operations of a zoom operation switch, thereby systematically controlling the camera and the lens. The focus mode switch 420 is operated such that the auto focus control (AF) is set in an ON/OFF (auto/manual) state. The operation status signal of this switch is fetched by the camera microcomputer 419 and controls AF control data to be transmitted to the lens side.

An electronic viewfinder 421 reproduces a video signal outputted from the process circuit 415 and displays it. An AF display circuit 422 displays an ON/OFF (auto focus/manual focus) state of the AF operation on the screen of the electronic viewfinder 421.

Figure 26A:
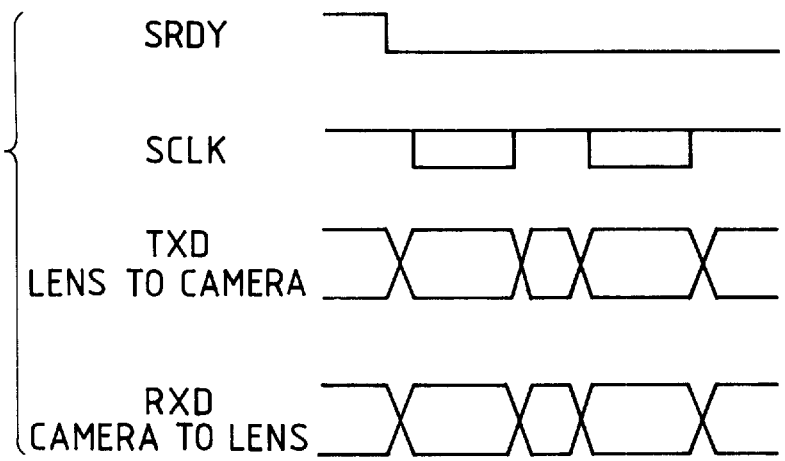
FIGS. 26A and 26B are a timing chart showing a communication format in the interchangeable lens type camera system and a view showing a data format of control data transmitted from the lens side to the camera side, respectively.
Figure 26B:
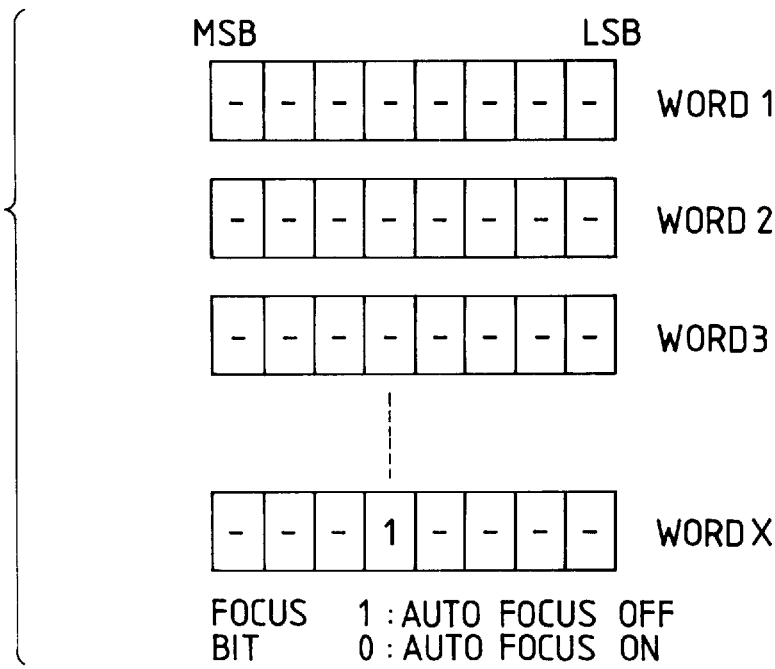

FIGS. 26A and 26B show a control data communication timing and a data format in control data communication performed between the camera body CM and the lens unit LS through the communication line 422. In this control data communication, various control data and status data are transmitted and received in the illustrated format. The focus driver 408, the zoom driver 409, and the iris driver 410 in the lens unit are controlled.

Referring to FIG. 26A, a ready signal SRDY is a chip select signal outputted from the camera microcomputer 419 and indicates to start communication with the lens unit. A signal SCLK is a serial clock signal outputted from the camera, and data communication is performed in accordance with this clock period. Data TXD is data transmitted from the lens microcomputer 411 in the lens unit to the camera microcomputer 420 in the camera body. This communication is performed by several words. The data format of the data RXD is shown in FIG. 26B.

The data RXD is constituted by a predetermined number of words each consisting of eight bits. It is important that one bit as the fourth bit from the MSB of the Xth word serves as an focus auto function OFF bit (to be referred to as a focus bit) for representing the ON/OFF state of the focus mode switch 11 on the lens side, i.e., representing whether the auto focus mode or the manual focus mode is set.

When the focus mode switch 412 on the lens side is set in the ON (AF mode) state, the focus bit is set to be "0". However, when the focus mode switch 412 on the lens side is set in the OFF (manual mode) state, the bit is set at "1".

A control operation of the camera microcomputer 420 shown in FIG. 25 will be described with reference to a flow chart in FIG. 27.

Figure 27:
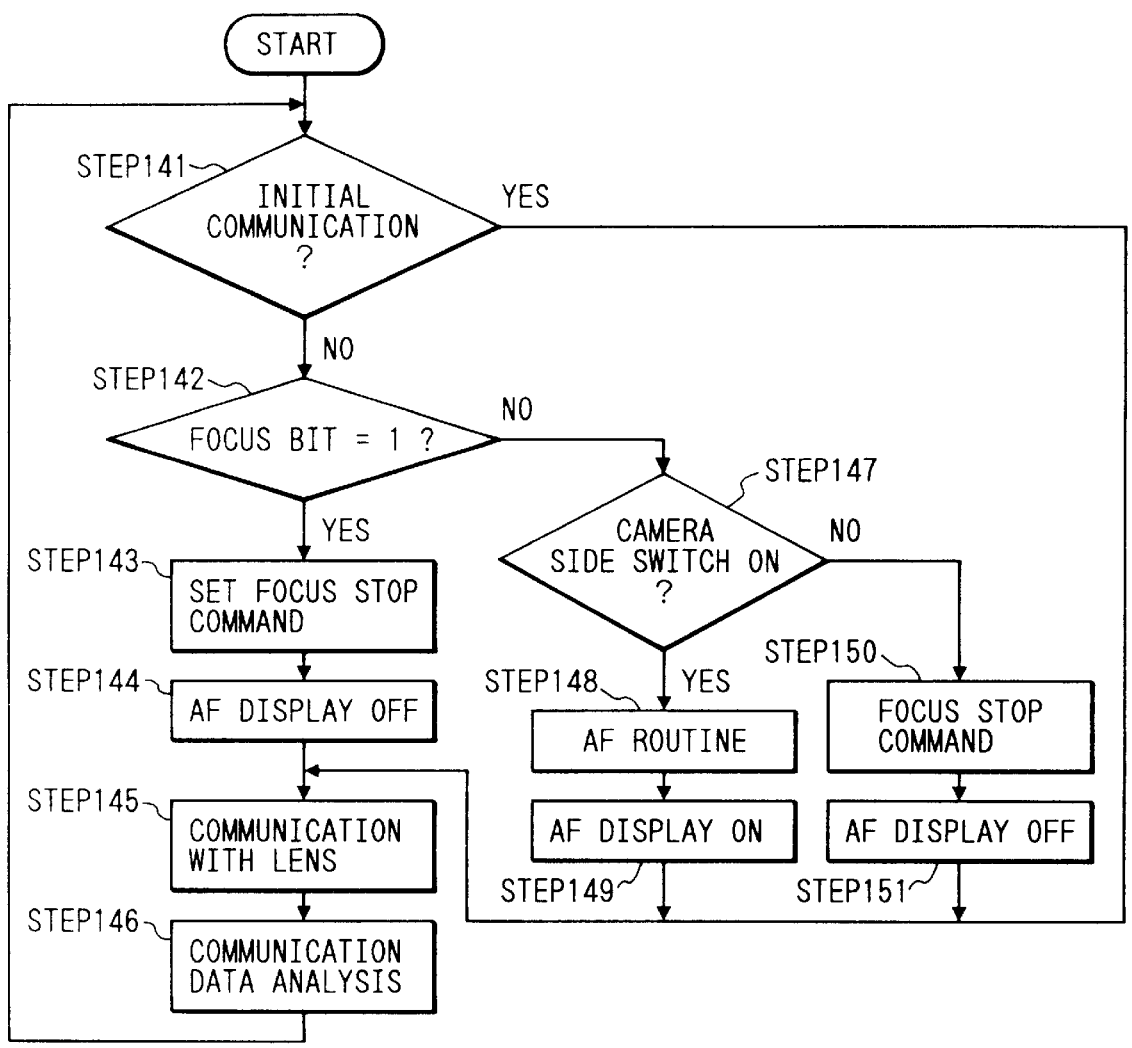
FIG. 27 is a flow chart showing a control operation of a camera microcomputer in a camera body in FIG. 25.

Referring to FIG. 27, when the flow is started, it is discriminated in step 141 whether communication performed with the lens microcomputer 411 is initial communication for fetching initial data from the lens. If this communication is discriminated to be initial communication, the flow immediately advances to step 145 to communicate with the lens microcomputer 411. A request is transmitted from the camera side to the lens side, and response data is received from the lens side. The operations in steps 141, 145, and 146 are repetitively performed until the initial communication is completed. If the initial communication is completed, various data received from the lens side are analyzed in step 147.

If the communication to be performed in step 141 is not the initial communication, i.e., if the initial communication has been completed, the flow advances to step 142. The focus bit representing the state of the focus mode switch in the data RXD from the lens side is checked. If the focus bit is set at "1", i.e., if the focus mode switch 412 on the lens side is set in the OFF state, i.e., the manual focus mode, the flow advances to step 143, and the focusing lens is stopped to set a stop command in the focus control command so as to stop the AF operation. The flow advances to step 144 to cause the electronic viewfinder on the camera side to display that the AF function is set in the OFF state. The flow then advances to step 145 to perform control data communication with the lens. The data received from the lens side in step 146 is analyzed, and the flow returns to step 141.

If the focus bit is set to be "0" in step 142, i.e., if the focus mode switch 412 on the lens side is kept in the ON state, i.e., the AF mode, the flow advances to step 147 to detect the ON/OFF state of the focus mode switch 420 on the camera side. If the ON state is detected, i.e., if the AF operation is set, the flow advances to step 148 to execute the AF routine. In the AF routine, the peak value output at the field period from the peak hold circuit 418 on the camera side is fetched by the camera microcomputer 419. The control data representing the speed and direction for driving the focusing lens in a direction to maximize the peak value is calculated, and the focus control command is outputted.

After the AF mode is displayed on the electronic viewfinder 421 in step 149, the flow advances to step 145 to transmit the calculated focus control command to the lens side. In step 146, the status data sent back from the lens in response to the control data transmitted from the camera side is analyzed, and the flow returns to step 141.

When the focus mode switch 420 on the camera side is set in the OFF state in step 147, the flow advances to step 150 to set a focus stop command for stopping the focusing lens and then the AF operation. In step 151, the AF mode display is disabled, and the flow advances to a routine for performing communication with the lens in step 145.

In the above embodiment, the lens focus mode switch 412 has a priority to perform an ON/OFF operation of the AF mode and an ON/OFF operation of the AF display. Even if the focus mode switch 420 on the camera side is kept in the ON state, the AF operation and the AF display are disabled in the OFF state of the focus mode switch 412 on the lens side. The AF operation and the AF display can be switched in accordance with only the operation of the focusing mode switch 420 on the camera side. The operator will not be confused with the operations and displays, thereby providing an efficient system almost free from operation errors.

An operation of the lens microcomputer will be described with reference to a flow chart in FIG. 28.

Figure 28:
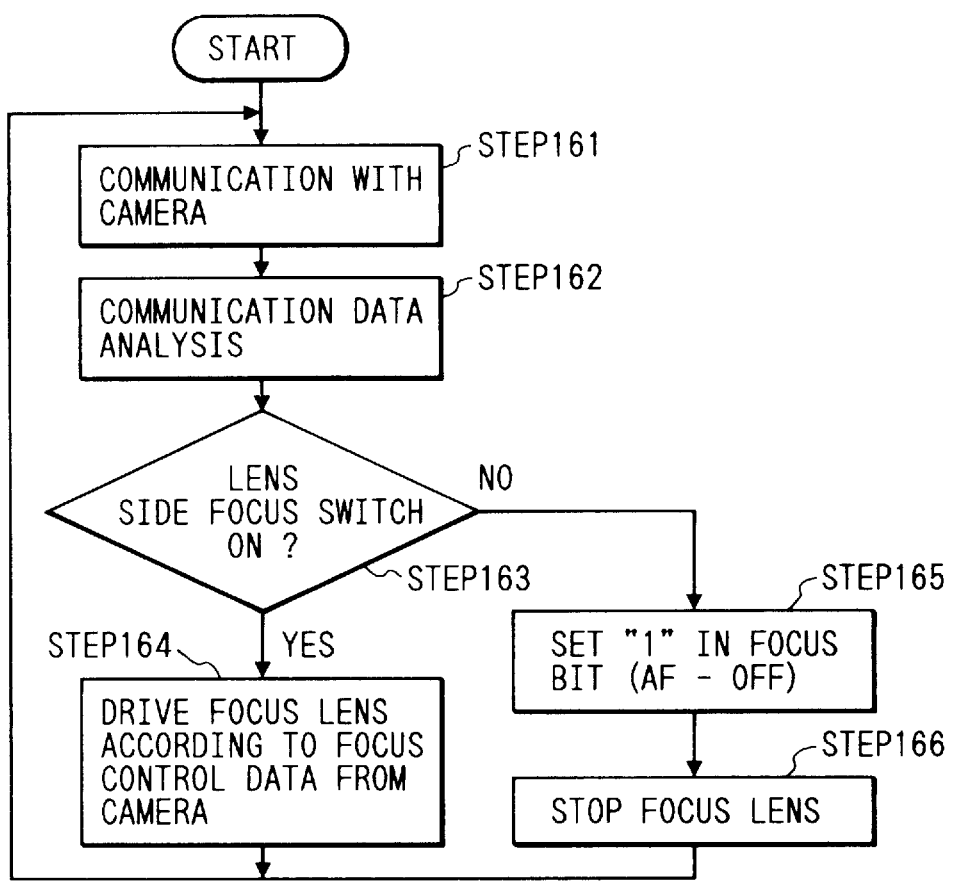
FIG. 28 is a flow chart showing a control operation of a lens microcomputer in FIG. 25.

Referring to FIG. 28, when the flow is started, serial communication with the camera side is performed in step 161. Various control data calculated on the camera side are received. In step 162, the control data received from the camera side are analyzed.

In step 163, the ON/OFF state of the focus mode switch 412 on the lens side is checked. If the focus mode switch 412 on the lens side is set in the ON state, the flow advances to step 164 to drive the focusing lens 401 in accordance with the focus control data sent from the camera side, and the flow returns to step 161.

If the focus mode switch 412 on the lens side is set in the OFF state in step 163, the flow advances to step 165. In order to transmit to camera side that the AF operation mode is set in the OFF state, i.e., the manual focus mode is selected on the lens side, the focus bit is set at "1". In step 166, the focusing lens 401 is stopped, and the flow returns to step 161.

In serial communication with the camera side in step 161, the focus bit of "1", i.e., the AF-OFF state on the lens side is transmitted to the camera side.

The flow charts in FIGS. 27 and 28 are repeatedly performed every vertical sync signal.

FIGS. 29A to 29D are views for explaining display contents of the AF-ON/OFF operation state on the camera side. The focus mode is displayed on the screen of the electronic viewfinder.

As is apparent from FIGS. 29A to 29D taken together with the system configuration of FIG. 25, the ON/OFF state of the focus mode switch 412 on the lens side is transmitted as bit data to the camera microcomputer 419 through communication with the camera side. When the camera microcomputer 419 discriminates that one of the focus mode switch 412 on the lens side and the focus mode switch 420 on the camera side is set in the AF-OFF state, i.e., the manual focus mode, the camera microcomputer 419 controls the AF display circuit 422 to switch the display content from the content representing the AF state to the content representing the manual state.

Figure 29A:
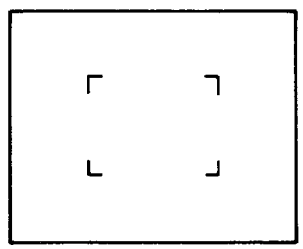
FIGS. 29A to 29D are views for explaining display contents in a focus mode on the camera side.
Figure 29B:
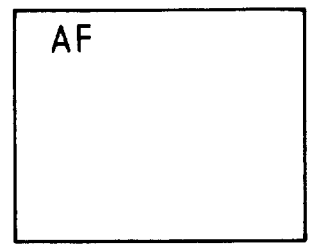
Figure 29C:
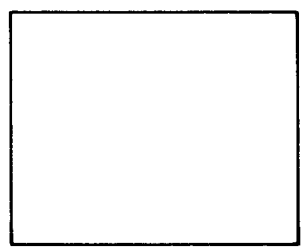

As shown in FIGS. 29A to 29D, in the AF-ON mode, the "focused state detection area (distance measurement frame)" (FIG. 29A) is presented to the operator, so that the operator can recognize that the AF mode is set. If the AF-OFF mode is set, i.e., the manual mode is selected, the "focused state detection area (distance measurement frame)" is erased from the screen as shown in FIG. 29C, so that the operator can know the AF mode is not set.

Figure 29D:
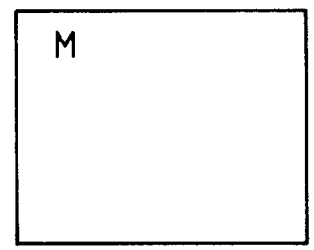

As shown in FIG. 29B, in the AF-ON mode, i.e., in the auto focus mode, "AF" is displayed on the screen of the electronic viewfinder. As shown in FIG. 29D, in the AF-OFF mode, i.e., the manual mode, "M" is displayed on the screen of the electronic viewfinder, thereby eliminating unnatural display contents.

With the above arrangement, when the focus mode switch is arranged on the lens side, i.e., the focus mode switches are arranged on both the camera and lens sides, the AF display contents can be switched in accordance with the set operation mode. Therefore, unnatural display operation in which "AF" is kept displayed although the focus mode selection switch on the lens side is turned off can be prevented.

As described above, in the interchangeable lens type camera system according to the present invention, the operation state of the focus mode selection switch on the lens is read by the camera body, and the read result is compared with the operation state of the focus mode selection switch on the camera side. The focus mode and its display are selected in accordance with the operation states of these switches. When the focus mode switch on the lens side is set in the ON state (AF mode), the focus mode is determined by the focus mode switch on the camera side. If the focus mode switch on the lens side is kept in the OFF state, the AF-OFF mode, i.e., the manual mode is set regardless of the operation state of the focus mode switch on the camera. Therefore, when both the focus mode switches are set in the ON state, auto focus control is performed. Therefore, even if the focus mode selection switches are arranged on both the lens and camera sides, the operator is not confused with the operations. Focus control and display operations free from operation errors with excellent operability can always be performed.

Figure 30:
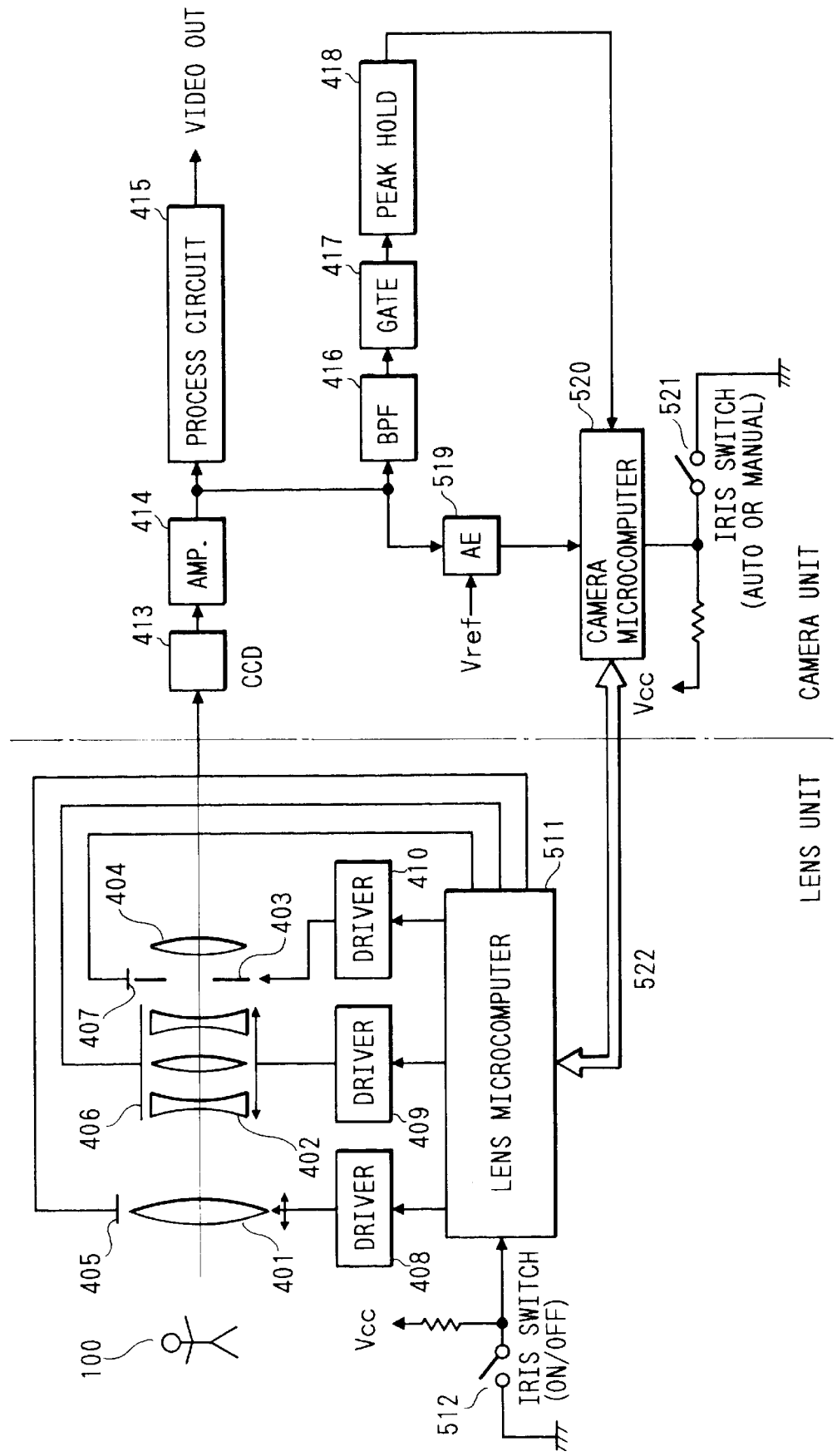
FIG. 30 is a block diagram showing an interchangeable type camera system according to still another embodiment of the present invention.

The twelfth embodiment of the present invention will be described with reference to FIG. 30. The same reference numerals as in FIG. 25 denote the same parts in FIG. 30, and a detailed description thereof will be omitted.

A lens unit includes a lens control microcomputer (to be referred to as a lens microcomputer hereinafter) 511 for controlling respective drives on the lens side on the basis of control data transmitted from the camera side and systematically controlling respective lenses and a diaphragm, and an auto iris ON/OFF switch 512 for automatically controlling a diaphragm (iris diaphragm) 403 on the lens side on the basis of the data from the camera side (when this switch is set in the OFF state, the manual mode is set). An operation state of this switch is fetched by the lens microcomputer 511 and is transmitted to the camera side in accordance with a predetermined format. A communication line 522 exchanges various control data with the camera side.

A camera unit includes an auto iris control circuit (AE circuit) for comparing a luminance level of an image pickup signal outputted from a preamplifier 414 with a predetermined reference level Vref and outputting a signal corresponding to a difference therebetween.

A camera control microcomputer (to be referred to as a camera microcomputer hereinafter) 520 receives a peak value of each field outputted from a peak hold circuit 418, calculates a speed and a drive direction for driving a focusing lens in a direction to maximize the peak value, and outputs the calculated results to the lens side. The camera microcomputer 520 receives an output signal from the AE circuit 519, calculates a diaphragm control signal for controlling the diaphragm so that the luminance level of the image pickup signal is always set equal to the reference level Vref, and outputs the calculated diaphragm control signal to the lens side, thereby systematically controlling the camera and the lens. An auto iris ON/OFF switch 521 automatically controls an auto iris control mode in response to an output from the AE circuit 519 so as to ON/OFF-control the diaphragm on the lens side (when this switch is set in the OFF state, the manual mode is set). An operation state of this switch is fetched by the camera microcomputer 520.

Figure 31:
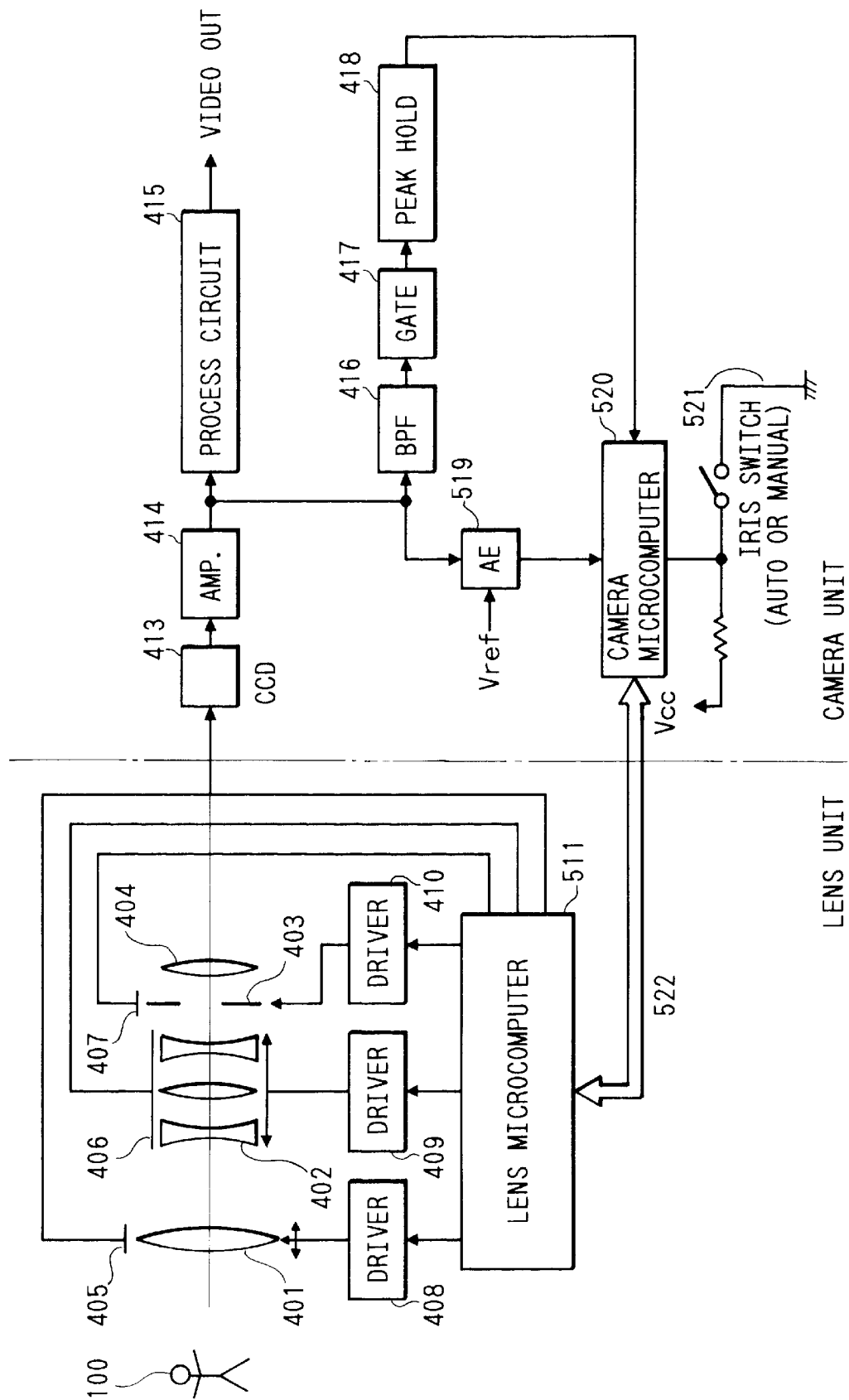
FIG. 31 is a block diagram showing another combination of an interchangeable lens type camera system according to the present invention.

FIG. 31 shows an arrangement in which a lens unit having no auto iris ON/OFF switch is connected to a camera body. The arrangement in FIG. 31 is different from that in FIG. 30 in that the auto iris ON/OFF switch is arranged or not arranged on the lens side. Therefore, although the arrangement in FIG. 31 is illustrated, a detailed description thereof will be omitted.

Figure 32B:
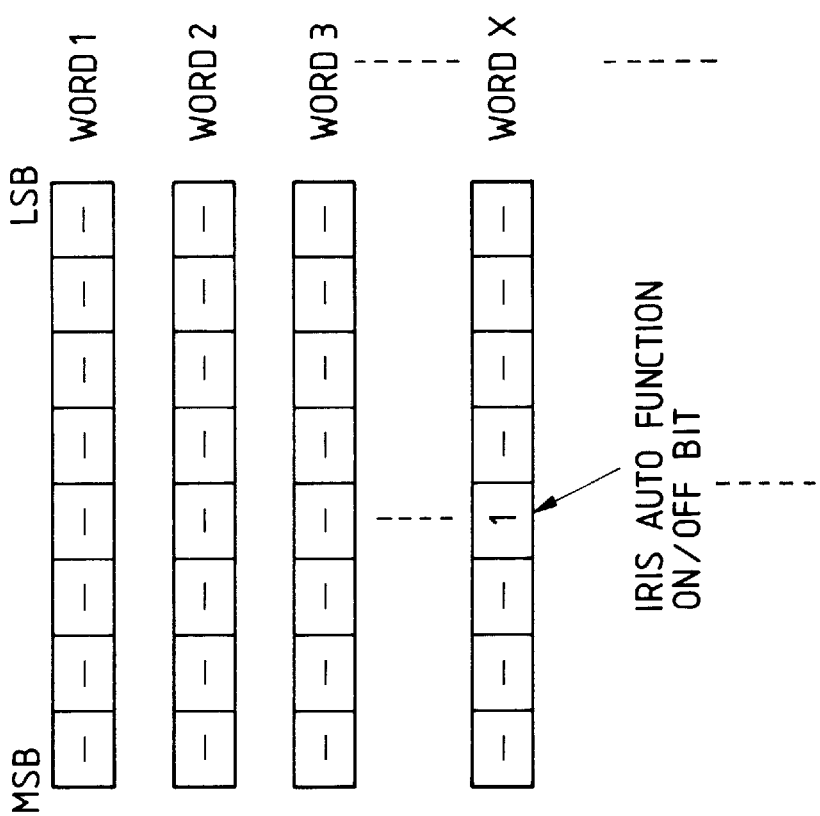
FIGS. 32A and 32B are a timing chart showing a communication format in the interchangeable lens type camera system according to the present invention and a view showing a data format of control data transmitted from a camera body to a lens unit, respectively.
Figure 32A:
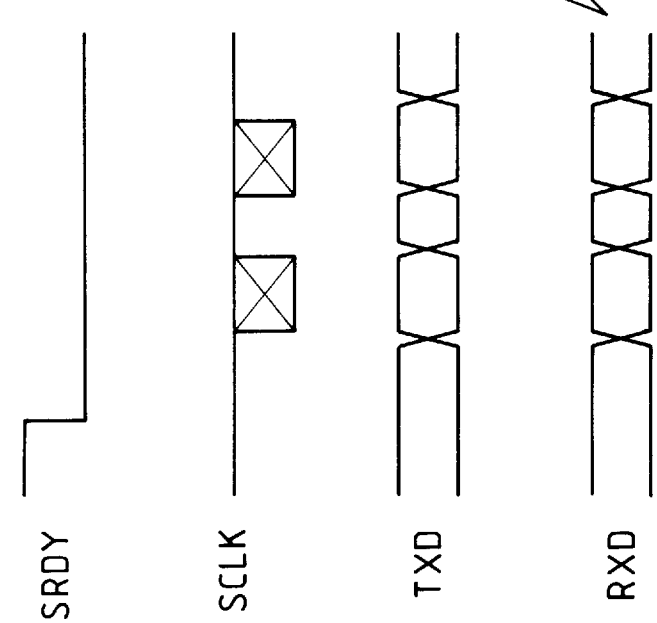

FIGS. 32A and 32B show a control data communication timing and a data format in control data communication performed between a camera body CM and a lens unit LS through a communication line 522. Various control data and various status data are transmitted and received in the illustrated format. A focus driver 408, a zoom driver 409, and an iris driver 410 in the lens unit are controlled.

Referring to FIG. 32A, a signal SRDY is a chip select signal for performing communication with the lens unit. A signal SCLK is a serial clock signal outputted from the camera. Data RXD is data transmitted from the lens microcomputer 511 in the lens unit to the camera microcomputer 520 in the camera body. Data TXD is data transmitted from the camera unit to the lens unit.

FIG. 32B shows a data format of the control data RXD (FIG. 32A) transmitted from the lens unit to the camera unit.

It is important that one bit as the fourth bit from the MSB of the Xth word is set as an auto iris function OFF bit representing an operation state of the auto iris ON/OFF switch in the lens unit.

The camera side decodes the control data transmitted from the lens side and checks the state of the auto iris OFF bit, thereby deciding whether the lens is set in the auto iris control sate (i.e., the operative state of the auto iris ON/OFF switch).

A control operation of the camera microcomputer 520 shown in FIGS. 30 and 31 will be described with reference to a flow chart in FIG. 33.

Referring to FIG. 33, the flow is started, various control data are transmitted to the lens microcomputer 511 through the communication line 522 in step 171. The data as a result of communication with the lens microcomputer 511 are analyzed in step 172. It is then decided in step 173 whether initial communication is to be performed to fetch initial data from the lens microcomputer 511 and hence the lens. If the power ON state is set, or the initial communication has been performed upon mounting of a lens and various control data and status data in response to these control data have been already exchanged, the flow advances to step 174.

When initial communication is to be performed, the flow returns to steps 171 to transmit various control data to the lens microcomputer. Otherwise, the flow advances to step 174 to discriminate whether the auto iris OFF bit in the control information sent from the lens side through the above communication is set to be "1". If YES in step 174, the auto iris ON/OFF switch 512 on the lens side has been set in the OFF state, i.e., the manual mode. The flow advances to step 175 to set an iris stop command. A manual iris control mode is displayed in step 176, and the flow advances to step 171 to transmit the iris stop command to the lens side.

When the auto iris function OFF bit is not set at "1" in step 174, the auto iris ON/OFF switch 512 on the lens side has been set in the ON state, i.e., the auto iris control mode has been set. In this case, the flow advances to step 177 to check the operation state of the auto iris ON/OFF switch 521 on the camera side.

If the auto iris ON/OFF switch 521 on the camera side is set in the ON state in step 177, that is, if both the auto iris ON/OFF switches on the lens and camera sides are kept in the ON state, the flow advances to step 178. In this step, the camera microcomputer 520 calculates iris control data in accordance with output data from the AE circuit 519. An auto iris control mode is displayed in step 179, and the flow returns to step 171 to transmit the iris control data to the lens side.

When the auto iris ON/OFF switch 521 on the camera side is not set in the ON state in step 177, the flow advances to step 180 to set a manual iris control mode. This manual iris control mode is displayed in step 181, and the flow advances to step 171 to transmit the iris stop command to the lens side, thereby controlling the iris diaphragm manually.

As described above, the camera microcomputer 520 discriminates whether the auto iris function OFF bit sent from the lens microcomputer 511 is set at "0" or "1". If this bit is set at "0", i.e., if the auto iris ON/OFF switch on the lens side is set in the ON state, iris control is performed in accordance with the operation state of the auto iris ON/OFF switch on the camera side. If the above bit is set at "1", i.e., if the auto iris function ON/OFF switch on the lens side is set in the OFF state, a stop command is set as the iris control command and is transmitted to the lens microcomputer 511.

It is very important that iris control in the camera body is set in the auto iris mode, and that if the auto iris function OFF bit is set at "0", the camera microcomputer 520 performs auto iris control. That is, when auto iris ON/OFF switches on the camera and lens sides are set in the ON state, auto iris control is performed. When one of the switches is set in the auto iris control OFF state, auto iris control is not performed.

A control operation of the lens microcomputer 511 will be described with reference to a flow chart in FIG. 34.

Figure 34:
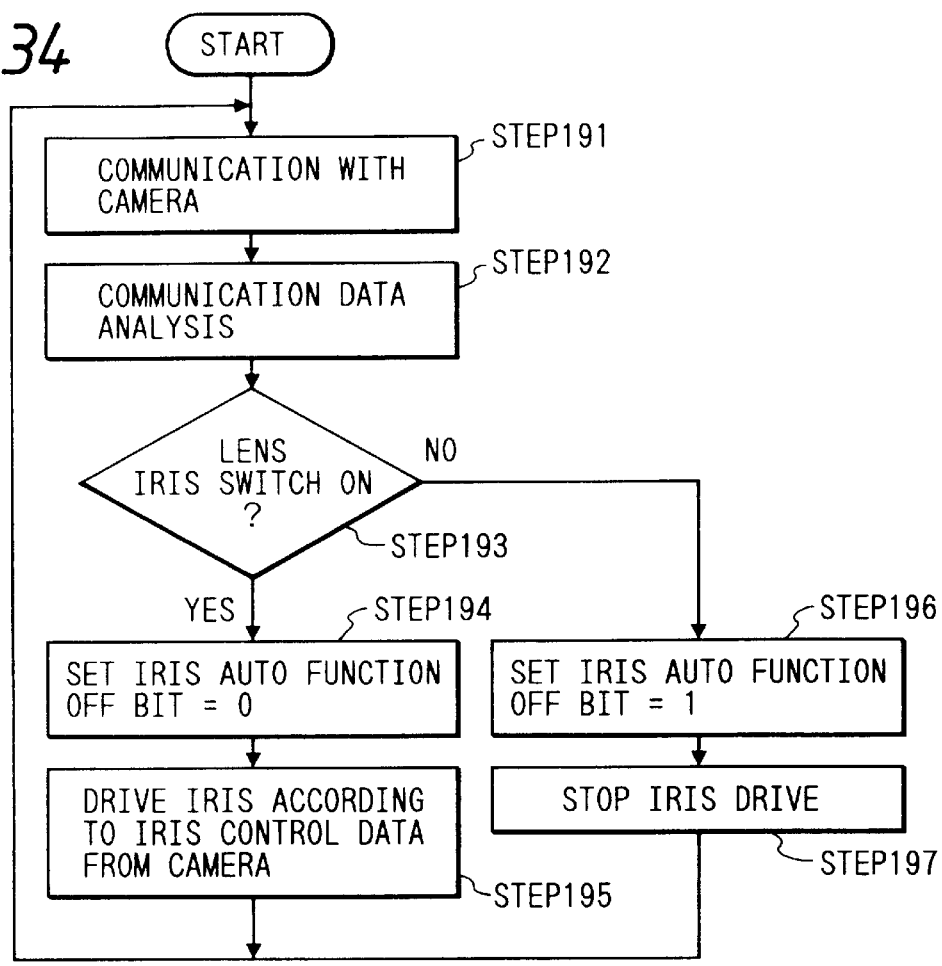
FIG. 34 is a flow chart showing a control operation of a lens microcomputer in FIG. 30.

Referring to FIG. 34, when the flow is started, various control data are received from the camera microcomputer 520 through the communication line 522 in step 191. The data as a result of communication with the camera side are analyzed in step 192. An operation state of the auto iris ON/OFF switch 512 on the lens side is checked in step 193. If this switch is set in the ON state, the flow advances to step 194 to set the auto iris function OFF bit to be "0". The iris driver 510 is driven and controlled in accordance with the iris control data transmitted from the camera microcomputer in step 195, thereby controlling the diaphragm (iris diaphragm) 403.

In step 193, when the auto iris ON/OFF switch 512 on the lens side is set in the OFF state, the flow advances to step 196 to set the auto iris function OFF bit to be "1". In step 197, iris driving is stopped in step 197, and the manual mode is set.

Referring to FIG. 34, if the auto iris ON/OFF switch 512 on the lens side outputs an iris ON signal to the lens microcomputer 511, the lens microcomputer 511 sets the auto iris function OFF bit to be "0". Iris drive control is performed in accordance with the iris control data transmitted from the camera microcomputer 520. If the above switch is set in the OFF state, the lens microcomputer 511 sets the auto iris function OFF bit to be "1", thereby stopping the iris diaphragm.

It is important that if the auto iris ON/OFF switch 512 is set in the OFF state, i.e., the auto iris function is set in the OFF state on the lens side, the auto iris function OFF bit is set at "1" to inform the camera side of the auto iris function OFF state of the lens side. When the auto iris ON/OFF switch is arranged in the lens side, the iris diaphragm is operated by a combination with the camera, as shown in FIG. 36A. That is, only when both the auto iris ON states on the lens and camera sides are obtained, auto iris control is performed.

Figure 35:
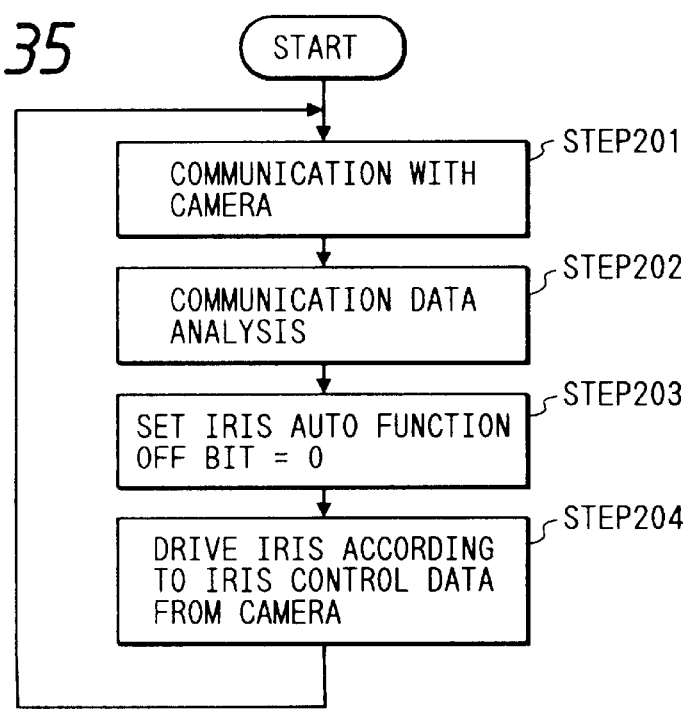
FIG. 35 is a flow chart showing a control operation of a lens microcomputer in FIG. 31.

FIG. 35 is a flow chart on the lens side when a lens having no auto iris ON/OFF switch is used as shown in FIG. 31.

Referring to FIG. 35, when the flow is started, the lens microcomputer communicates with the camera microcomputer in step 201. The communication data transmitted from the camera microcomputer are analyzed in step 202. In step 203, the auto iris function OFF bit is set to be "0". The same data as in the ON state of the auto iris ON/OFF switch is transmitted to the camera microcomputer 520. As is apparent from the above embodiment, the iris diaphragm can be set in a controllable state on the basis of the control data from the camera microcomputer. In practice, the iris diaphragm 403 is driven in accordance with the iris control data from the camera in step 204.

As described above, since the auto iris ON/OFF switch is not arranged on the lens side, the auto iris function OFF bit is always set to be "0" and is sent back to the camera, so that iris control is performed on the basis of the control data from the camera microcomputer, i.e., the auto iris ON/OFF switch from the camera side, thereby performing smooth iris control free from operation errors. The iris operations performed when the lens is connected to the camera are summarized, as shown in FIG. 36B.

As has been described above, there is provided a video camera capable of causing a camera body to read an operation result of an auto iris ON/OFF switch of a lens, performing auto iris control when a logical AND product of the read result and an output result of an auto iris ON/OFF switch of the camera is obtained, i.e., when both the control switches are set in the ON state, performing auto iris control by only the lens auto iris ON/OFF switch having better operability than the camera auto iris ON/OFF switch while the camera auto iris ON/OFF switch is kept on.

What is claimed is:

1. An interchangeable lens type camera system for driving a lens unit detachably mounted on a camera on the basis of control data sent from a camera body, comprising:

relay means being capable of mounting on said camera body a lens unit which is different in a control method from the camera system of said camera body and not being operated according to the control method of said camera body, said relay means having correction means for correcting the control data from said camera body in accordance with control characteristics and data communication format of said lens unit and said relay means including detection means for detecting a specification of the lens unit mounted on said camera body, and said correction means correcting the control data according to a detection result of said detection means and supplying the corrected control data to said lens unit.

2. A system according to claim 1, wherein said relay means corrects focusing lens drive speed data from said camera body.

3. An interchangeable lens type camera for driving a lens unit in accordance with control data sent through an adapter being capable of mounting a lens unit which is not operable to said camera since a control format of each function of the lens unit is different from a control format of corresponding function of said camera, by adaptably converting the control format of said each function of said lens unit to the control format of said corresponding function of said camera, comprising:

means for discriminating the presence/absence of said adapter; and control means for changing the control data to a control value for driving said lens unit in accordance with an output from said discriminating means, and wherein the camera system have different control formats.

4. A system according to claim 3, wherein said control data includes focusing lens drive speed data.

5. A system according to claim 1, wherein said relay means is an adapter for connecting said camera body and said lens unit and includes a mount for mechanically connecting said camera and said lens unit.

6. A system according to claim 5, wherein said adapter includes a microcomputer.

7. A system according to claim 6, wherein said microcomputer serially communicates with microcomputers respectively of said camera body and said lens unit.

8. A system according to claim 7, wherein the respective microcomputers communicate with each other at a period of V-sync.

9. A system according to claim 2, wherein the focusing lens drive speed data output from said camera body is generated based on focusing state detected based on clearness in a video signal.

10. A system according to claim 2, wherein said relay means converts the focusing lens drive speed data output from said camera body into a driving signal of a stepping motor.

11. A system according to claim 2, wherein said relay means attains the conversion of the focusing lens drive speed data by using a data table.

12. A system according to claim 1, wherein said camera is a video camera and said lens unit is a lens for a still camera.

13. A system according to claim 3, wherein said adapter includes a mount for mechanically connecting said camera body and said lens unit, and wherein said control means comprises a microcomputer arranged in said adapter.

14. A system according to claim 13, wherein said microcomputer serially communicates with microcomputers arranged respectively in said camera body and said lens unit.

15. A system according to claim 14, wherein the respective microcomputers communicate with each other at a period of V-sync.

16. A system according to claim 4, wherein the focusing lens drive speed data output from said camera body is generated based on a focusing state detected based on clearness in a video signal.

17. A system according to claim 4, wherein said control means converts the focusing lens drive speed data output from said camera body into a driving signal of a stepping motor.

18. A system according to claim 4, wherein said control means attains the conversion of the focusing lens drive speed data by using a data table.

19. A system according to claim 4, wherein said camera is a video camera and said lens unit is a lens for a still camera.

20. A relay device used in said camera system according to claim 1.

21. An adapter device used in said camera according to claim 3.

22. An interchangeable lens system detachably mounted an a first type camera body and controlled on the basis of control data supplied from said first camera body, comprising:

converting means being capable of mounting on a second type camera which is different in a control method from said first type camera body and is not operated according to the control method of said first camera body, said converting means including correction means for correcting the control data from said second camera body in accordance with control characteristics and data communication format of said interchangeable lens system and supplying the corrected control data to said interchangeable lens system.

23. An interchangeable lens system according to claim 22, wherein the control data includes focusing lens drive speed data.

24. An interchangeable lens system according to claim 22, wherein said first type camera body is a still camera and said second type camera is a video camera.

25. An interchangeable lens system according to claim 22, wherein said converting means is detachably mounted on said lens system.

26. An interchangeable lens system according to claim 22, wherein said lens system includes a focus lens driven by a stepping motor.

27. An interchangeable lens system according to claim 26, wherein said converting means includes a data table for correcting the control data from said camera body in accordance with control characteristics of said interchangeable lens system.

28. An interchangeable lens system according to claim 25, wherein said converting means is an adaptor detachably mounted on said lens system and said second type camera body.

* * * * *

UNITED STATES PATENT AND TRADEMARK OFFICE
CERTIFICATE OF CORRECTION

PATENT NO. : 5,877,811

DATED : March 2, 1999

INVENTOR(S) : Ryunosuke Iijima, Toshiaki Mabuchi, Seiya Ohta

It is certified that error appears in the above-identified patent and that said Letters Patent is hereby corrected as shown below:

Col. 44, line 21, delete "4" and insert — 2 —.

Signed and Sealed this

Seventh Day of December, 1999

Q. TODD DICKINSON

*Attest:*

*Attesting Officer*     *Acting Commissioner of Patents and Trademarks*